United States Patent
Kadambar et al.

(10) Patent No.: US 10,750,462 B2
(45) Date of Patent: Aug. 18, 2020

(54) METHODS AND SYSTEMS FOR D2D OPERATION IN UNLICENSED SPECTRUM

(71) Applicant: Samsung Electronics Co., Ltd., Suwon-si, Gyeonggi-do (KR)

(72) Inventors: Sripada Kadambar, Bangalore (IN); Ashok Kumar Reddy Chavva, Bangalore (IN); Anusha Gunturu, Bangalore (IN); Chai-Man Lim, Seoul (KR); Seon-Ik Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 16/002,750

(22) Filed: Jun. 7, 2018

(65) Prior Publication Data
US 2018/0368090 A1    Dec. 20, 2018

(30) Foreign Application Priority Data

Jun. 7, 2017 (IN) .............................. 201741020055
Jun. 5, 2018 (IN) .............................. 201741020055

(51) Int. Cl.
*H04J 3/06*        (2006.01)
*H04W 56/00*       (2009.01)
(Continued)

(52) U.S. Cl.
CPC ....... *H04W 56/0015* (2013.01); *H04W 8/005* (2013.01); *H04W 16/14* (2013.01);
(Continued)

(58) Field of Classification Search
None
See application file for complete search history.

(56) References Cited

U.S. PATENT DOCUMENTS

2017/0150330 A1* 5/2017 Kim ................... H04W 72/042
2017/0202043 A1* 7/2017 Seo ....................... H04W 28/08
(Continued)

OTHER PUBLICATIONS

U.S. Appl. No. 62/464,260; Tabet, "Synchronization and Master Information Block for Off Grid Radio Service", Feb. 7, 2017. (Year: 2017).*

*Primary Examiner* — Kwang B Yao
*Assistant Examiner* — Juvena W Loo

(57) ABSTRACT

Embodiments herein provide methods and systems for achieving D2D communications through unlicensed spectrum. The D2D-U operations can be achieved through multiple approaches. In the first approach, the devices can communicate with each other without any involvement of network. In the second approach, the network provides partial assistance to the devices such as allocating time and frequency resources for D2D-U communication. In the third approach, the network completely controls D2D-U operations between the devices. The embodiments include allocating time and frequency resources for transmission of PSBCH, PSDCH, PSCCH, and PSSCH. The allocations of the time and frequency resources meet regulatory requirements of minimum bandwidth utilization for unlicensed band operation. The embodiments include distributing power in narrow frequency sub-bands of D2D-U spectrum, in order to maximize transmission range of D2D-U communications.

20 Claims, 46 Drawing Sheets

(51) Int. Cl.
*H04W 8/00* (2009.01)
*H04W 72/04* (2009.01)
*H04W 72/12* (2009.01)
*H04W 16/14* (2009.01)
*H04W 76/14* (2018.01)
*H04W 92/18* (2009.01)

(52) U.S. Cl.
CPC ... *H04W 72/0406* (2013.01); *H04W 72/1278* (2013.01); *H04W 76/14* (2018.02); *H04W 72/1263* (2013.01); *H04W 92/18* (2013.01)

(56) References Cited

U.S. PATENT DOCUMENTS

| | | | |
|---|---|---|---|
| 2017/0238272 A1 | 8/2017 | You et al. | |
| 2017/0280469 A1* | 9/2017 | Park | H04W 72/085 |
| 2017/0311227 A1* | 10/2017 | Kim | H04W 40/10 |
| 2017/0339719 A1* | 11/2017 | Xu | H04W 74/08 |
| 2018/0070371 A1* | 3/2018 | Shin | H04L 5/0044 |
| 2018/0146478 A1* | 5/2018 | Kim | H04W 76/14 |
| 2018/0199388 A1* | 7/2018 | Tabet | H04W 76/14 |
| 2018/0376471 A1* | 12/2018 | Chae | H04L 27/26 |
| 2019/0173612 A1* | 6/2019 | Kimura | H04L 1/1819 |

\* cited by examiner

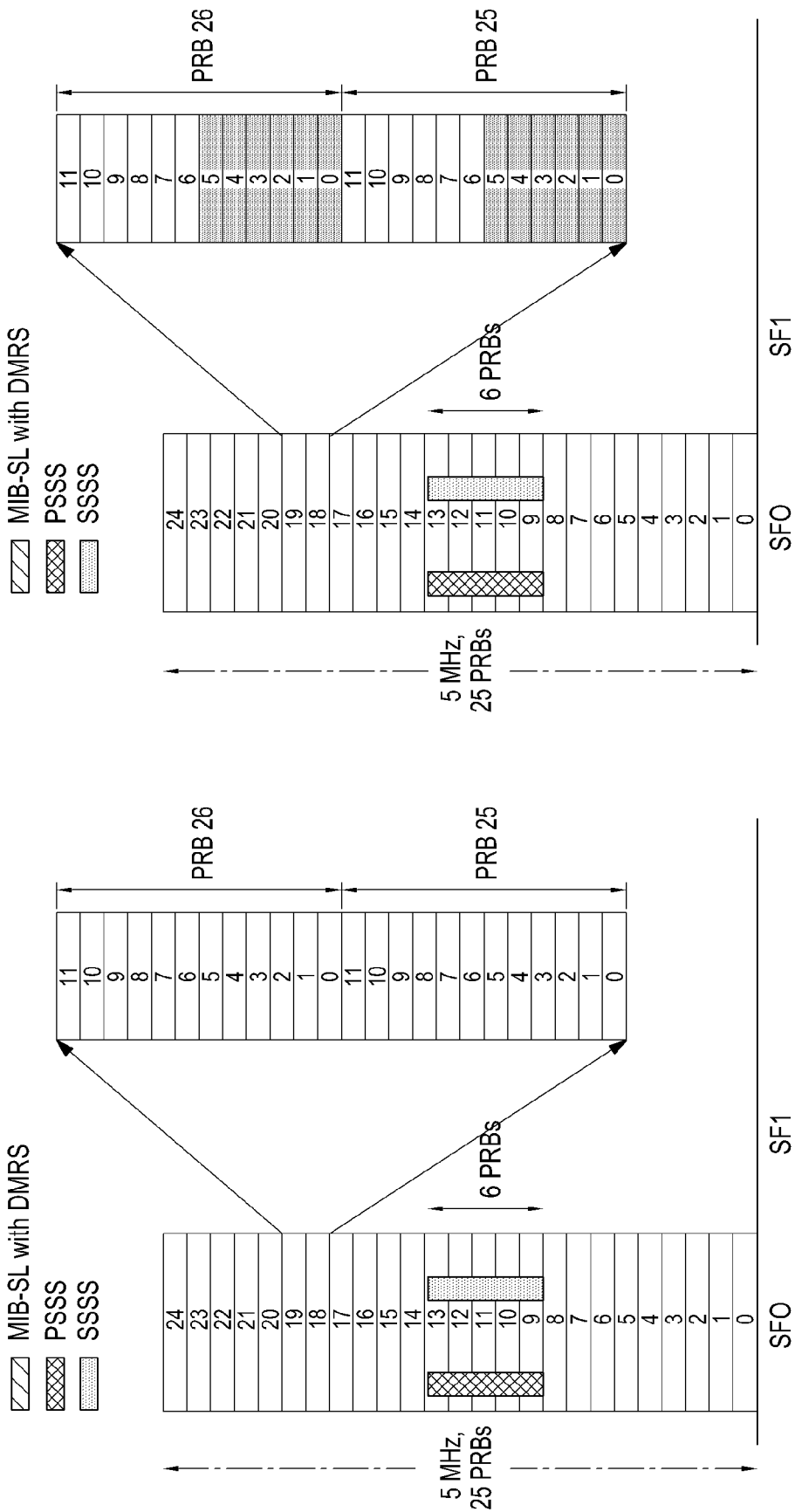

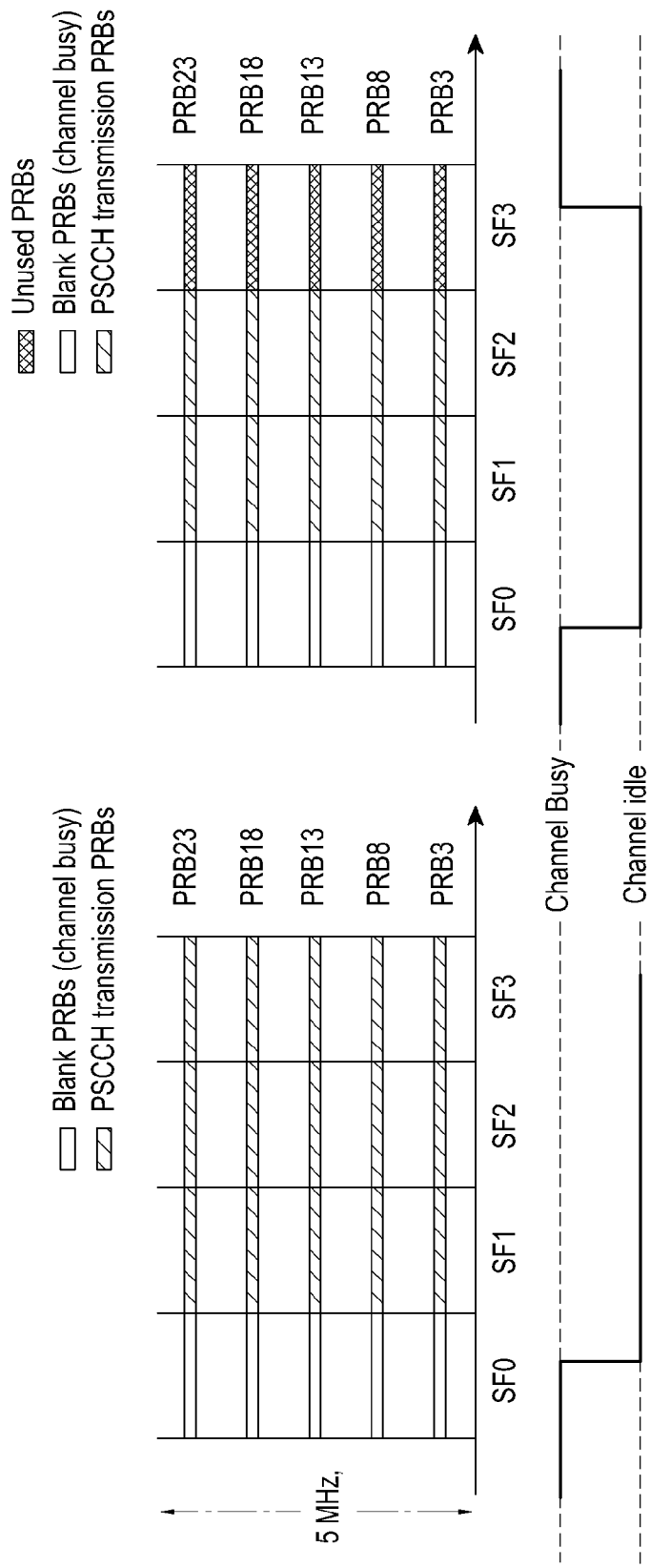

METHODS AND SYSTEMS FOR D2D OPERATION IN UNLICENSED SPECTRUM

CROSS REFERENCE TO RELATED APPLICATIONS AND CLAIM OF PRIORITY

This application is based on and claims priority 25 U.S.C. § 119 to Indian Provisional Application Serial No. 201741020055 (PS) filed in the Indian Patent Office on Jun. 7, 2017 and Indian Patent Application Serial No. 201741020055 (CS) filed on Jun. 5, 2018, the disclosures of which are incorporated herein by reference in their entireties.

BACKGROUND

1. Field

The disclosure relates generally to Device-to-Device (D2D) communications and more particularly to a method and a system for performing D2D communications using unlicensed spectrum.

2. Description of Related Art

3GPP ($3^{rd}$ Generation Partnership Project) introduced Device-to-Device (D2D) communications which allow devices to communicate among themselves without routing data through the cellular infrastructure. D2D communications can be used for achieving low data rate communication between devices in close proximity. The applications that can be supported using D2D communications include proximity based services, public safety, vehicular communication, and so on.

D2D operations in unlicensed spectrum (D2D-U) can provide greater flexibility to User Equipments (UEs) in utilizing resources when the UEs are in range of the network, since D2D-U communication need not always be achieved through the medium of an evolved Node B (eNB). Further, D2D-U operations can reduce interference, which is prevalent in D2D operations in licensed bands at the eNB and the UE. The allocation of resources for performing D2D-U operations need to meet regulatory requirements for unlicensed band operation and ensure fair coexistence with other Radio Access Technologies (RATs) such as Wi-Fi.

SUMMARY

In accordance with an aspect of the present disclosure, a method and a system are provided for achieving Device-to-Device (D2D) communications through unlicensed spectrum (D2D-U). The D2D-U operations can be achieved through multiple approaches. In the first approach, the devices can communicate with each other without any involvement of network. In the second approach, the network provides partial assistance to the devices such as allocating time and frequency resources for D2D-U communication. In the third approach, the network completely controls D2D-U operations between the devices. The embodiments include allocating time and frequency resources for transmission of PSBCH, PSDCH, PSCCH, and PSSCH. The allocations of the time and frequency resources meet regulatory requirements of minimum bandwidth utilization for unlicensed band operation. The embodiments include distributing power in narrow frequency sub-bands of D2D-U spectrum, in order to maximize transmission range of D2D-U communications.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIGS. 17A and 17B are illustrations of a mapping of PSBCH for 10 MHz bandwidth and 5 MHz bandwidth respectively, based on tone based interlace, according to embodiment;

FIGS. 30A and 30B are illustrations of a continuous PSCCH transmission, according to embodiment;

DETAILED DESCRIPTION

Figure 1:
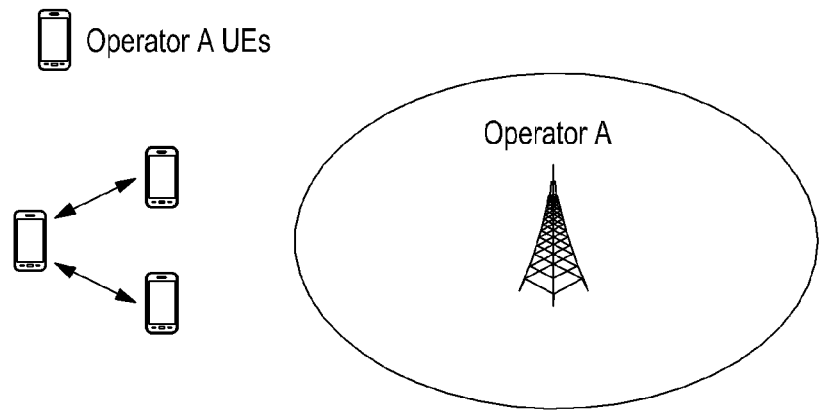
FIG. 1 is an illustration of a Device to Device-Unlicensed (D2D-U) operation in Standalone (SO) mode, according to embodiment.
Figure 52:
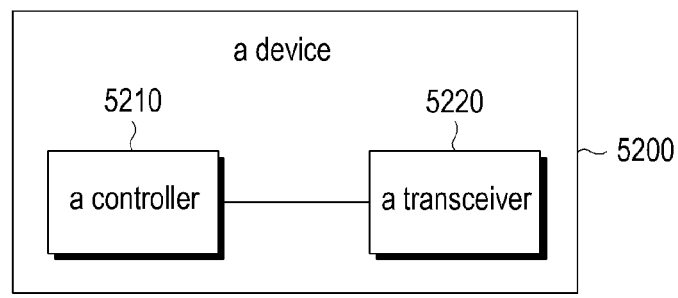
FIG. 52 is a block diagram of a device for D2D operation in unlicensed spectrum, according to an embodiment.

FIGS. 1 through 52, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for achieving Device-to-Device (D2D) communications through unlicensed spectrum (D2D-U). D2D-U operations can be achieved through one of the approaches, viz., standalone mode (devices communicate with each other through the unlicensed spectrum without any involvement of network), Passive Network Assistance (PNA) mode, Active Network Assistance (ANA) mode, and Network Controlled (NC) mode (network allocates resources to the devices for D2D-U communication between the devices, informs the state of one device to another, and so on). The differentiation between the PNA and ANA modes can be primarily based on the assistance provided by the network in terms of allocating time and frequency resources for D2D-U discovery and communication, providing a set of unlicensed channels to be used for D2D-U discovery and communication, and so on.

The embodiments include allocating time (sub-frame (SF)) and frequency (Physical Resource Blocks (PRBs)) in the SFs) resources for transmission of Physical Sidelink Broadcast Channel (PSBCH), Physical Sidelink Discovery Channel (PSDCH), Physical Sidelink Control Channel (PSCCH), and Physical Sidelink Shared Channel (PSSCH). The resource allocation meets regulatory requirements of minimum bandwidth utilization for unlicensed band operation. The embodiments include distributing power in narrow frequency sub-bands of D2D-U spectrum, in order to maximize transmission range of D2D-U communications.

Bandwidth allocated for D2D-U communications can be more than 5 MHz for unlicensed band transmissions. Since D2D transmissions require low data rate, a 5 MHz configuration can be defined. In many of the examples discussed in the draft, 5 MHz bandwidth is considered for ease of description. Same examples are applicable and can be extended for both 10 MHz and 20 MHz bandwidth.

Variation in frame structure for D2D-U operations can be based on starting point of uplink (UL) transmission. For D2D-U operation, all transmissions are of UL type. In an embodiment, channel access check (determining whether the unlicensed channel is accessible or free for transmission) and D2D-U transmission can start anywhere within the SF. This can provide opportunities for the device to obtain channel access (for example: by means of transmission of a reservation signal). Further, flexibility of transmission may be necessary for SO and PNA modes, since no additional support is available either through network or any other means.

In an embodiment, the frame structure can support starting of channel access check and D2D-U transmission at SF or slot boundaries. In order to improve spectral usage, D2D-U communication can be allowed to start at all or a subset of symbol boundaries, but at the cost of increased monitoring overhead for the receiving device. This can simplify design of protocols governing D2D-U operations. Enabling D2D-U transmission at only SF or slot boundary can result in efficient monitoring by devices at the receiving end of the D2D-U communication setup.

In an embodiment, the frame structure can support starting of channel access check and D2D-U transmission only at SF or slot boundaries. This can limit checking of channel accessibility, but can be suitable for the ANA and the NC modes of operation, since assistance of eNB is available in the ANA mode and the NC mode. The D2D-U transmissions by a device can either follow immediately after the transmissions of the network or after the transmissions of other devices. Hence, chances of the device acquiring the channel is less likely to be affected due to prior knowledge on channel state, which is communicated to the device by the network.

The D2D-U communications can use Single Carrier-Frequency Division Multiple Access (SC-FDMA) modulation scheme due to its lower Peak to Average Power Ratio (PAPR) compared to Orthogonal Frequency Division Multiple Access (OFDMA).

The principal object of the embodiments herein is to disclose methods and systems for enabling Device-to-Device (D2D) communications through unlicensed spectrum (D2D-U) operations through unlicensed spectrum, while meeting regulatory requirements for unlicensed band operation and achieving fair coexistence with other RATs.

Another object of the embodiments herein is to allocate time and frequency resources in unlicensed band for transmission and reception of D2D-U synchronization channel, discovery channel and communication channel.

Another object of the embodiments herein is to achieve maximum D2D-U transmission range by appropriate distribution of power to narrow frequency sub-bands within the unlicensed spectrum.

Referring now to the drawings, and more particularly to FIGS. 1 through 51, where similar reference characters denote corresponding features consistently throughout the figures, there are shown preferred embodiments.

FIG. 1 is an illustration of a Device to Device-Unlicensed (D2D-U) operation in Standalone (SO) mode, according to embodiment. In the SO mode, the devices (for example: UEs) are expected to perform D2D-U operations such as time and frequency resource selection, synchronization, discovery, communication, and so on, without any monitoring or assistance from external entities such as Long Term Evolution (LTE) networks. In an example, a UE, upon boot, will be responsible for discovering a D2D-U network, if available, perform operations to set up a D2D-U network, and so on. As depicted in FIG. 1, a plurality of UEs, belonging to an operator A, are out of coverage. The UEs can synchronize based on a synchronization source, discover each other, and communicate between themselves using D2D methods over unlicensed bands.

Figure 2:
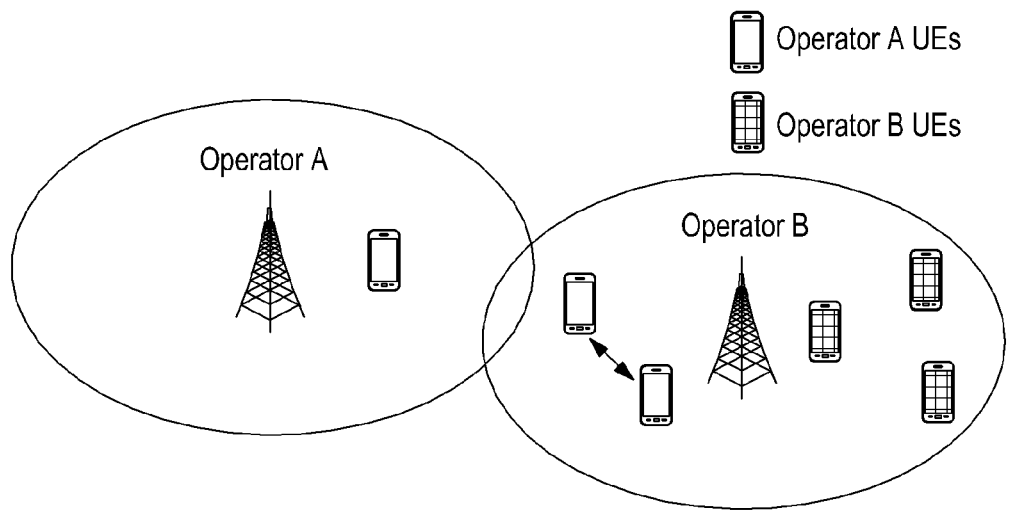
FIG. 2 is an illustration of a D2D-U operation in Passive Network Assistance (PNA) mode, according to embodiment.

FIG. 2 is an illustration of a D2D-U operation in Passive Network Assistance (PNA) mode, according to embodiment, In the PNA mode, the UEs willing to perform D2D-U communication may be in the range of a network and may utilize some of the parameters derived from the network for performing D2D-U operations. The network will be unaware of the existence of such UEs or the D2D-U operation set up between them. Hence the role of network in this case is limited to act as a passive reference source in providing a common frequency or timing to the UEs.

As depicted in FIG. 2, the UEs belonging to operator A are within the coverage area of operator B, but outside the coverage area of operator A. In order to perform D2D-U operations in such a situation (unavailability of the operator A), the UEs can obtain time and frequency reference information of the operator B, in order to synchronize their D2D-U transmissions. In other words, the UEs can utilize operator B as a synchronization source. Thereafter, the UEs can utilize preconfigured parameters and discovery resource to discover each other and perform D2D-U communication.

Figure 3:
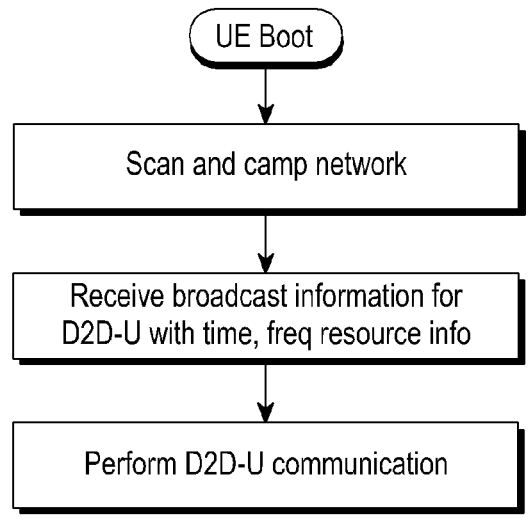
FIG. 3 is a flowchart of a D2D-U operation in Active Network Assisted (ANA) mode, according to embodiment.

FIG. 3 is a flowchart of a D2D-U operation in Active Network Assisted (ANA) mode, according to embodiment In ANA mode, the network can assist the UEs within its coverage area by providing information, which helps the UEs to set up D2D-U communication. The information provided by the network can include, but not limited to, broadcast information such as system information elements, time and frequency reference information for synchronization, time and frequency resources for discovery and communication, set of unlicensed channels to be used for discovery and communication, and so on. The information can be periodically updated by the network.

Figure 4:
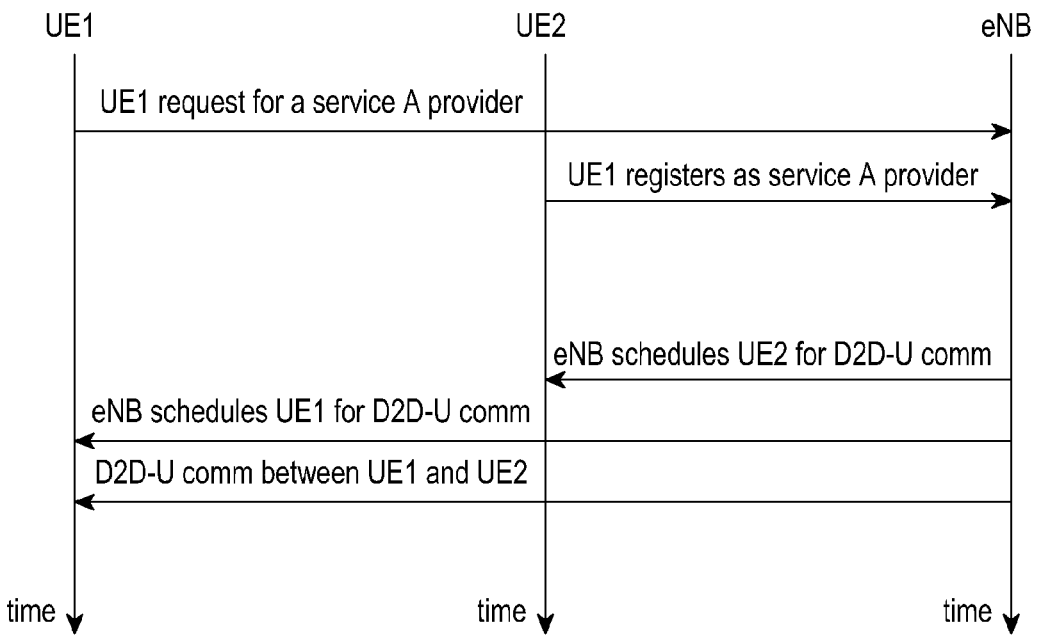
FIG. 4 is a flow diagram of a signaling exchange between User Equipments (UEs) and a network for D2D-U operation in Network Controlled (NC) mode, according to embodiment.

FIG. 4 is a flow diagram of a signaling exchange between User Equipments (UEs) and a network for D2D-U operation in Network Controlled (NC) mode, according to embodiment. In this mode, the D2D-U operation can be completely controlled by the network. The UEs can inform the network about their intent to perform D2D-U communication. The network can monitor the location and other parameters of the UEs and intimate the UEs when there is an opportunity to perform D2D-U communication.

As depicted in FIG. 4, UE1 can inform the network (eNB) about its intention for initiating D2D-U communication with UE2, when the UE2 registers with the eNB, by requesting the eNB to provide services for initiating D2D-U communication with the UE2. The network can, thereafter, track the locations of UE1 and UE2. When the UE1 and the UE2 within the range of each other to perform D2D-U communication, the eNB can schedule a D2D-U communication between the two UEs and transmit scheduling information to the UEs over licensed bands. The UE1 and UE2 can perform D2D-U communication using the scheduled resources.

Figure 5:
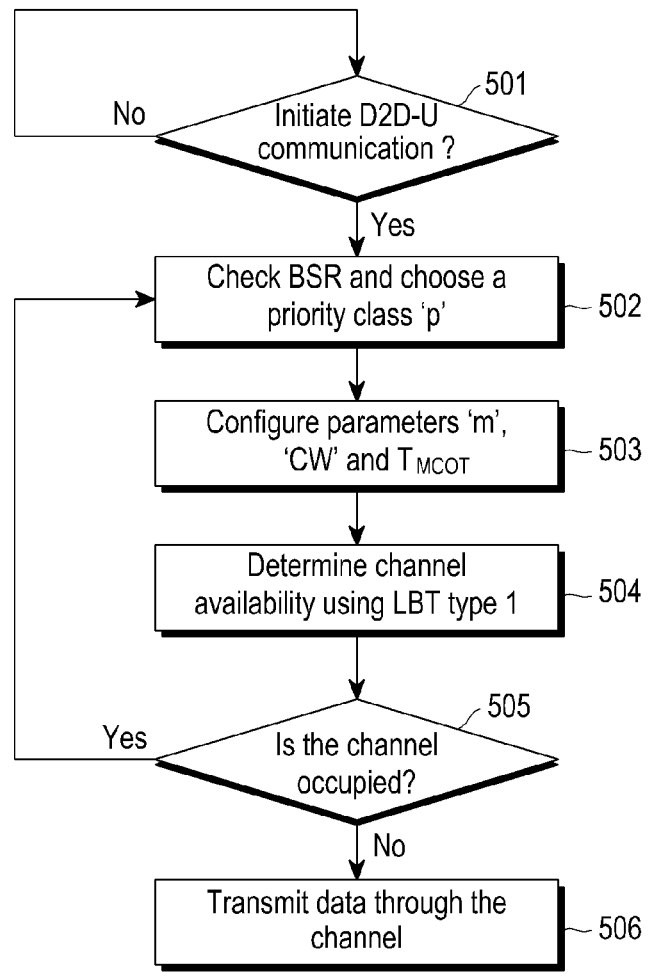
FIG. 5 is a flowchart of a method for determining accessibility of an unlicensed channel for D2D-U operation, according to embodiment.

FIG. 5 is a flowchart of a method for determining accessibility of an unlicensed channel for D2D-U operation, according to embodiment. At step 501, the method includes determining whether a UE intends to initiate D2D-U communication by transmission of data. Considering that the UE intends to transmit data, at step 502, the method includes checking Buffer Status Report (BSR), and depending on the BSR, choosing a priority class 'p' to be used for channel access. At step 503, the method includes configuring parameters 'm' (Number of time slots, each of 9 µs, in a defer time duration $T_d$), 'CW' (Size of the contention window), and '$T_{mcot}$' (maximum duration the UE can be allowed to transmit contiguously after a successful Listen Before Talk (LBT) procedure). The parameters can be defined based on the priority class 'p'. At step 504, the method includes determining availability of the channel, to access the channel, using LBT type 1. At step 505, the method includes determining the result of channel (D2D-U) access. If the channel is free, the method includes, at step 506, transmitting D2D-U data through the unlicensed spectrum. If the channel is busy (occupied), the method includes performing step 502.

The various actions in the flowchart 500 may be performed in the order presented, in a different order or simultaneously. Further, in some embodiments, some actions listed in FIG. 5 may be omitted.

Figure 6:
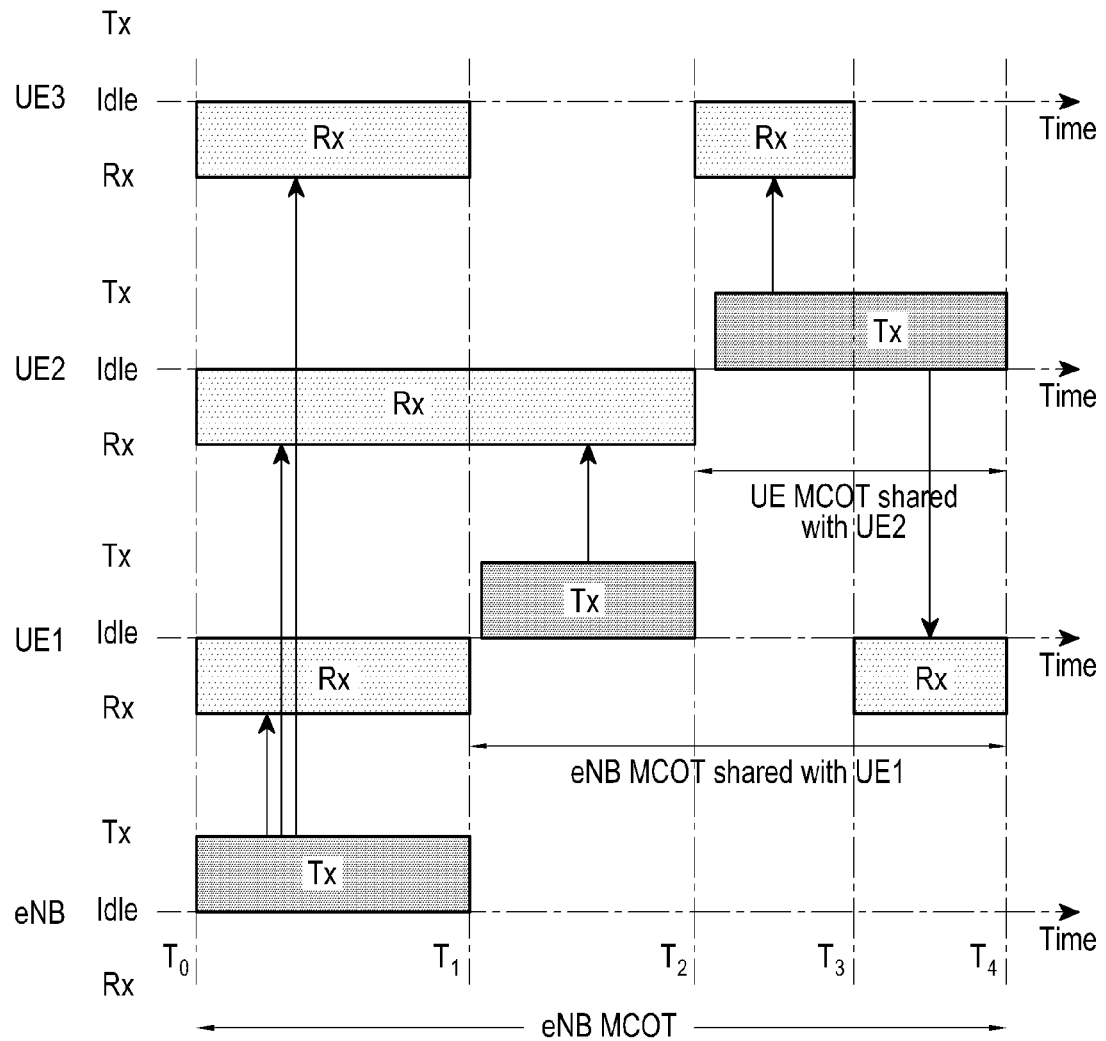
FIG. 6 is an illustration of D2D-U communication by enabling sharing of Maximum Channel Occupancy Time (MCOT) of UEs and evolved Node B (eNB), according to embodiment.

FIG. 6 is an illustration of D2D-U communication by enabling sharing of Maximum Channel Occupancy Time (MCOT) of UEs and evolved Node B (eNB), according to embodiment. The embodiments allow an eNB or a UE to share their respective MCOTs with other UEs for D2D-U communication. A UE which had borrowed a MCOT from the eNB or the UE can perform a check for a short duration (for example: 25 µs), to detect whether a channel, on which D2D-U communication is to be performed, is idle.

As detected in FIG. 6, an eNB can occupy the channel at an instant $T_0$. The eNB can be allowed to occupy the channel for the MCOT duration, i.e., till an instant $T_4$. The eNB can schedule D2D-U communication between UE1 and UE2, and share its MCOT with UE1 at an instant $T_1$. The UE1 can perform a channel access check (determine channel availability) at the instant $T_1$ and initiate D2D-U communication with UE2 on determining the channel to be idle. The UE1 can share the channel with UE2 at an instant $T_2$. The UE2 can perform a channel access check at the instant $T_2$ and initiate D2D-U communication with a UE3 on determining the channel to be idle. The UE2 continues to communicate with UE3 till an instant $T_3$. The UE2 can initiate communication with UE1 at the time instant T3 and continue the communication till an instant $T_4$.

Figure 7:
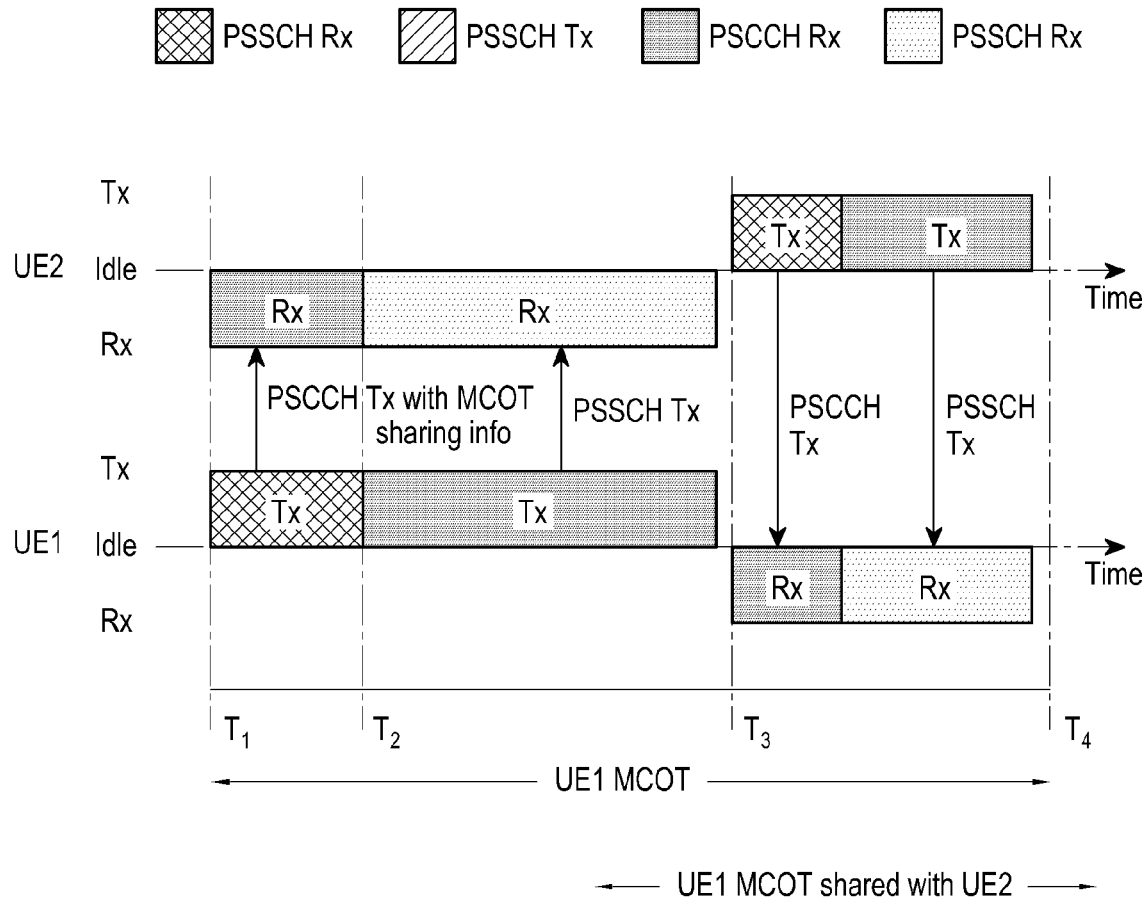
FIG. 7 is an illustration of a data transmission using MCOT sharing, according to embodiment.

FIG. 7 is an illustration of a data transmission using MCOT sharing, according to embodiment. MCOT sharing can be used for achieving faster communication between UEs without compromising on inter Radio Access Technology (RAT) coexistence fairness, due to the usage of short channel sensing durations. The UE1 obtains access to the channel at the instant $T_1$ and schedules D2D-U transmission to UE2. At the instant $T_1$ the UE1 transmits PSCCH and at an instant $T_2$ the UE1 transmits PSSCH. The PSCCH data and include MCOT sharing information. The MCOT sharing information can indicate that the MCOT of UE1 is shared with the UE2 at an instant $T_3$. At the instant $T_3$, the UE2 can choose a channel sensing method to determine the channel availability. On sensing the channel to be idle, UE2 initiates PSCCH transmission at the instant $T_3$.

Figure 8:
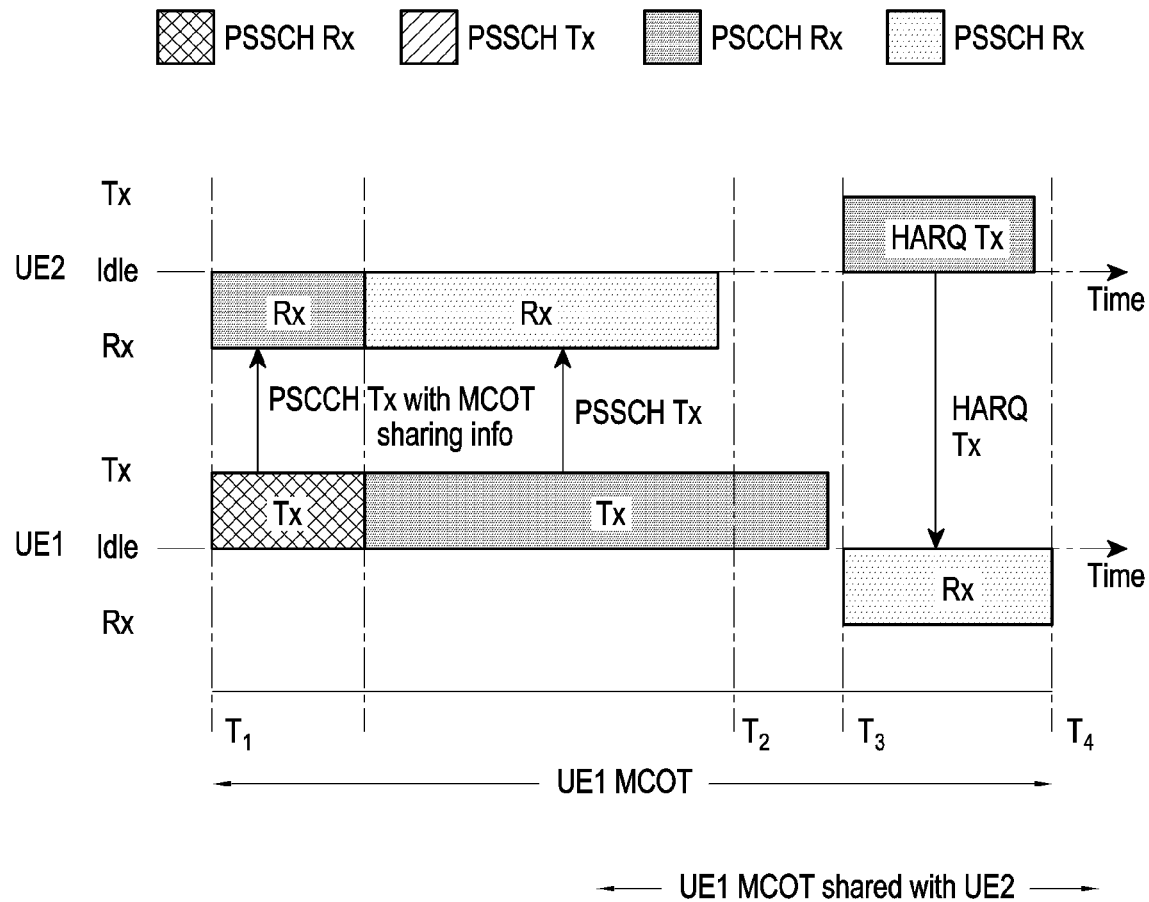
FIG. 8 is an illustration of a MCOT sharing to achieve Hybrid Automatic Repeat Request (HARM) feedback in D2D-U operation, according to embodiment.

FIG. 8 is an illustration of a MCOT sharing to achieve Hybrid Automatic Repeat Request (HARQ) feedback in D2D-U operation, according to embodiment. As depicted in FIG. 8, UE1 initiates transmitting data to UE2 at an instant $T_1$. The transmitted data can include the MCOT sharing information for HARQ feedback. In an example, the data can be transmitted using PSCCH. After receiving the transmitted data till an instant T2, UE2 transmits, at an instant $T_3$, HARQ feedback to UE1 on the channel, at the MCOT shared by UE1.

Figure 9:
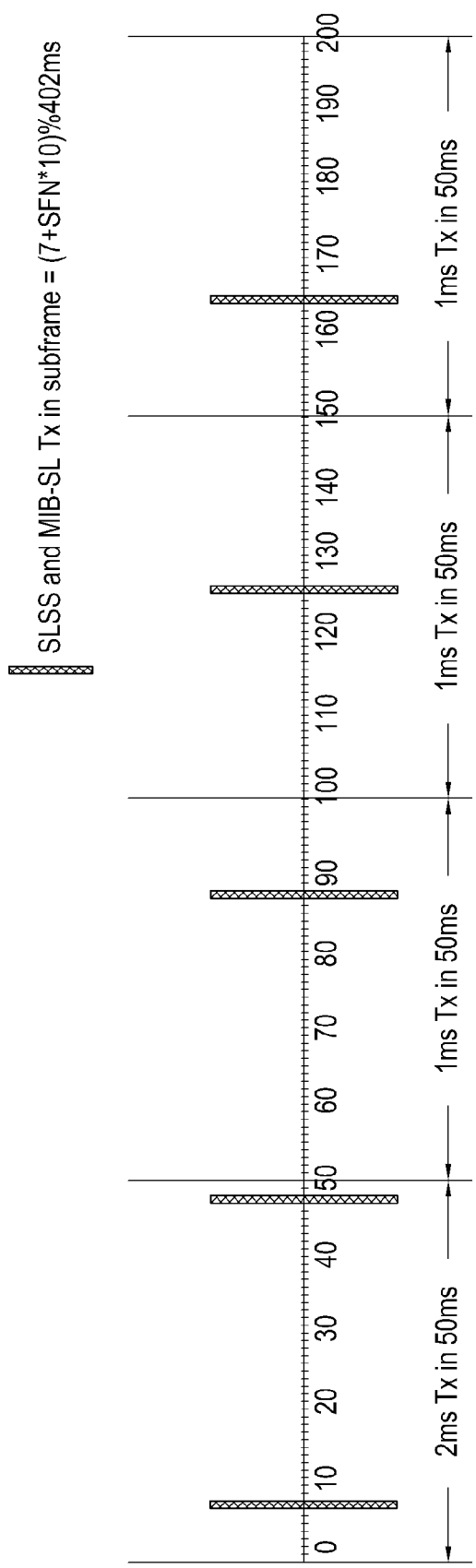
FIG. 9 is an illustration of a periodic transmissions of Sidelink Synchronization Signal (SLSS) and Master Information Block-Sidelink (MIB-SL) using Short Control Signaling (SCS) for D2D-U, according to embodiment.

FIG. 9 is an illustration of a periodic transmissions of Sidelink Synchronization Signal (SLSS) and Master Information Block-Sidelink (MIB-SL) using Short Control Signaling (SCS) for D2D-U, according to embodiment. Using subcarrier spacing a device can be allowed to transmit control and management signals without sensing the channel, subject to the condition that the total duration of such transmissions shall not exceed 2.5 ms over a period of 50 ms (5% duty cycle). For D2D-U, the SLSS and the MIB-SL can be transmitted at preconfigured SFs with a periodicity of 40 ms. The periodicity of the SLSS and the MIB-SL can be same as that of SCS. This can allow low complexity D2D-U synchronization since a UE, over a period of 40 ms, can be expected to receive broadcasts from the vicinity with a degree of certainty.

As depicted in FIG. 9, the SLSS and the MIB-SL can be transmitted in SF 7 with periodicity of 40 ms, using SCS for D2D-U. The SLSS and the MIB-SL can be transmitted by a UE in unlicensed band when the condition SF=(7+SFN*10) %40 is met, wherein SFN is system frame number maintained by the UE. The signals can be transmitted irrespective of whether the channel is idle or not, while meeting the requirement of 5% duty cycle over the 50 ms time period. For D2D-U transmissions conformance of dynamic frequency selection may be necessary.

Figure 10A:
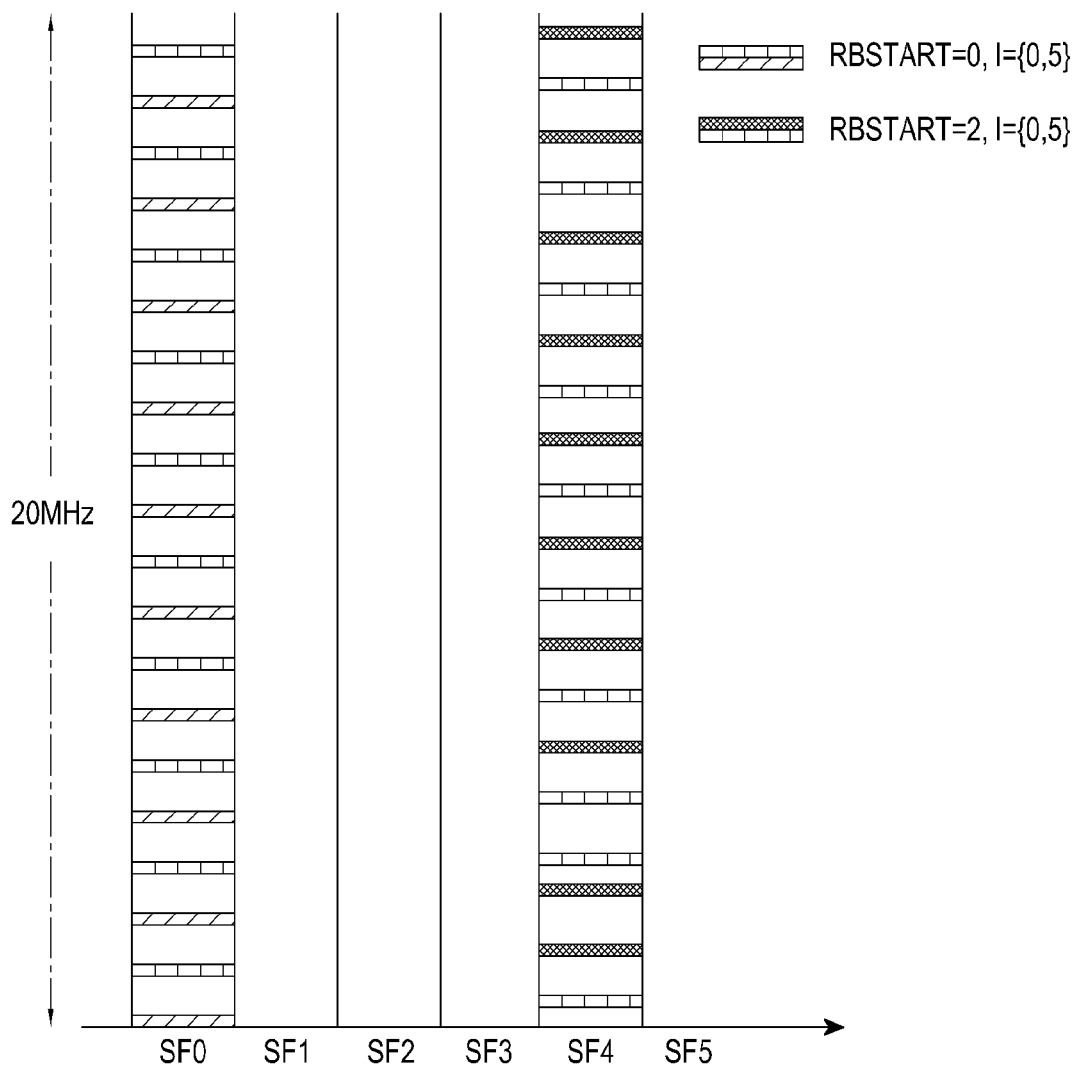
FIGS. 10A and 10B are illustrations of an allocation of frequency resources across unlicensed spectrum bandwidth using interlaces, according to embodiment.
Figure 10B:
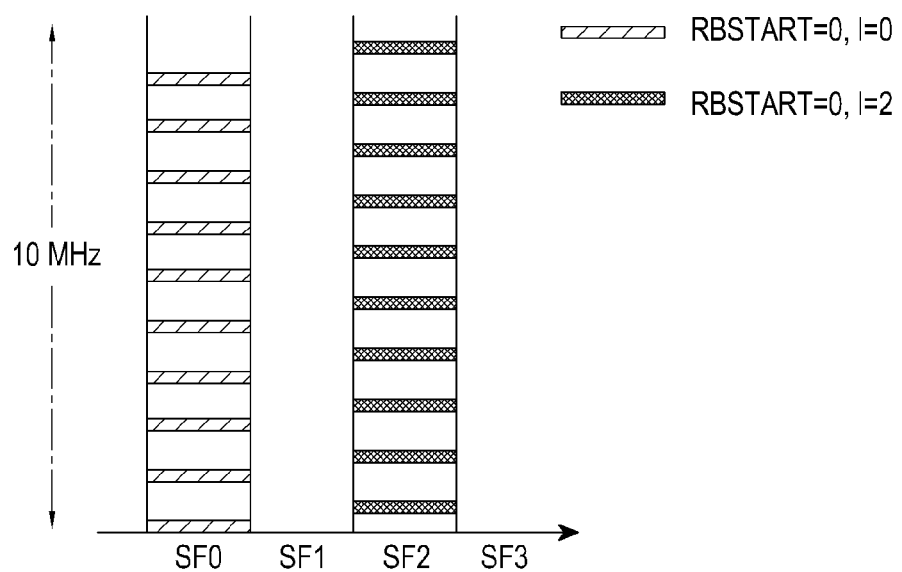

FIGS. 10A and 10B are illustrations of an allocation of frequency resources across unlicensed spectrum bandwidth using interlaces, according to embodiment. In order to meet the regulatory minimum bandwidth requirement criterion for unlicensed band operation, a set of PRBs, allocated for D2D-U transmission, are spread either uniformly or non-uniformly across the bandwidth. Interlace can be a set of 10 PRBs equally spaced across the bandwidth and a device can be allotted more than one interlace for D2D-U communication.

A set of 10 PRBs per interlace can be used for both 20 MHz and 10 MHz as resource units for UL (D2D-U) transmission. As depicted in FIG. 10A, a pair of interlaces (20 PRBs) are allocated in 20 MHz bandwidth, with separation of 5 PRBs between the PRBs allocated for D2D-U transmission. The starting PRB ($RB_{START}$) in SF 0 and SF 4 are 0 and 2 respectively. Each interlace can be allocated to an individual device. As depicted in FIG. 10B, a single interlace is allocated to a device in the 10 MHz bandwidth. A separation of 5 PRBs can exist between the PRBs allocated for D2D-U operation. The $RB_{START}$ in SF0 and SF2 can be 0 and 2 respectively.

Figures 11A, 11B, 11C:
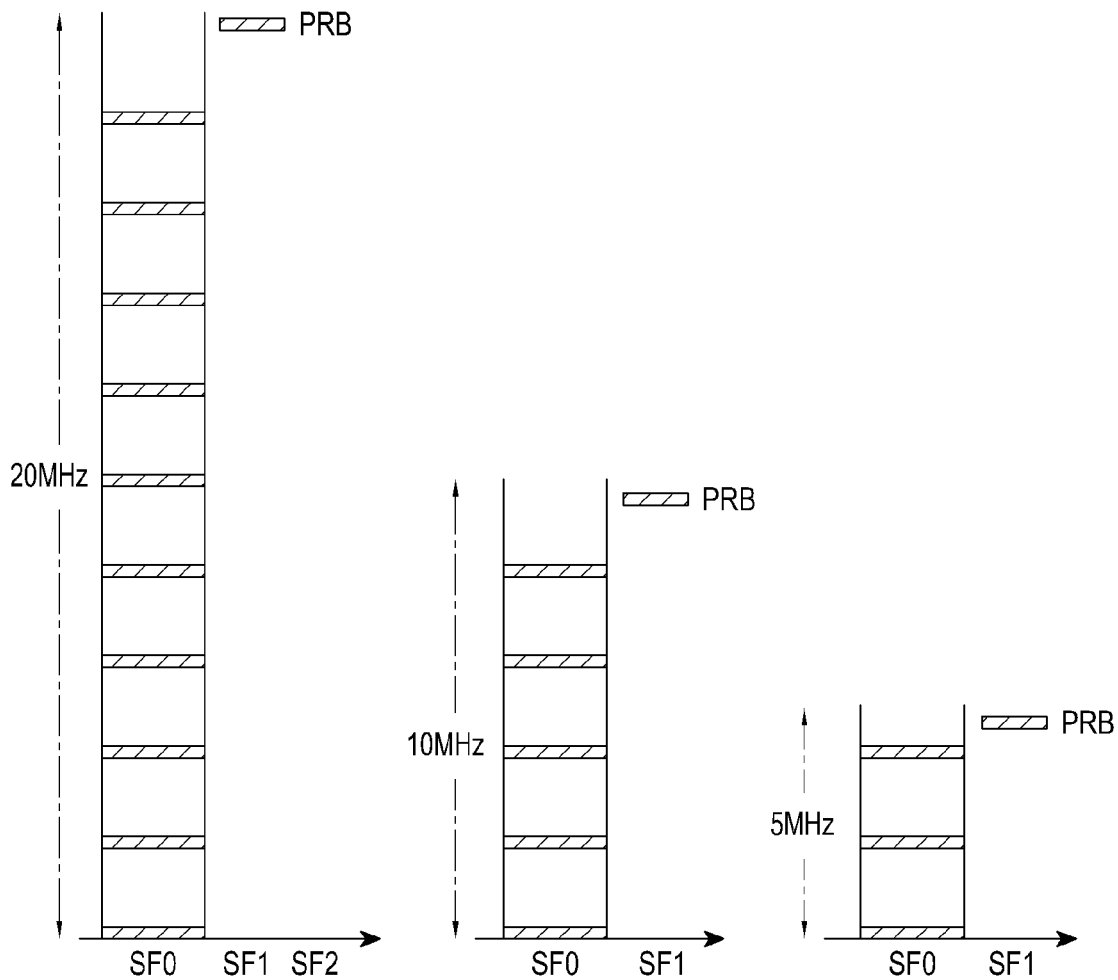
FIGS. 11A-11C are illustrations of a bandwidth dependent PRB allocation for D2D-U transmission, according to embodiment.

FIGS. 11A-11C are illustrations of a bandwidth dependent PRB allocation for D2D-U transmission, according to embodiment. For D2D operation in unlicensed bands, a resource unit can be defined with a certain number of PRBs, which can be spread across the unlicensed spectrum bandwidth. The number of PRBs allocated for D2D-U transmission can be either constant or can be function of bandwidth. In the examples, as depicted in FIGS. 11A-11C, the number of PRBs allocated for D2D-U transmission per interlace for bandwidths 20 MHz, 10 MHz and 5 MHz can be 10, 5 and 3 respectively. The number of resource units (PRBs) may remain same for all the bandwidths. This can provide flexibility to distribute the resources in smaller chunks amongst the devices involved in D2D-U operations. The rate-matching can be dependent on bandwidth.

Figure 12A:
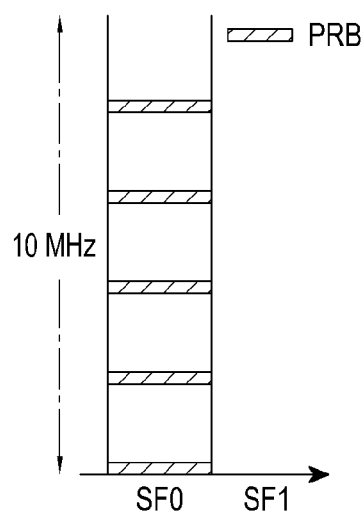
FIGS. 12A and 12B are illustrations of an allocation of Physical Resource Blocks (PRBs), wherein number of allocated PRBs is constant, according to embodiment.
Figure 12B:
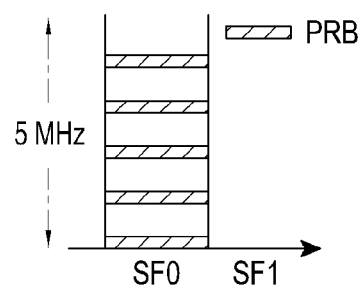

FIGS. 12A and 12B are illustrations of an allocation of Physical Resource Blocks (PRBs), wherein number of allocated PRBs is constant, according to embodiment. As depicted in FIGS. 12A and 12B, five PRBs can be allocated per interlace for 10 MHz bandwidth and 5 MHz bandwidth respectively. Although the resource definition remain same across the bandwidths (five PRBs in each interlace), the number of available resource units may decrease with bandwidth.

Figure 13A:
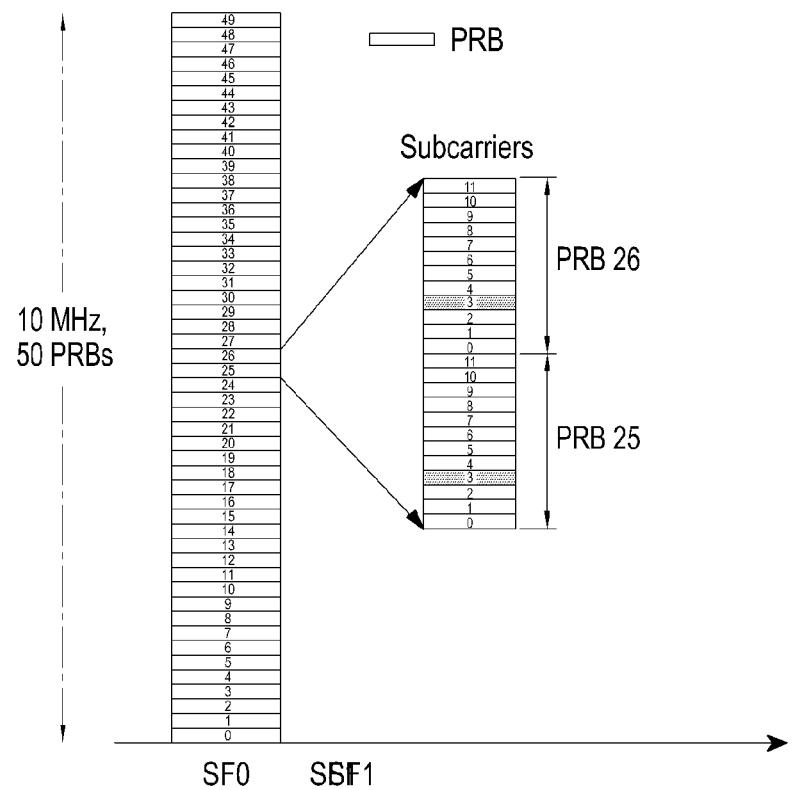
FIGS. 13A and 13B are illustrations of resource allocation for D2D-U transmission, wherein number of subcarriers allotted per PRB is dependent on bandwidth, according to embodiment.
Figure 13B:
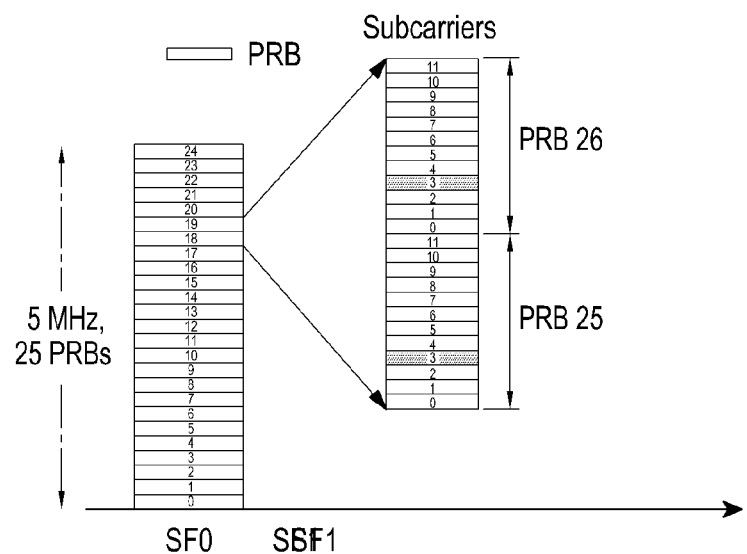

FIGS. 13A and 13B are illustrations of resource allocation for D2D-U transmission, wherein number of subcarriers allotted per PRB is dependent on bandwidth, according to embodiment. Instead of allocating PRBs, distributed uniformly across bandwidth, for D2D-U transmission, a subset of subcarriers in each PRB can be allocated for transmission of D2D-U discovery messages. The set of subcarriers allocated can be either continuous or discontinuous. The resource allocation meets the regulatory requirement for minimum bandwidth utilization for unlicensed band operation. Further, the number of subcarriers allotted in a PRB can be a constant (independent of operating bandwidth), or can be chosen based on operating bandwidth. As depicted in FIGS. 13A and 13B, the number of subcarriers in a PRB, allocated for D2D-U transmission, is dependent on the bandwidth. A single subcarrier per PRB, subcarrier 3, is allotted for 10 MHz bandwidth (FIG. 13A) and two subcarriers per PRB, subcarrier 3 and 9, are allotted for 5 MHz bandwidth (FIG. 13B). This approach allows the number of allotted subcarriers to be equal or approximately equal per resource, independent of bandwidth.

If the resource allocation is such that a single subcarrier is allocated in each PRB (FIG. 13A), the resource allocation information can be conveyed to a device by conveying the subcarrier offset '1'. For the example depicted in FIG. 13A, the device can be informed that the third subcarrier in every PRB has been allotted for D2D-U transmission by conveying that the value of '1' is 3. Hence, for all bandwidths, the number of simultaneous resources available can be equal to the number of subcarriers, i.e., 12.

If multiple subcarriers are allocated for D2D-U transmission, the resource information can be conveyed by transmitting a bitmap 'b'. For the example depicted in FIG. 13B, the bitmap 'b' equal to b=00100000010000 can be transmitted to the device to indicated the subcarriers that have been allocated to the device for D2D-U transmission.

Allocating multiple subcarriers can be achieved using a combination of common signaling and device specific signaling. If the number of subcarriers allocated for D2D-U transmission per PRB, 'n', is a system level parameter, then it may be conveyed through System Information Block (SIB). Hence, during resource allocation, by conveying the offset '1', the device can determine the subcarriers in a particular PRB, which have been allotted for D2D-U transmission, using '1' and 'n'.

In an example, consider that allocated subcarriers are equally separately in a PRB. The separation between PRB subcarriers will be 12/n, as there are 12 subcarriers in a PRB. The set of subcarriers available to the device for D2D-U transmission can be indicated by (1+k*12/n), wherein k∈{0, 1, ..., n−1}. For example, if n=3 and 1=1, set of subcarriers allocated for the UE is {1,5,9}. The number of subcarriers 'n' can be specific for a particular device and can be Radio Resource Control (RRC) configured. This can provide flexibility to achieve load or capability based resource scheduling to the devices, by allowing the network to define resource unit size in a device specific manner.

Alternatively, the subcarriers allocated for D2D-U transmission can be conveyed to the device by using a mapping function 'f' that dependent on offset '1' and a distance 'd' between the subcarriers allocated for D2D-U transmission. The function is f=(1+m*d) mod 12, m∈R. Considering the example depicted in FIG. 13B, the values of '1' and 'd' are 3 and 6 respectively.

Figure 14A:
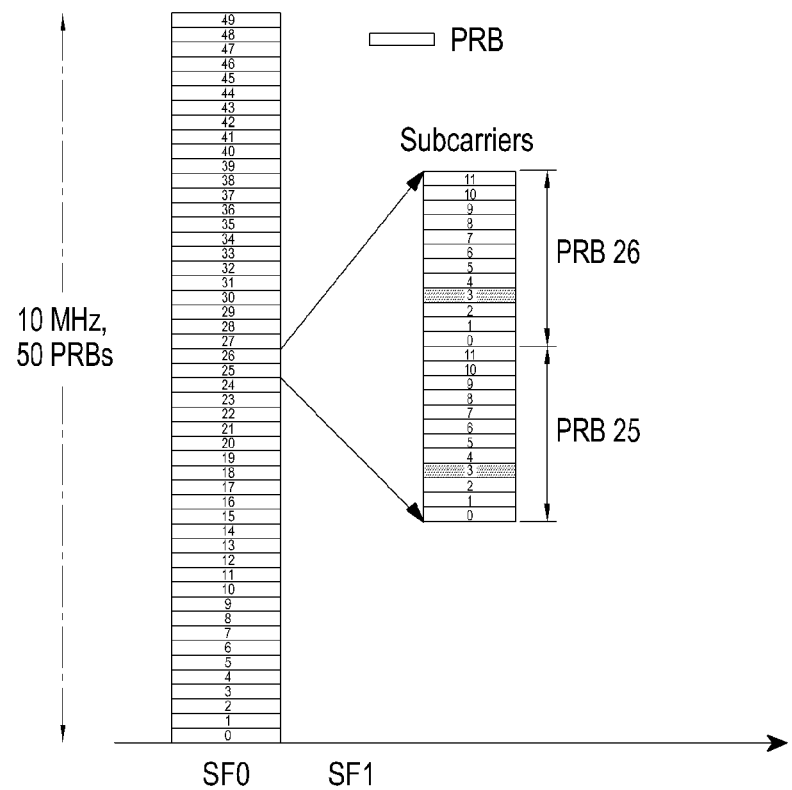
FIGS. 14A and 14B are illustrations of a resource allocation for D2D-U transmission, wherein number of subcarriers allotted per PRB is independent of bandwidth, according to embodiment.
Figure 14B:
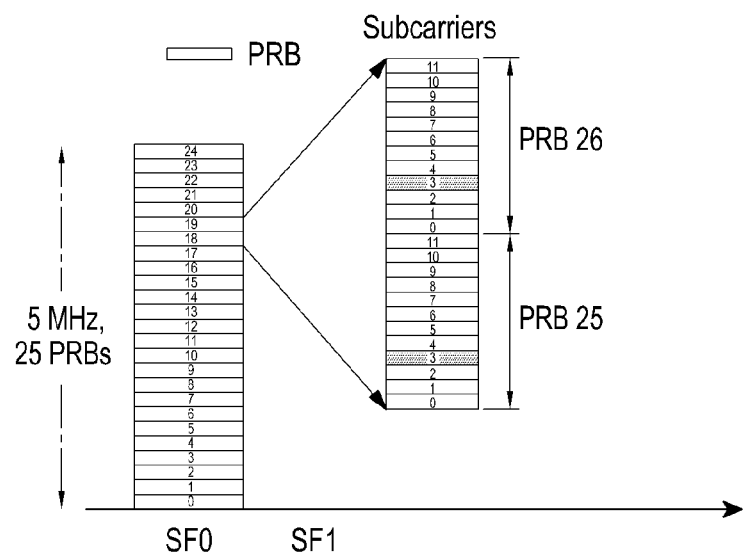

FIGS. 14A and 14B are illustrations of a resource allocation for D2D-U transmission, wherein number of subcarriers allotted per PRB is independent of bandwidth, according to embodiment. As depicted in FIG. 14A, for 10 MHz bandwidth, subcarrier 3 in each PRB is allocated for D2D-U transmission. As depicted in FIG. 14B, for 5 MHz, subcarrier 3 is allotted in each PRB is allocated for D2D-U transmission. Thus, the number of subcarriers allocated for D2D-U transmission can vary.

Figure 15A:
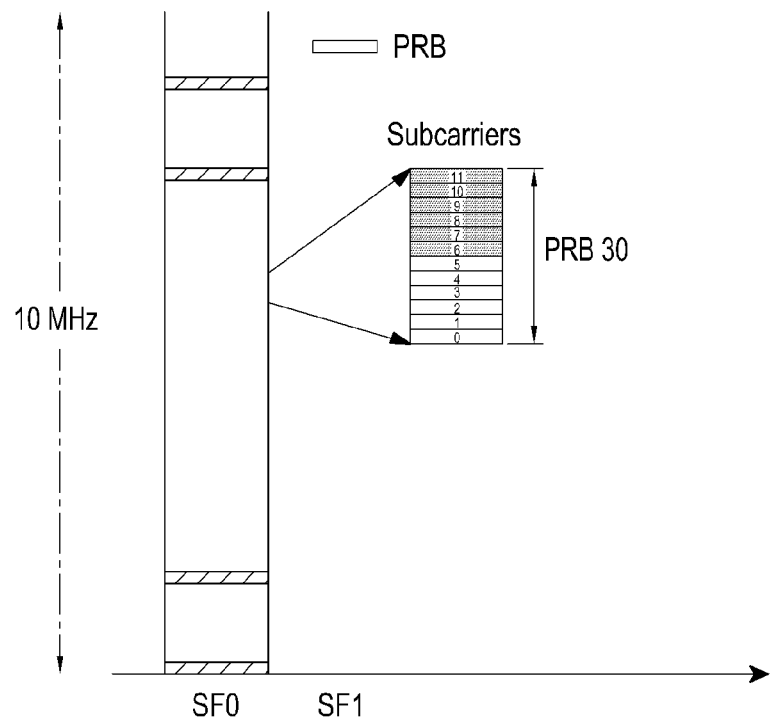
FIGS. 15A and 15B are illustrations of a resource allocation for D2D-U transmission, wherein the resource allocation is a hybrid of PRB and subcarrier based allocation, according to embodiment.
Figure 15B:
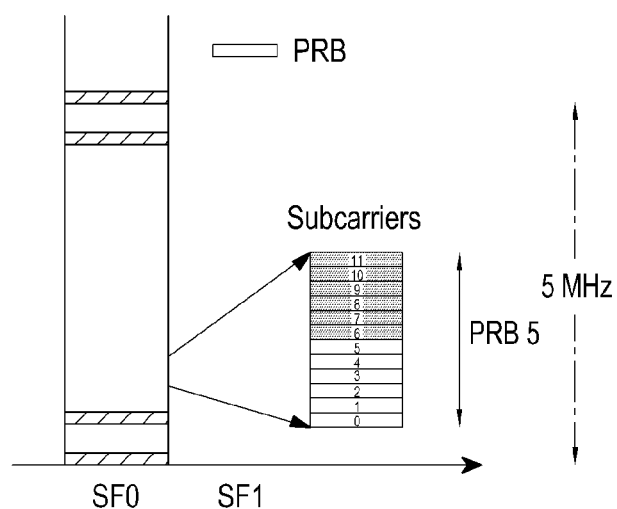

FIGS. 15A and 15B are illustrations of a resource allocation for D2D-U transmission, wherein the resource allocation is a hybrid of PRB and subcarrier based allocation, according to embodiment. As depicted in FIGS. 15A and 15B, the resource set allocated for D2D-U transmission comprises of a set of PRBs and a set of subcarriers within each PRB among the set of PRBs. As depicted in FIGS. 15A and 15B, specific PRBs and subcarriers 6-12 within the specific PRBs are allocated for D2D-U transmission for 10 MHz and 5 MHz bandwidth respectively.

Figures 16A, 16B:
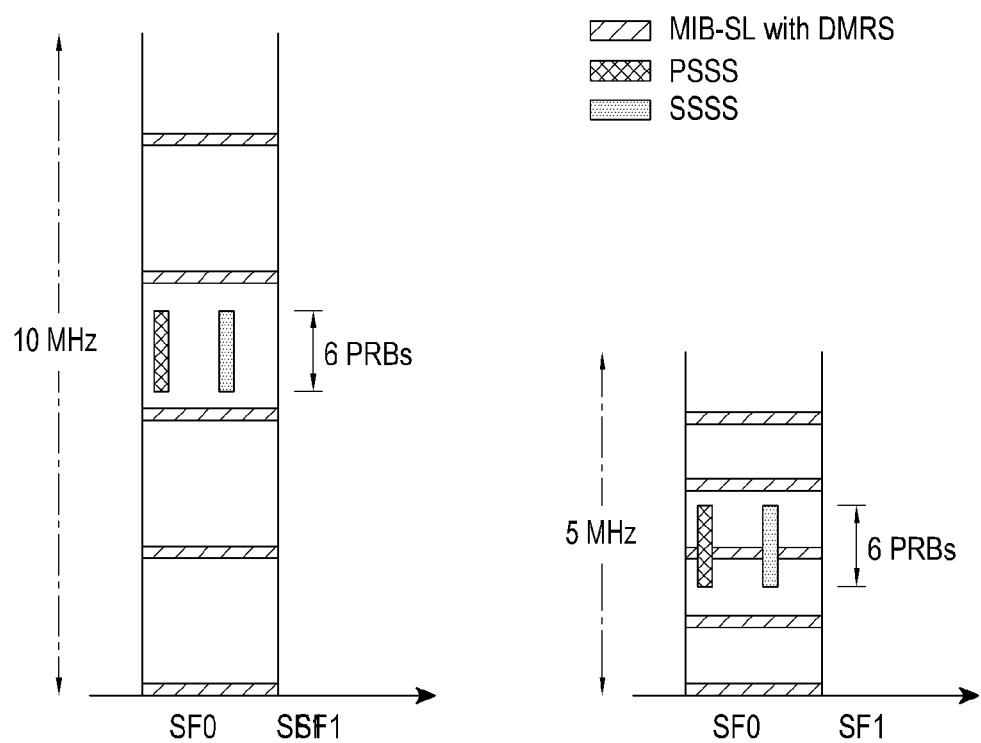
FIGS. 16A and 16B are illustrations of a mapping of Physical Sidelink Broadcast Channel (PSBCH) for 10 MHz bandwidth and 5 MHz bandwidth respectively, based on PRB based interlace, according to embodiment.

FIGS. 16A and 16B are illustrations of a mapping of Physical Sidelink Broadcast Channel (PSBCH) for 10 MHz bandwidth and 5 MHz bandwidth respectively, based on PRB based interlace, according to embodiment. In D2D, the PSBCH is transmitted in center 6 PRBs of the unlicensed spectrum bandwidth at preconfigured SFs. The PSBCH comprises of SLSS, consisting of Primary Sidelink Synchronization Signal (PSSS) and Secondary Sidelink Synchronization Signal (SSSS); MIB-SL; and Demodulation Reference Signal (DMRS), for channel estimation. The PSBCH can be transmitted with a periodicity of 40 ms, whenever the transmission is periodic.

SLSS transmissions can be limited to center 6 PRBs as it minimizes the complexity of synchronization design procedure. The regulatory requirement of meeting the minimum transmission bandwidth for D2D operations in unlicensed band can be achieved by re-mapping MIB-SL transmissions. The SLSS can be transmitted in center 6 PRBs of the unlicensed bandwidth and the symbol mapping for PSSS and SSSS came be same as that in LTE D2D. The symbols of the centre 6 PRBs in a SF, in which PSSS are mapped, are ($N_{Sym}^{DL}-6$, $N_{Sym}^{DL}-5$). The symbols of the centre 6 PRBs in a SF, in which SSSS are mapped, are ($2*N_{Sym}^{DL}-6$, $2*N_{Sym}^{DL}-5$)

The rate matching of MIB-SL can be performed in all PRBs allocated for D2D-U transmissions while excluding DMRS symbols in each of the allocated PRBs. If there is an overlap of MIB-SL symbols with SLSS symbols, which are transmitted on the center 6 PRBs, then the MIB-SL transmissions corresponding to those symbols are not considered for mapping.

As depicted in FIG. 16A and FIG. 16B, the MIB-SL, along with DMRS, can be mapped to multiple PRBs spread across the 10 MHz bandwidth and 5 MHz bandwidth respectively. The total number of allocated PRBs can be either dependent or independent of the bandwidth of the unlicensed spectrum. The MIB-SL can be mapped to 5 PRBs with each of them separated by 10 and 5 PRBs for 10 MHz and 5 MHz bandwidth respectively. Further, the DMRS can be transmitted along with MIB-SL to aid in channel estimation and the SLSS can be mapped to center 6 PRBs. The MIB-SL contents are encoded and appropriately rate matched to 5 PRBs. As depicted in FIG. 16B, there can be an overlap between the SSSS and MIB-SL symbols at certain PRBs of a SF. The MIB-SL symbols in the overlapped region are not considered for decoding.

FIGS. 17A and 17B are illustrations of a mapping of PSBCH for 10 MHz bandwidth and 5 MHz bandwidth respectively, based on tone based interlace, according to embodiment. The MIB-SL transmissions can be mapped to a subset of tones (subcarriers) in each PRB, within the bandwidth. Within a PRB, the mapped subcarriers may or may not be equally separated from each other. As depicted in FIG. 17A, the mapped subcarriers in each PRB can be equally separated from each other within the 5 MHz bandwidth. In each of the PRBs, the MIB-SL transmissions can be mapped to 3 subcarriers, viz., subcarriers 0, 4 and 8. The DMRS is transmitted along with MIB-SL to aid in channel estimation. As depicted in FIG. 17B, the MIB-SL transmissions can be mapped in consecutive subcarriers, i.e., subcarriers 0 to 5, within each PRB in the 5 MHz bandwidth.

It can be noted that the PSSS and SSSS transmissions can be mapped in the centre 6 PRBs. If there is an overlap of the MIB-SL transmission with the PSSS and/or SSSS transmissions (overlapping of the symbols in particular PRBs), then the MIB-SL transmissions can be ignored.

Figure 18A:
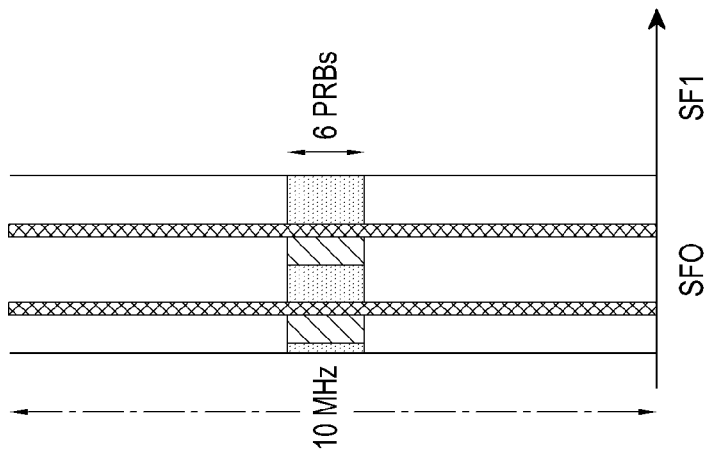
FIGS. 18A-18C are illustrations of a mapping of MIB-SL along with Demodulation Reference Signals (DRMS) across the unlicensed bandwidth, according to embodiment.
Figure 18B:
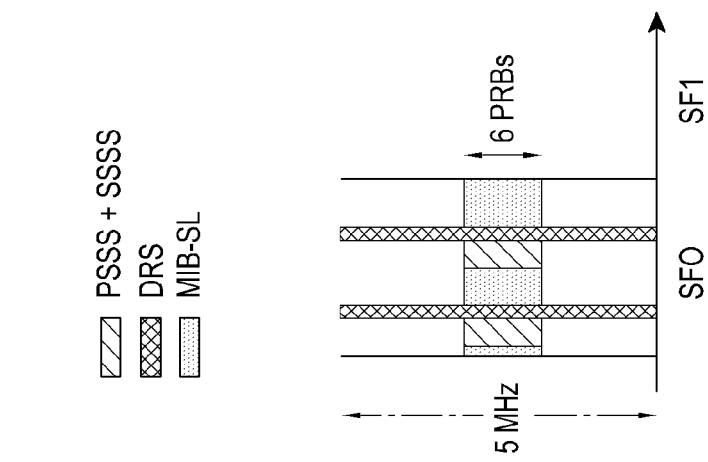
Figure 18C:
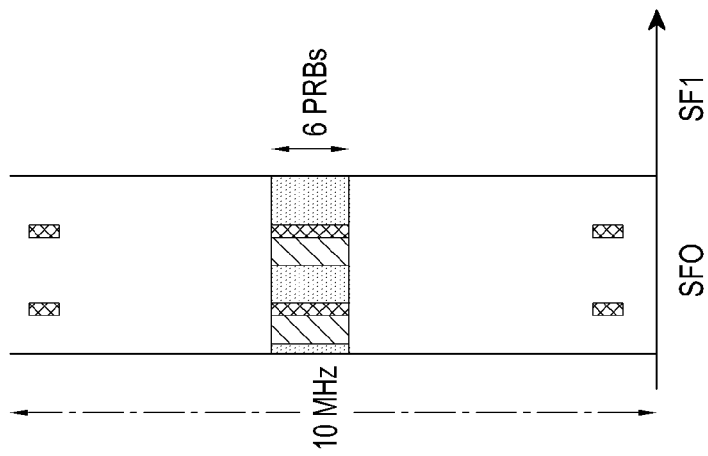

FIGS. 18A-18C are illustrations of a mapping of MIB-SL along with Demodulation Reference Signals (DRMS) across the unlicensed bandwidth, according to embodiment. The mapping approach can allow preserving of both SLSS and MIB-SL transmissions, as there is no scope of overlap between the SLSS and the MIB-SL transmissions. The DMRS can be transmitted on symbols [$N_{Sym}^{DL}-4$, $2*N_{Sym}^{DL}-4$] The DMRS transmission can be adjusted to meet the regulatory requirement of minimum bandwidth utilization for unlicensed band operation. The DMRS transmission can be mapped in the symbols in all PRBs across the 10 MHz (FIG. 18A) bandwidth and 5 MHz (FIG. 18B) bandwidth.

As the DMRS transmission is mapped across the entire bandwidth to meet the minimum bandwidth requirement, if there is an overlap with another transmission on the same frequency resource; then the DMRS transmission can have least priority. In an example, if a DMRS transmission on a PSBCH SF overlaps with a frequency resource allocated for transmission of a D2D-U discovery message, then the transmission of the D2D-U discovery message can be prioritized by the device. Alternatively, as depicted in FIG. 18C, the mapping of DMRS transmissions can be limited to a few PRBs at the edges of the bandwidth to allow greater concentration of transmitted power to the PSBCH, PSSS, and SSSS signals.

Figure 19:
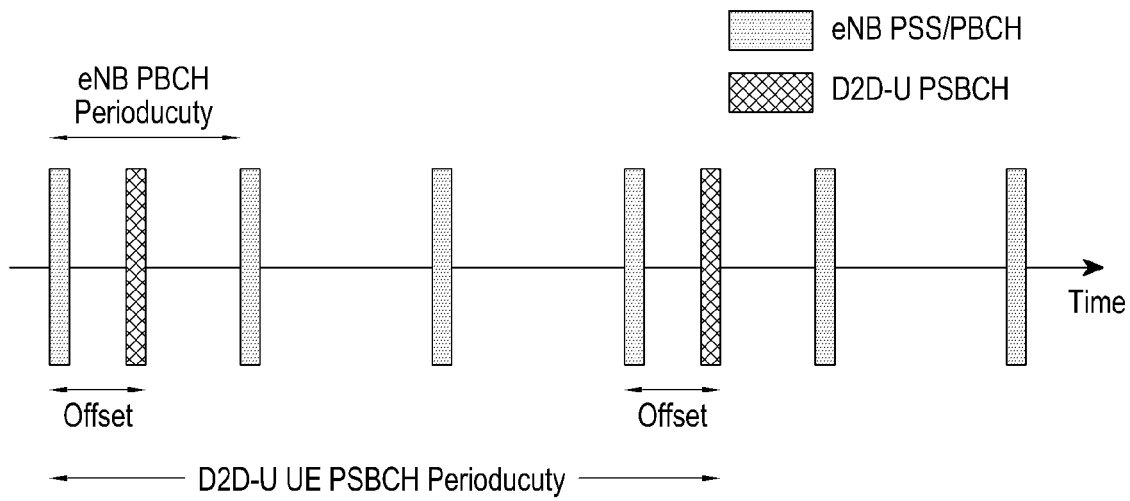
FIG. 19 is an illustration of a scenario wherein transmission of PSBCH can be based on timing reference obtained from a network, according to embodiment.

FIG. 19 is an illustration of a scenario wherein transmission of PSBCH can be based on timing reference obtained from a network, according to embodiment. A device can initiate D2D-U transmission at a time instant based on the timing reference. The source or entity from which the timing reference is obtained can be referred to as a synchronization reference (SyncRef) source. In an example, a first device can initiate D2D-U communication with a second device by transmitting PSBCH at a time instant, wherein the time instant chosen for PSBCH transmission is based on the timing reference obtained from the network. Herein, the network acts as the SyncRef source. The first device can synchronize with the second device and transmit PSBCH at a particular SF and SFN, wherein the SF and SFN to transmit PSBCH can be determined based on SF and SFN at which PSBCH is transmitted by the second device. Herein, the second device can act as the SyncRef source for the first device. The network can act as the SyncRef source for the second device. The timing reference can be obtained either from the network, if available, or using preconfigured information. A device which obtains the timing reference either randomly or from the preconfigured information can perform the role of a cluster head by acting as SyncRef source and providing timing reference to other devices in its vicinity.

The timing reference can be obtained either from the network, if the device is camped within coverage area of a network, i.e., in PNA, ANA, and NC modes; or from another device in SO mode. In both scenarios, the UE can transmit the PSBCH (or initiate D2D-U operations) at a time instant based on the timing reference, which can be obtained from a SyncRef source. Additional conditions may need to be satisfied prior to initiation of the PSBCH transmission. In an example, a device can be instructed to broadcast PSBCH information only if the device is located on the edge of the coverage area of a cell using measured Reference Signal Receive Power (RSRP) of the cell in the NC and the ANA mode.

As depicted in FIG. 19, it can be considered that a D2D-U UE (device) is camped on a cell of a network. The UE can consider the time instant at which Primary Synchronization Signal (PSS) and/or Physical Broadcast Channel (PBCH) are transmitted, as the timing reference. The eNB, transmitting the PSS and PBCH can act as the SyncRef source for D2D-U PSBCH transmission. Periodicity of the PSBCH transmission for D2D-U can be same with or different from the PSS and/or PBCH transmission. If offset between PSS/PBCH and PSBCH transmission is static (available as a preconfigured value in D2D-U UE), then all UEs (devices) with the same SyncRef source can transmit PSBCH at the same time.

Alternatively, the SyncRef source can signal the D2D-U UE to transmit PSBCH (only in NC mode). For example, the SF in which the PSBCH has to be transmitted can be determined by the UE from the equation $SF_{PSBCH}=(SF+10*SFN) \bmod P$, wherein P is the periodicity in millisecond, SF and SFN at which the SyncRef source transmits PSS/PBCH, and $SF_{PSBCH}$ is the SF at which the UE can perform PSBCH transmission. If $SF_{PSBCH}$ is 21 and P is 40, then the PSBCH can be transmitted in the $21^{st}$ SF once every 40 ms.

Figure 20:
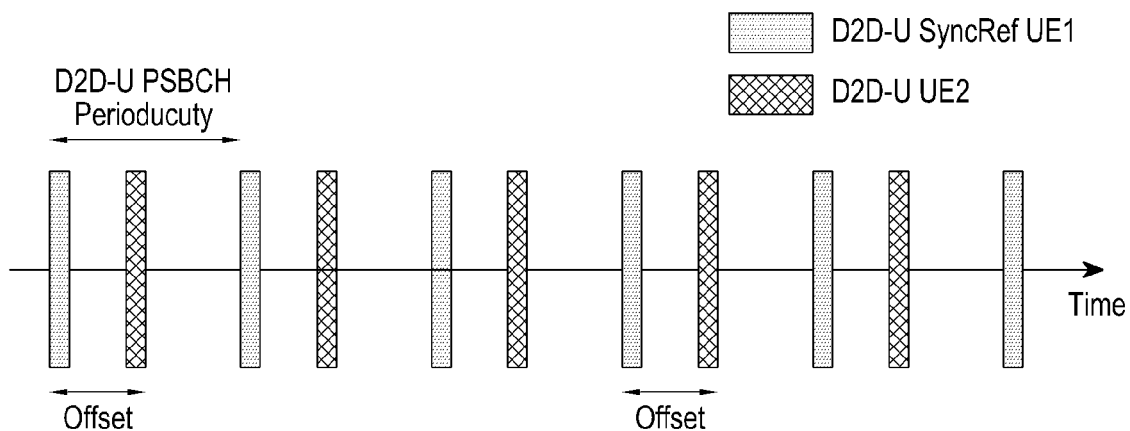
FIG. 20 is an illustration of a scenario wherein transmission of PSBCH by a device (UE2) can be based on timing reference obtained from another device (UE1), according to embodiment.

FIG. 20 is an illustration of a scenario wherein transmission of PSBCH by a device (UE2) can be based on timing reference obtained from another device (UE1), according to embodiment. Consider that the SyncRef source to be the UE1. The time instant at which the PSBCH is transmitted by UE2 can be derived from the time instant at which the UE1 transmits the PSBCH. The UE2 can transmit the PSBCH when appropriate conditions are satisfied with a periodicity same as that of UE1. The SF at which the PSBCH is to be transmitted can be derived from the equation $SF_{PSBCH}=(SF+10*SFN)$, wherein SF and SFN at which the UE1 transmits PSBCH, and $SF_{PSBCH}$ is the SF at which the UE2 can perform PSBCH transmission.

Consider that devices involved in D2D-U communications are UEs.

In the absence of a network or D2D-U networks in the vicinity (SO mode), timing reference may not be available to a UE to perform D2D-U communications. Without the timing reference, obtained from a SyncRef source, the UE may not be able to transmit PSBCH. In such a scenario, the UE can establish a D2D-U network prior to initiating D2D-U operations. The UE can transmit PSBCH to other UEs for it to be discovered. The UE can transmit the PSBCH based on a selected timing reference ($T_{ref}^{D2D-U}$). The timing reference can be selected using one of the following methods:

Random method: The timing reference used for initiating PSBCH transmission can be chosen randomly. The UE, after exhausting the list of options for detecting a SyncRef source, can randomly select a time instant $T_{ref}^{D2D-U}$ and initiate PSBCH transmission. Other UEs, involved in D2D-U operations, can consider $T_{ref}^{D2D-U}$ as timing reference and initiate PSBCH transmission at a time instant based on the timing reference.

Global Positioning System (GPS) based method: The timing reference can be selected based on GPS timing. The UE can obtain timing information from a GPS module and select $T_{ref}^{D2D-U}$ to meet certain boundary conditions for GPS timing. For example, PSBCH transmissions can be allowed to start only at 1 second boundaries. This can limit other UEs, scanning for D2D-U network, to look for PSBCH transmissions at 1 second boundaries, thus reducing complexity of D2D-U network detection. Further, an offset timing can be introduced, based on D2D-U cell ID for example, to avoid interference due to coexisting D2D-U networks.

Evolved Universal Terrestrial Radio Access (E-UTRA) Absolute Radio Frequency Channel Number (EARFCN) based method: The UE can be preconfigured with a list of EARFCNs or frequency values to scan for a timing and frequency synchronization reference, when network is not available. The UE can start scanning the frequencies from the preconfigured list and upon detecting a network in one or more frequencies, which may belong to a different operator; the UE can use the time and frequency values as synchronization reference for initiating D2D operations on unlicensed bands. It can be noted that this may not involve any communication between UE and the detected network.

The following methods can be used for choosing a SyncRef source in the absence of a network or D2D-U networks in the vicinity of the UE.

Method 1:

Step 1: Scan for at least one LTE network. Select the best eNB, amongst the eNBs of the detected LTE networks, can be used as SyncRef source for D2D-U communication.

Step 2: If a LTE network is not found, then scan at least one D2D-U network. The best D2D-U network can be used as SyncRef source, and D2D-U transmissions can be initiated at a time instant based on timing reference of the best D2D-U network.

Step 3: If step 1 and 2 fail, select a timing reference based on the random method.

Method 2:

Step 1: Scan for at least one LTE network. Select the best eNB, amongst the eNBs of the detected LTE networks, can be used as SyncRef source for D2D-U communication.

Step 2: If a LTE network is not found, then scan at least one D2D-U network. The best D2D-U network can be used as SyncRef source, and D2D-U transmissions can be initiated at a time instant based on timing reference of the best D2D-U network.

Step 3: If step 1 and 2 fail, select a timing reference based on the GPS based method.

In methods 1 and 2, when a LTE network supporting D2D-U operation is detected, the D2D-U operating mode can either be preconfigured or it may be communicated to UE by the network. In an example, a detected LTE network can indicate that it supports ANA and NC mode of D2D-U operations. The UE may then choose a particular mode of interest for D2D-U operation. If the mode of interest is NC, and the UE can indicate the same to the detected LTE network.

Method 3:

Step 1: Scan for at least one LTE network. Select the best eNB, amongst the eNBs of the detected LTE networks, can be used as SyncRef source for D2D-U communication.

Step 2: If a LTE network is not found, then scan at least one D2D-U network. The best D2D-U network can be used as SyncRef source, and D2D-U transmissions can be initiated at a time instant based on timing reference of the best D2D-U network.

Step 3: If step 1 and 2 fail, then scan for D2D SLSS/PSBCH transmissions. If SLSS/PSBCH transmissions are detected, then timing reference can be selected based on the scan.

Step 3: If step 1 and 2 fail, select a timing reference based on the random method or the GPS based method.

Figure 21:
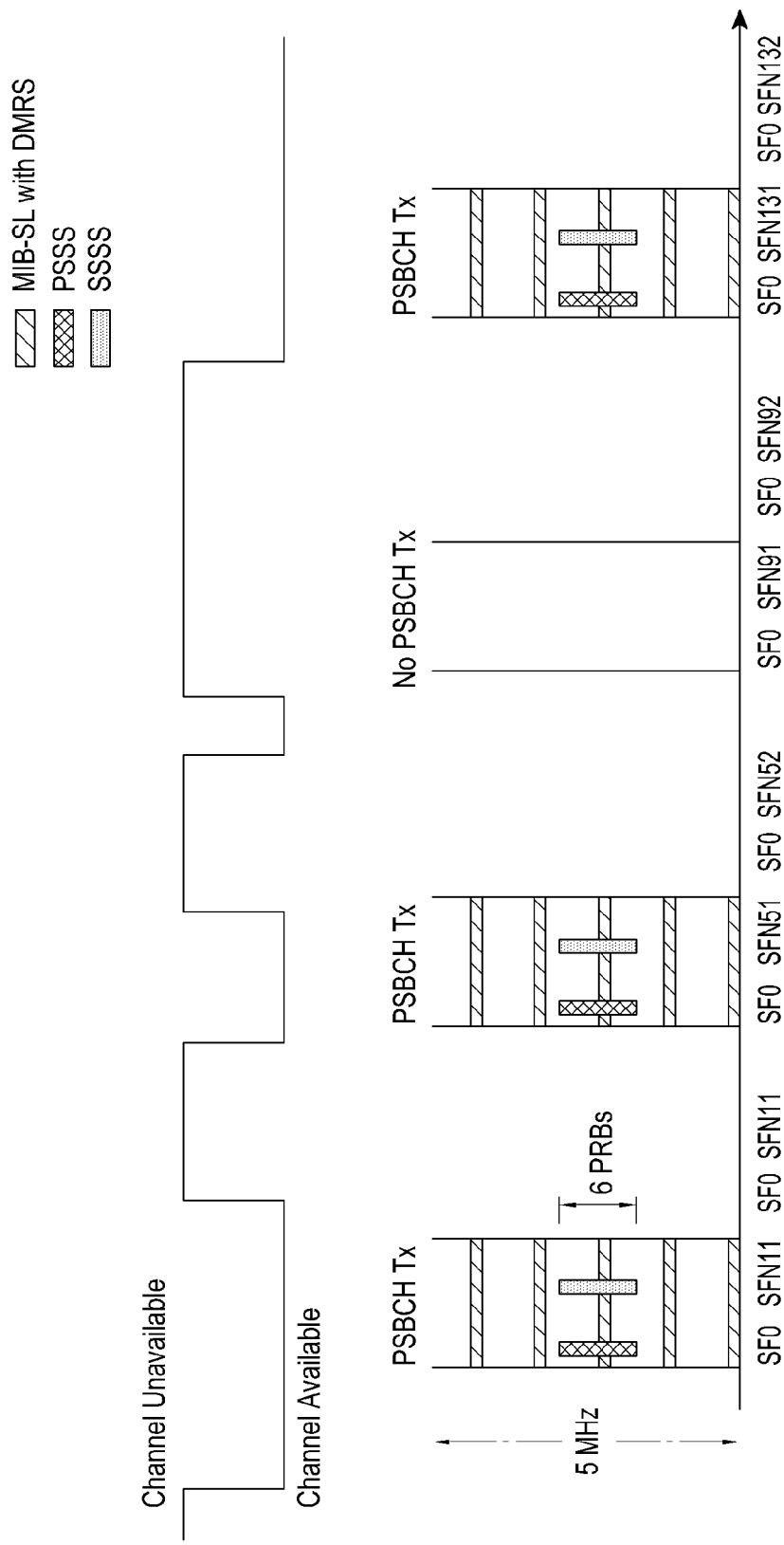
FIG. 21 is an illustration of a periodic transmission of PSBCH based on availability of channel, according to embodiment.

FIG. 21 is an illustration of a periodic transmission of PSBCH based on availability of channel, according to embodiment. In order to transmit PSBCH, a device needs to check whether the channel is busy for idle, i.e., determine availability of the channel for transmission. Checking the availability of the channel prior to transmission prevents the scope of collision, as the channel is unlicensed and other D2D-U networks might be operating on the channel. The embodiments provide three methods to check channel availability. If the PSBCH transmission period is less than 2.5 ms in a 50 ms period, then the PSBCH can be transmitted using the channel using SCS. Alternatively, PSBCH transmissions may be subject to LBT to improve coexistence performance.

Fixed location with SCS: The device may not determine channel availability, if the PSBCH can be transmitted using SCS. The duration of PSBCH transmission must be within 2.5 ms in time duration of 50 ms.

Fixed location and periodicity with LBT: The location and periodicity of the PSBCH transmission can be predefined and transmissions can be subject to LBT. If an unlicensed channel is idle for a SF period, on which transmission is scheduled, the PSBCH can be transmitted at a fixed location and periodicity. If the channel is busy, the PSBCH transmission can be skipped. As depicted in FIG. 21, the PSBCH is transmitted with a periodicity of 40 ms and SF 0. The PSBCH can be transmitted in SFNs 11, 51 and 131, as the channel is available for transmission (idle). In SFN 91, the channel is sensed to be busy. As such, the PSBCH transmission is skipped.

Fixed periodicity with LBT: The transmission periodicity of PSBCH can be defined and the location can be unspecified or specified over a range of SFs. The PSBCH transmissions can be subject to LBT and the PSBCH can be transmitted, when the channel is available, once every PSBCH transmission period. The receiver device needs to detect the PSBCH transmission and derive SFN and SF boundary information after decoding SLSS and MIB-SL contents.

Figure 22:
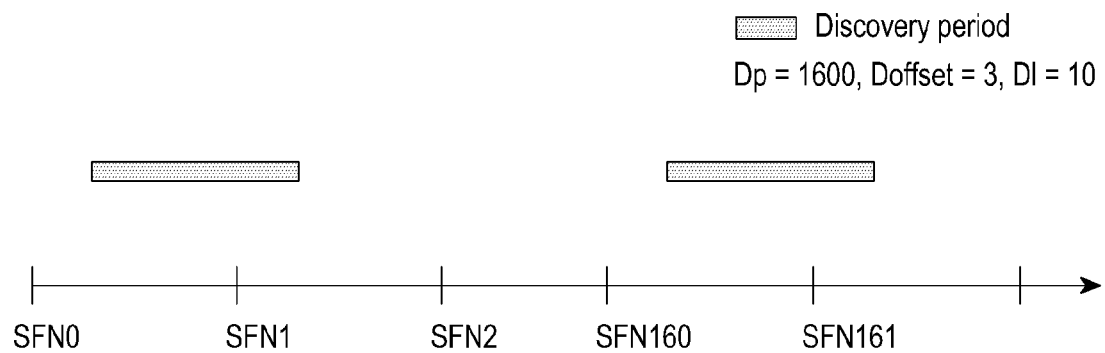
FIG. 22 is an illustration of a scenario wherein discovery period is continuous, according to embodiment.

FIG. 22 is an illustration of a scenario wherein discovery period is continuous, according to embodiment. Discovery messages, for discovering devices in a D2D-U network and for getting discovered, can be transmitted in a discovery period, with a periodicity of $D_p$. An offset period $D_{offset}$, in SFs, can exist prior to transmission of PSDCH. A device involved in D2D-U communications can fix the $D_{offset}$, either as preconfigured information or as a higher layer parameter, obtained from a LTE network or from another device in the D2D-U network. The starting SF for transmission of PSDCH can be set based on the equation SF= $(D_{offset}+SFN*10)$ mod $D_p$. In an example, as depicted in FIG. 22, if $D_p$ is 1600 ms and $D_{offset}$ is 3, then first PSDCH transmission (discovery period) can be initiated at SF 3 in SFN 0, second PSDCH transmission can be initiated at SFN 160, and so on.

A discovery period (time period during which the PSDCH is transmitted) can be either continuous or discontinuous in time. If the discovery period is continuous, then it can be specified by a discovery length parameter $D_l$. In an example, if $D_l$ is 10, $D_p$ is 1600 ms and $D_{offset}$ is 3, a discovery period example can start at SF satisfying the condition SF=$(D_{offset}+SFN*10)$ mod $D_p$ and continue till a SF satisfying the condition SF=$(D_{offset}+SFN*10)$ mod $(D_p+D_l-1)$. The discovery period in example depicted in FIG. 22 is continuous.

Figure 23:
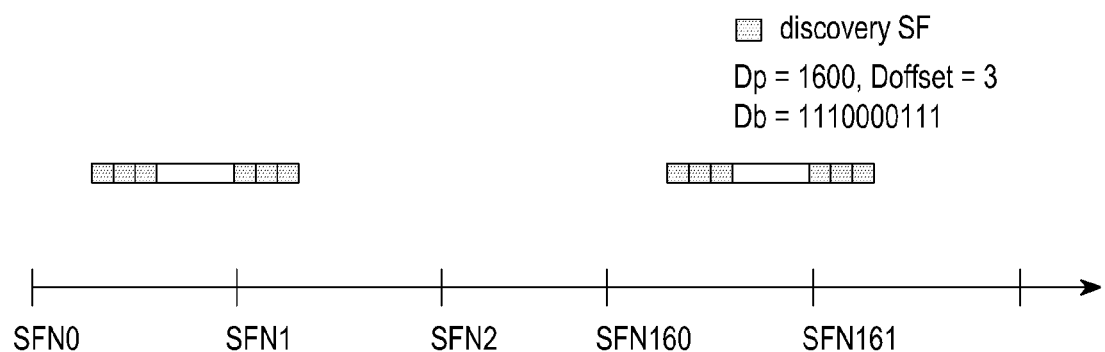
FIG. 23 is an illustration of an example, wherein the discovery period is discontinuous, according to embodiment.

FIG. 23 is an illustration of an example, wherein the discovery period is discontinuous, according to embodiment. If the discovery period is discontinuous, then a bitmap $D_b$, equal to or less than the maximum length of the discovery period, can be used to indicate the valid SF for PSDCH transmission. The SFs with bit 'set' are considered as valid for transmission of PSDCH. As depicted in FIG. 23, $D_p$ is 1600 ms, $D_b$ is 1110000111, and $D_{offset}$ is 3. In every discovery period first three, $8^{th}$, $9^{th}$, and $10^{th}$ SFs are valid for transmission of PSDCH.

Figure 24:
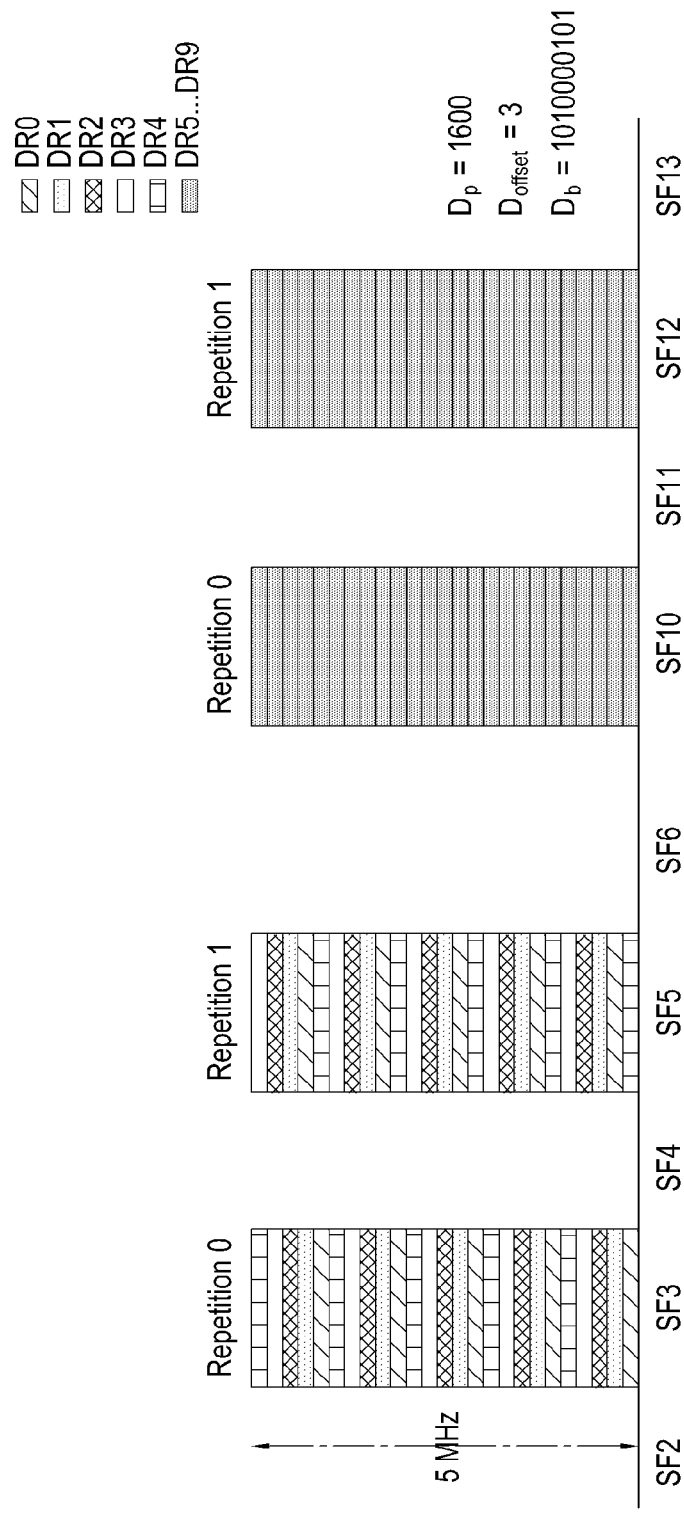
FIG. 24 is an illustration of a repetition of Physical Sidelink Discovery Channel (PSDCH) for a plurality of devices, in 5 MHz unlicensed spectrum bandwidth, according to embodiment.

FIG. 24 is an illustration of a repetition of Physical Sidelink Discovery Channel (PSDCH) for a plurality of devices, in 5 MHz unlicensed spectrum bandwidth, according to embodiment. Each device in a D2D-U network, or a device setting up a D2D-U network, can utilize a discovery resource for PSDCH transmission. The PSDCH transmission from each device can be mapped in a single interlace or a plurality of interlaces, wherein each interlace can comprise of 5 PRBs. The mapping of PSDCH transmissions in a single or plurality of interlaces can be based on discovery payload size. The number of discovery resources available in a SF can depend on the number of interlaces available in the unlicensed spectrum bandwidth. In an example, if every discovery resource is mapped to one interlace, then number of discovery resources available are equal to the number of interlaces available. Further, repetitions of PSDCH transmission in time, indicated by $D_{rep}$, can be preconfigured for discovery of a device. In such case, a discovery resource may contain a set of interlaces spread over a plurality of SFs. Repetitions in time may be either continuous or pattern based, and repeated transmissions belonging to a discovery resource may or may not use the same interlace set across SFs.

As depicted in FIG. 24, for 5 MHz bandwidth, there can be 25 PRBs and 5 interlaces in a SF. Each interlace comprises of 5 PRBs. The number of PSDCH transmission can be '1+$D_{rep}$'. If $D_{rep}$ (number of repetitions of PSDCH transmission) is 1, then the number of PSDCH transmission is 2. Each discovery resource, $DR_i$, can consist of one interlace in each SF. A first device can discover a second device by determining the SF and PRB resources, which can be function of $D_{rep}$, $DR_i$, $D_p$, $D_{offset}$, and $D_b$ or $D_l$, in which PSDCH is transmitted by the second device. If a device chooses $DR_i$ for transmitting PSDCH in order to ensure that it can be discovered by other devices, a first transmission of PSBCH can occur in SF 3 (interlace 1); and second transmission of PSBCH can occur in SF 5 (interlace 2).

For bandwidth 10 MHz and 20 MHz, the number of available discovery resources can be high. For subcarrier based interlaces, discovery transmissions can be mapped to subcarriers instead of PRBs.

Figure 25:
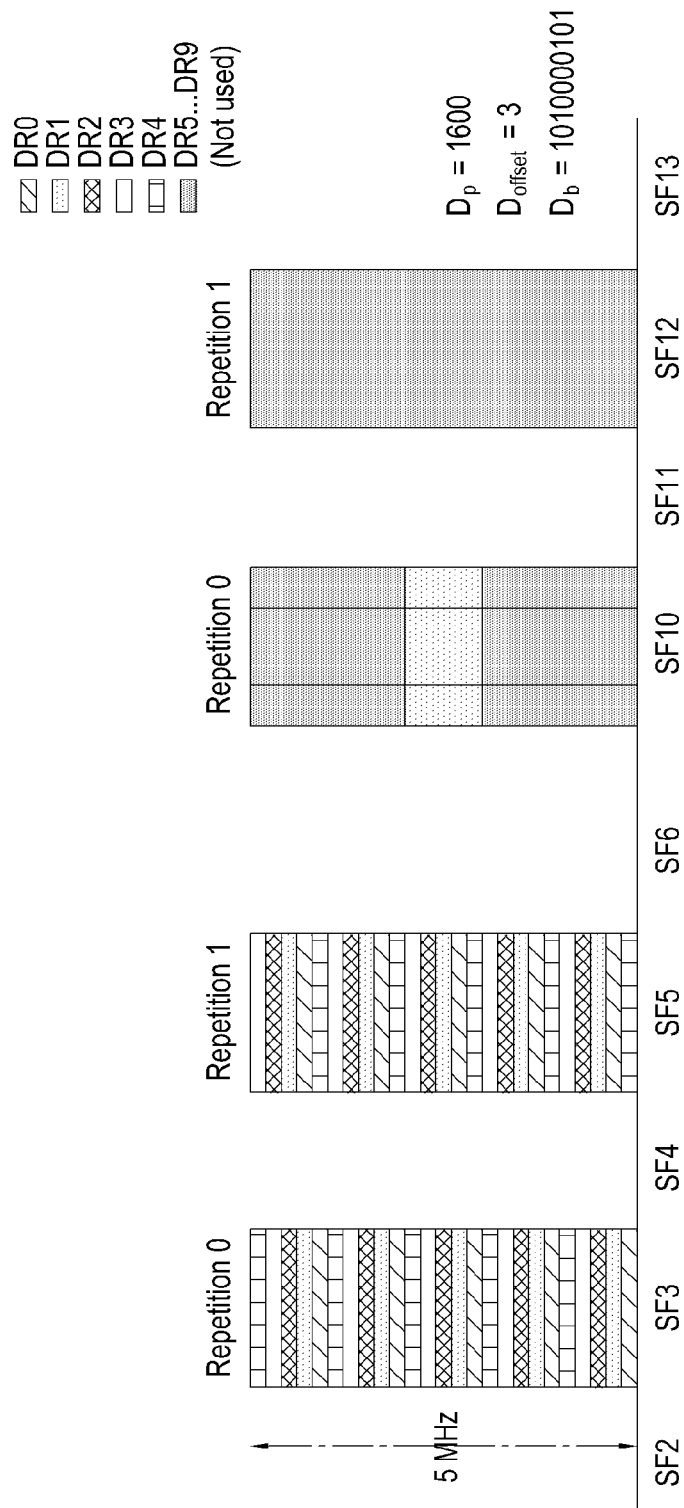
FIG. 25 is an illustration of a method of handling overlap of PSDCH transmissions with PSBCH transmissions, according to embodiment.

FIG. 25 is an illustration of a method of handling overlap of PSDCH transmissions with PSBCH transmissions, according to embodiment. If PSDCH transmission overlaps with PSBCH transmission, then the PSBCH transmission can be prioritized by handling them using the two following methods mentioned below:

Method 1: PSDCH transmission can be skipped if there is an overlap with a PSBCH transmission SF.

Method 2: The frequency resources (discovery resource) used for PSDCH transmission, which overlap with PSBCH transmissions, may not be used for transmission of PSDCH. The $DR_i$(s), (discovery resources), which overlap with PSBCH resources, are not considered during discovery resource selection. If a discovery resource is assigned to a device (by a LTE network or a D2D-U device), then the assigning entity may need to ensure that there is no overlap between the PSDCH and PSBCH resources. If a discovery resource is randomly selected by the device, the set of discovery resources, which overlap with PSBCH resources, might not considered for random selection by the device. In an example, as depicted FIG. 25, $D_{rep}$ is 1 and the set of available discovery resources is $\{DR_0, DR_1, \ldots, DR_9\}$. The first PSDCH transmission, from at least one device, in discovery resources $DR_5$-$DR_9$, overlaps with PSBCH transmissions in SF 10. Hence, the discovery resources, which can be selected (by the network or device) for PSDCH transmissions is limited to $\{DR_0, DR_1, \ldots, DR_4\}$.

Figure 26:
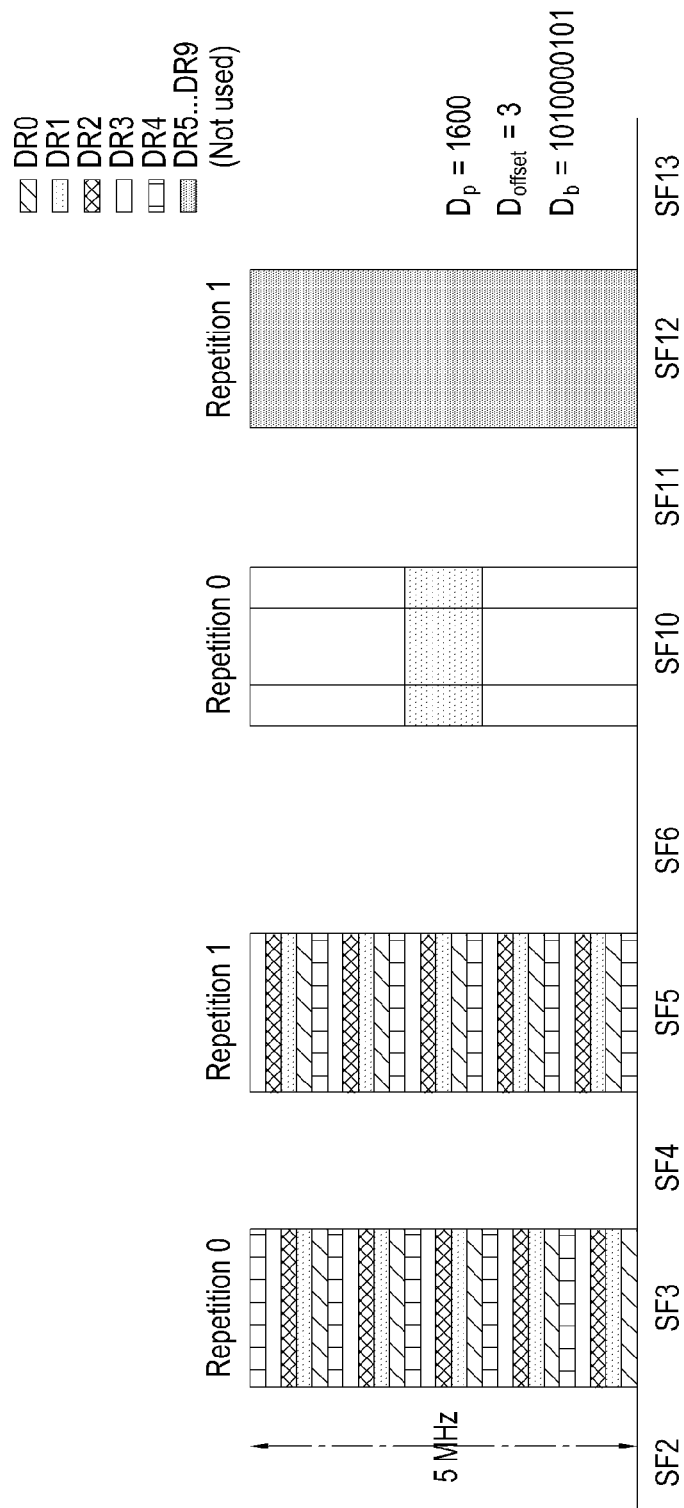
FIG. 26 is an illustration of another method of handling overlap of PSDCH transmissions with PSBCH transmissions, according to embodiment.

FIG. 26 is an illustration of another method of handling overlap of PSDCH transmissions with PSBCH transmissions, according to embodiment. If at least one of repetitions of PSDCH transmissions in at least one discovery resource, in a different SF, does not overlap with PSBCH transmissions, then the PSDCH can be transmitted on the at least one discovery resource. In an example, as depicted in FIG. 26, consider that at least one device is transmitting PSDCH using discovery resources $DR_5$-$DR_9$. The number of PSDCH transmission is 2 and $D_{rep}$ is 1, i.e., PSDCH transmitted in SFs 10 and 12. There is an overlap between PSBCH and first transmission of PSDCH in SF 10, but there is no such overlap in SF 12. Therefore, the discovery resources $DR_5$-$DR_9$ can be utilized for PSDCH transmissions by the at least one device in SF 12 and PSDCH transmission in SF 10 can be skipped.

In order to perform PSDCH transmission in discovery resources, it may be necessary to determine channel availability. The availability of the channel can be determined using LBT procedures. If the PSDCH transmission time period can be limited to 2.5 ms every 50 ms, then the PSDCH can be transmitted using SCS.

The choice of selection of a particular method to be used for determining channel availability can be either static or semi-static. If the choice is static, then the method used for determining channel availability can be fixed. At the instant of initiating PSDCH transmission, the device can determine channel availability using a particular method and perform PSDCH transmission if the channel is found to be idle.

If the choice of selecting a method for determining channel availability is semi-static, then the method to be used for determining channel availability can be indicated by network or another device. There can be two possible variations if the choice of selecting the method to be used for determining channel availability is semi-static. In one of the variations, the method to be used for determining channel availability can be broadcasted. For example, in for D2D-U operation in ANA mode, the method to be used for determining channel availability can be transmitted as a part of the system information.

In another variation, the network or an alternate external entity can notify the device(s) to use a particular method to determine channel availability at the beginning of a discovery period, through common or device specific control signaling. In an example, MCOT sharing can be achieved using this variation. In NC mode, if the network is using the channel, then the network can share the channel with other devices through common control signaling. The devices can use a channel access method between them to access the channel.

Figure 27:
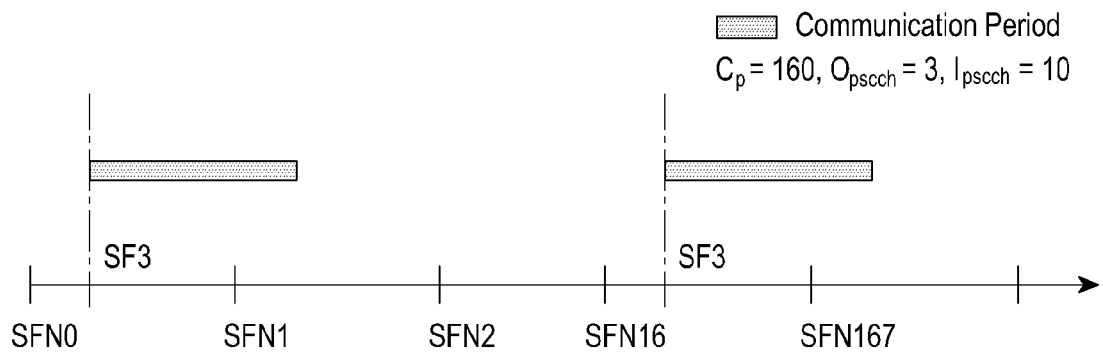
FIG. 27 is an illustration of a continuous time resource mapping for Physical Sidelink Control Channel (PSCCH) transmission, according to embodiment.

FIG. 27 is an illustration of a continuous time resource mapping for Physical Sidelink Control Channel (PSCCH) transmission, according to embodiment. The PSCCH can be transmitted with a periodicity of $C_p$. The SFs belonging to PSCCH time resource pool (SFs which are part of PSCCH resource) can be either continuous or discontinuous. The PSCCH resource can be represented as $n_{PSCCH}$. If the time resource mapping is continuous, then the PSCCH transmission time period or PSCCH transmission length can be represented as $l_{pscch}$. An offset period $O_{offset}$, in SFs, can exist prior to transmission PSCCH. The PSCCH can be transmitted in at least one communication period. In an $i^{th}$ communication period, the set of SFs belonging to PSCCH time resource pool can be $(i-1)*C_p+O_{pscch}$ to $(i-1)*C_p+O_{pscch}+l_{pscch}-1$. The PSCCH can be transmitted in a particular SF and can be repeated in a predefined number ($N_{PSCCH}$) of SFs belonging to PSCCH time resource pool in the $i^{th}$ communication period.

As depicted in FIG. 27, $C_p$ is 160 SFs, $O_{pscch}$ is 3, and $l_{pscch}$ is 10 SFs; i.e., a PSCCH transmission can be initiated every 160 SFs and PSSCH is transmitted anywhere within a period of 10 SFs. The first communication period (i=1) can start from SF3 of SFN0 and can last till SF2 of SFN1. The second communication period (i=2) can start from SF3 of SFN16 and can last till SF2 of SFN17.

Figure 28:
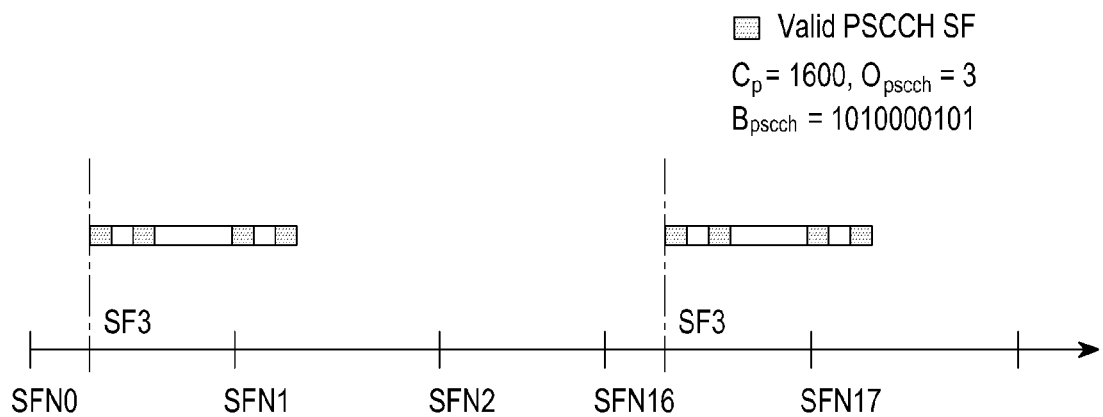
FIG. 28 is an illustration of a discontinuous time resource mapping for PSCCH transmission, according to embodiment.

FIG. 28 is an illustration of a discontinuous time resource mapping for PSCCH transmission, according to embodiment. The PSCCH window in each communication period can be discontinuous. The set of SFs including should PSCCH transmission can be indicated by a bit map configuration $B_{pscch}$. Considering the example depicted in FIG. 28, the $B_{pscch}$ can be represented as 1010000101. The $C_p$ is 160 SFs and the $O_{pscch}$ is 3. In the first communication period, the PSCCH transmission is limited to SFs 3 and 5 in SFN0 and SFs 0 and 2 in SFN1. In the second communication period, the PSCCH transmission is limited to SFs 3 and 5 in SFN16 and SFs 1 and 3 in SFN17.

A device can transmit PSCCH after selecting a PSCCH resource $n_{PSCCH}$. The parameter $n_{PSCCH}$ can be randomly selected by the device in SO, PNA, and ANA modes; whereas $n_{PSCCH}$ can be provided to the device by the network in NC mode, wherein the network plays an active role in scheduling $n_{PSCCH}$ for PSCCH transmission. The set of SFs and PRBs scheduled for PSCCH transmission in an $i^{th}$ communication period can be a function of $n_{PSCCH}$. The device can deduce $(SF_i^j, PRB_i^j)$, i.e., the SFs and the set of PRBs for $i^{th}$ PSCCH transmission in the $i^{th}$ PSCCH communication period, from the following mapping functions:

$$PRB_i^j = f_1(n_{pscch}, C_p, O_{pscch}, l_{pscch} \text{ or } B_{pscch}, i, j)$$

$$SF_i^j = f_2(n_{pscch}, C_p, O_{pscch}, l_{pscch} \text{ or } B_{pscch}, i, j)$$

Figure 29A:
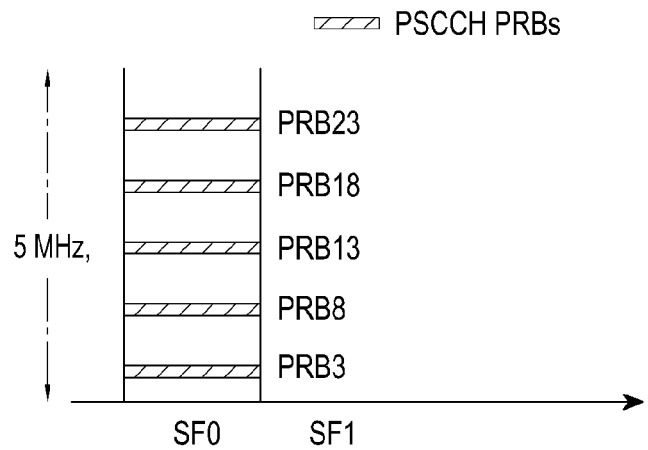
FIGS. 29A and 29B are illustrations of a frequency resource mapping of PSCCH transmission using PRB interlace and tone based interlace respectively, in 5 MHz bandwidth, according to embodiment.
Figure 29B:
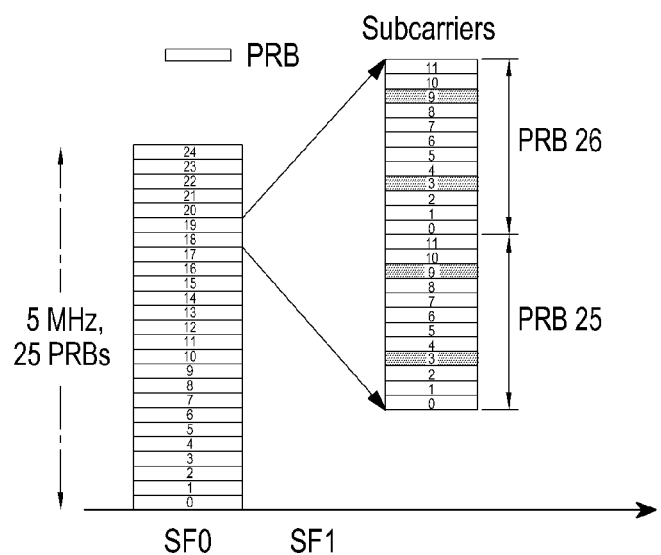

FIGS. 29A and 29B are illustrations of a frequency resource mapping of PSCCH transmission using PRB interlace and tone based interlace respectively, in 5 MHz bandwidth, according to embodiment. For frequency resource mapping of PSCCH transmission, either PRB based or tone based interlace structures can be used. In PRB based interlace structure, PSCCH transmission can be mapped to a number of PRBs that are spread across the bandwidth in a SF. For tone based PRB interlace, frequency resource mapping of PSCCH transmission can be performed in at least one tone in every PRB.

As depicted in FIG. 29A, the PSCCH transmissions can be mapped in 5 PRBs per interlace which are spread equally across the 5 MHz bandwidth. It can be noted that the distribution of PRBs for PSCCH transmission may be unequally spaced as well. As depicted in FIG. 29B, the PSCCH transmissions can be mapped using tone based interlace structure. The PSCCH transmissions are mapped in tones (subcarriers) 3 and 9 of every PRB in the 5 MHz bandwidth for a single PSCCH transmission in a SF. Resource structure can be similarly defined for transmission bandwidths 10 MHz and 20 MHz.

FIGS. 30A and 30B are illustrations of a continuous PSCCH transmission, according to embodiment. The PSCCH can be repeatedly transmitted for improving transmission probability over the unlicensed channel. When the PSCCH transmissions are repeated over multiple SFs, whether in a continuous or discontinuous matter, the chances of the device detecting the channel to be available, for performing PSCCH transmission, can improve. If the repetition of PSCCH transmission is continuous, channel access check (determining channel availability) can be performed until for the first time the channel is detected to be available. Once the channel is detected as available, the device can continue to transmit PSCCH until the end of PSCCH resource or for a predefined number of repetitions.

As depicted in FIG. 30A, PSCCH resource begins at SF 0. Since the channel is detected to be busy, the device can continue to check for channel availability till SF1. The channel is detected to be available for the first time at starting boundary of SF1. As such, PSCCH transmission can be initiated and the device can continue PSCCH transmission until the end of PSCCH resource, i.e., SF3. If it is considered that there are two repetitions of PSCCH, then the device can continuously transmit PSCCH, until all the repetitions of PSCCH have been transmitted.

As depicted in FIG. 30B, the number of PSCCH transmissions by the device is 2. Once the channel is detected to be free, the device can transmit PSCCH twice, continuously, till the end of SF2. The SF3 is a part of the PSCCH resource, but may remain unused by the device. It can be noted that the device needs to detect the channel to be free at the starting of a SF boundary, in order to initiate PSCCH transmission. If the channel is detected to be free at the middle of a SF (SF 0), PSCCH transmission may not be initiated.

Figure 31:
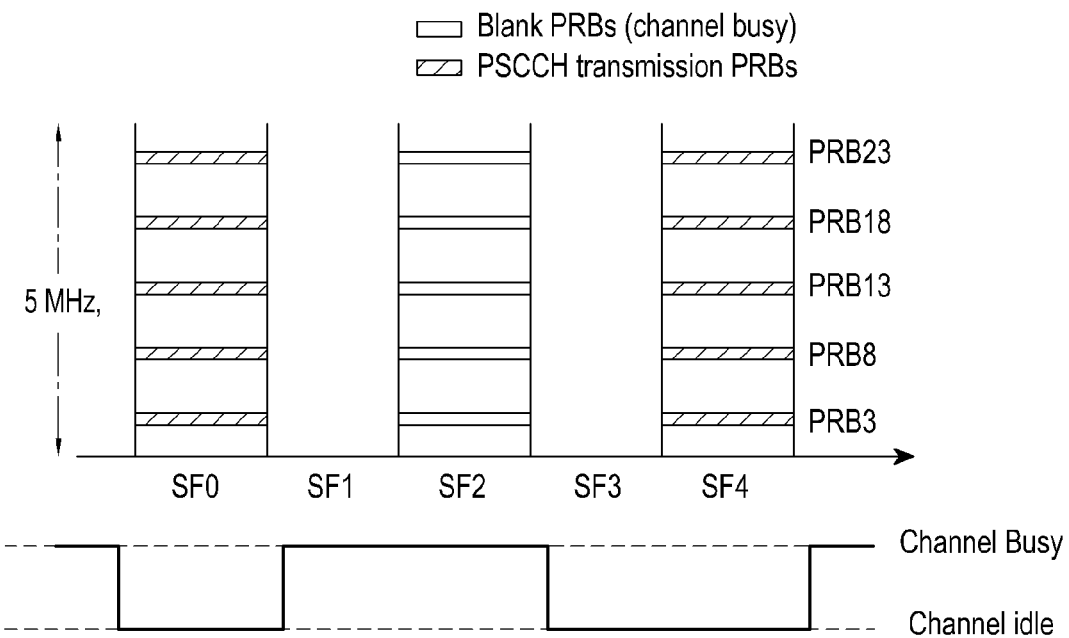
FIG. 31 is an illustration of a discontinuous transmission of PSCCH, according to embodiment.

FIG. 31 is an illustration of a discontinuous transmission of PSCCH, according to embodiment. If the PSCCH is transmitted in a discontinuous manner, the device can perform channel availability check at the beginning of certain SFs only. The PSCCH resource in which PSCCH can be transmitted are SF 0, 2 and 4. If the channel is detected to be free, then the device can transmit in the SFs 0, 2 and 4. If the channel is detected to be busy, then the device can skip the PSSCH transmission. As depicted in FIG. 31, PSCCH can be transmitted three times. The device can perform a channel access check at the beginning of SF 0, 2 and 4. The channel is detected to be available at boundaries of SF 0 and 4 and busy at boundary of SF 2. As such, PSCCH is transmitted in SFs 0 and 4, whereas PSCCH, to be transmitted in SF 2, is skipped.

Repetitions of PSCCH transmission can be scheduled using frequency resource. When frequency resources are available, the PSCCH transmission can be mapped to a frequency by appropriate rate matching, reducing the code rate, repeating the same rate matched block in frequency, and so on. As depicted in FIGS. 30A, 30B, and 31, PSCCH transmissions can be initiated only at SF boundaries. In order to improve spectral usage, this can be relaxed to allow transmissions to begin at slot boundaries or even at symbols boundaries. This can be achieved at the expense of increased decoding complexity at the receiving device.

The channel availability needs to be determined prior to initiating PSCCH transmission. The availability of the channel can be determined using LBT procedures. If the PSCCH transmission time period can be limited to 2.5 ms within every 50 ms, then the PSCCH can be transmitted using SCS.

The choice of selecting methods in order to determine channel availability can be either static or semi-static. If the choice is static, then the method used for determining channel availability can be fixed. At the instant of PSCCH transmission, the device can determine channel availability using a particular method and perform PSCCH transmission if the channel is idle.

If the choice of selecting the method for determining channel availability is semi-static, then the particular method to be used for determining channel availability can be indicated by the network or another device. There can be two possible variations if the choice of selecting the method to be used for determining channel availability is semi-static. In one of the variations, the method of determining channel availability can be broadcasted. For example, in case of D2D-U operation by ANA mode, the method to be used for determining channel availability can be transmitted as a part of system information.

In another variation, the network or an alternate external entity can notify the device(s) to use a particular method, for determining channel availability at the instant of initiating PSCCH transmission, through common or device specific control signaling. In an example, MCOT sharing can be achieved using this variation. In NC mode, if the network is using the channel, then the network can share the channel with other devices through common control signaling. The devices can use a channel access method between them to access the channel.

Figure 32:
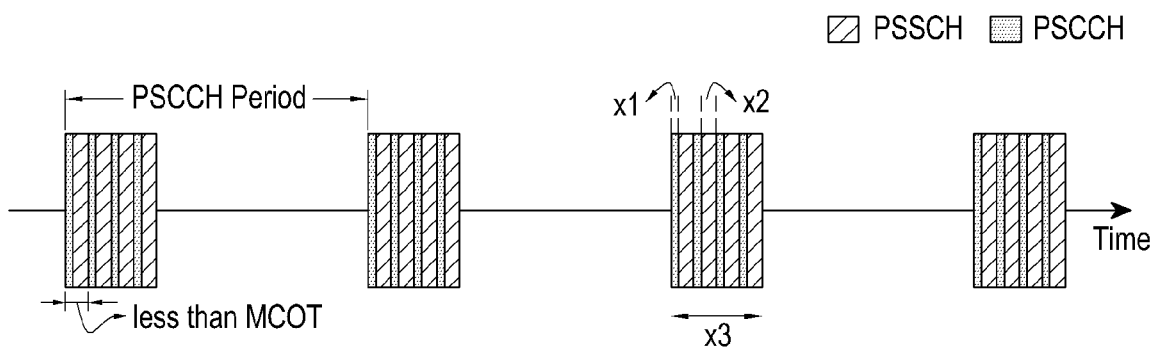
FIG. 32 is an illustration of a first method for structuring communication period for transmission of PSCCH and Physical Sidelink Shared Channel (PSSCH), according to embodiment.

FIG. 32 is an illustration of a first method for structuring communication period for transmission of PSCCH and Physical Sidelink Shared Channel (PSSCH), according to embodiment. In D2D-U, PSSCH transmission may not follow PSCCH transmission. This is unlike licensed D2D, wherein a device can expect the presence of PSSCH after receiving PSCCH with certainty. In D2D-U, PSCCH and PSSCH may not belong to the same transmission burst (within a MCOT) and the channel may not be available for the scheduled PSSCH transmission.

Within a communication period, the SFs, in which PSCCH and PSSCH are transmitted, may not be continuous. The transmission gap between PSCCH and PSSCH transmission may be more than 10 ms, which may require performing multiple LBT checks to ensure successful transmission in unlicensed bands. Due to the shared nature of unlicensed bands, this may minimize the chances of a successful transmission of a scheduled PSSCH due to unavailability of channel.

In order to improve the chances of successful delivery of scheduled D2D-U PSSCH transmissions, a plurality of methods can be used for structuring PSCCH and PSSCH transmissions. A primary criterion for such a design can be to ensure distribution of PSCCH and PSSCH regions in time is such that the PSCCH and corresponding PSSCH transmission is completed in the same transmission burst, i.e., the two transmissions are completed and received within a single MCOT duration.

As depicted in FIG. 32, the PSCCH and PSSCH can be transmitted alternatively in time, within a communication period. The transmission time period ($X_3$) of a set of PSCCH and PSSCH transmissions can be less than a single MCOT duration. The time duration of PSCCH transmission can be $X_1$ and time duration of PSSCH transmission can be $X_2$, wherein $X_3 < X_1 + X_2$. The parameters $X_1$, $X_2$, and $X_3$ can be static or can be communicated to the device by broadcast or RRC signaling.

Figures 33A, 33B:
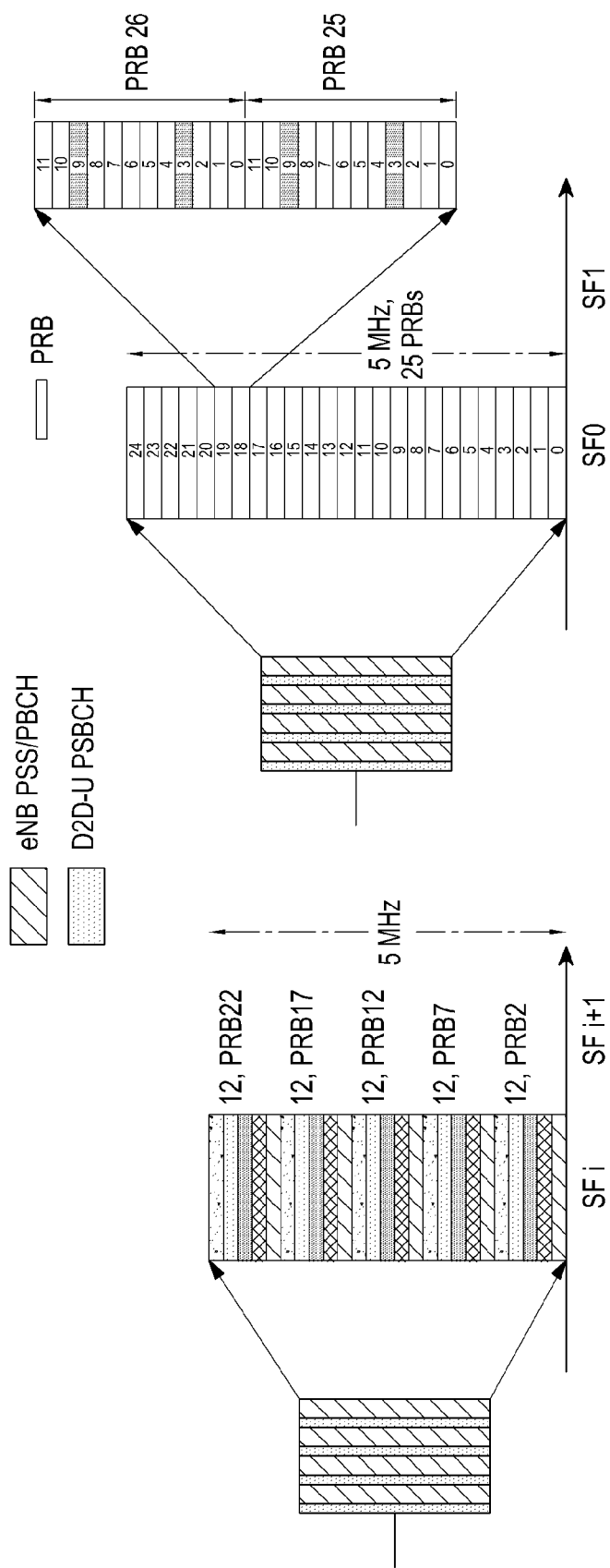
FIGS. 33A and 33B are illustrations of a frequency resource allocation, for the first method, for transmission of PSCCH and PSSCH based on PRB interlace and subcarrier interlace respectively, in 5 MHz bandwidth, according to embodiment.

FIGS. 33A and 33B are illustrations of a frequency resource allocation, for the first method, for transmission of PSCCH and PSSCH based on PRB interlace and subcarrier interlace respectively, in 5 MHz bandwidth, according to embodiment. As depicted in FIG. 33A, both PSCCH and PSSCH transmission can be mapped in separate interlaces, wherein each interlace can comprise of 5 PRBs, which are equally spaced across the 5 MHz bandwidth. It can be noted that frequency resources, for transmission of both PSCCH and PSSCH, can be allocated in multiples of interlaces. As depicted in FIG. 33B subcarriers 3 and 9 in every PRB (in an interlace) can be allocated for transmission of either PSCCH or PSSCH.

Figure 34:
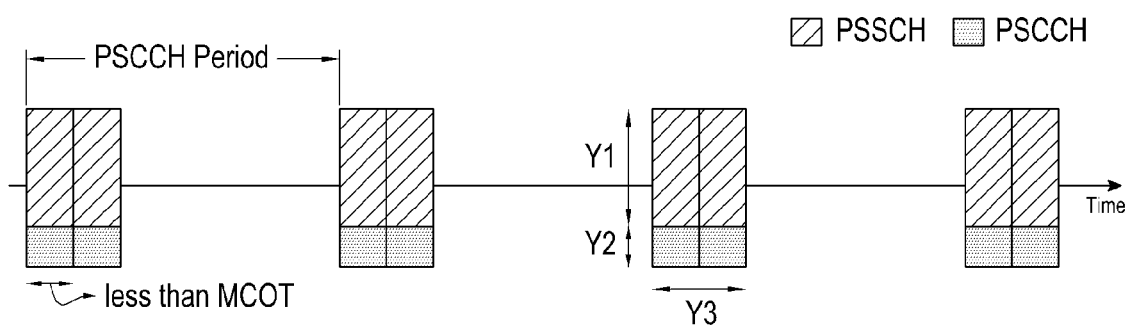
FIG. 34 is an illustration of a second method for structuring communication period for transmission of PSCCH and PSSCH, according to embodiment.

FIG. 34 is an illustration of a second method for structuring communication period for transmission of PSCCH and PSSCH, according to embodiment. As depicted in FIG. 34, transmission of PSCCH and PSSCH within a single MCOT can be achieved by multiplexing PSCCH and PSSCH transmissions in frequency. The lengths of the frequency regions, allocated for transmission of PSCCH and PSSCH can be $Y_1$ and $Y_2$ respectively. The distribution of the frequency regions, $Y_1$ and $Y_2$, in time can be characterized by parameter $Y_3$. The parameters $Y_1$, $Y_2$, and $Y_3$ can be chosen to be a static value or can be signaled to the device by the network through either broadcast or RRC signaling.

Figures 35A, 35B:
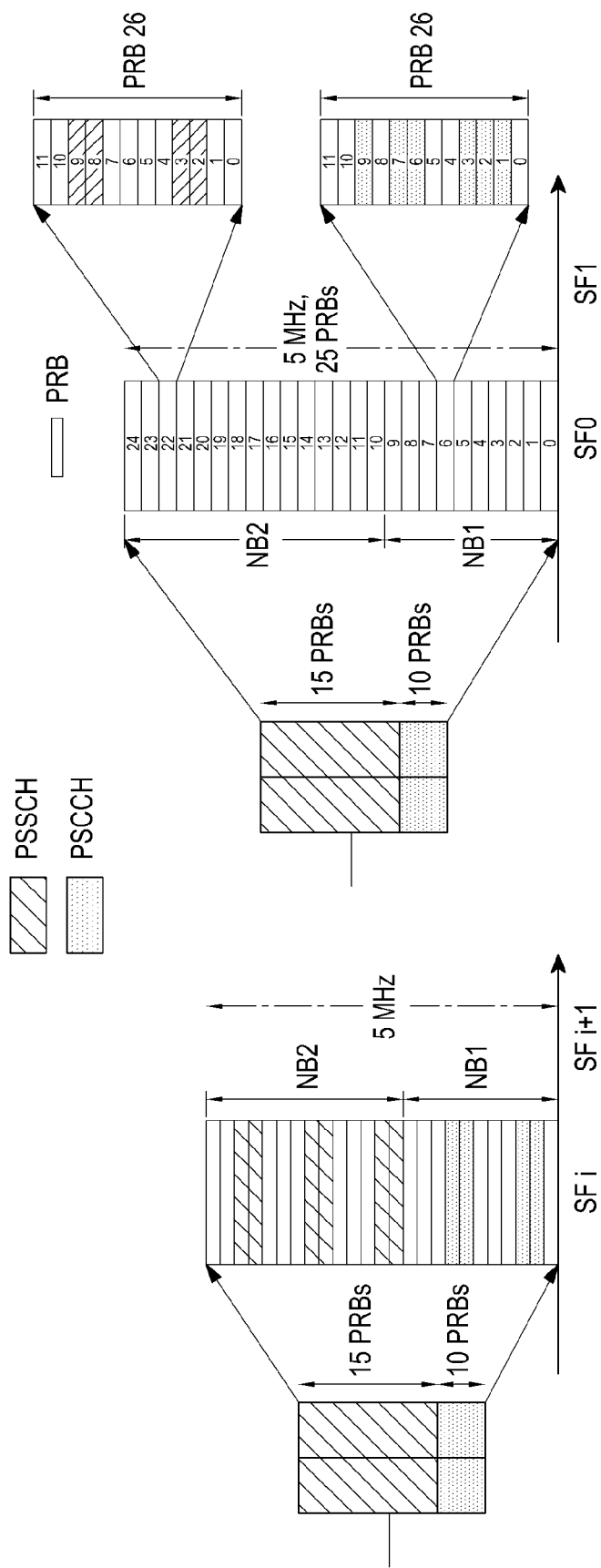
FIGS. 35A and 35B are illustrations of a frequency resource allocation, for the second method, for transmission of PSCCH and PSSCH transmission across selective PRBs and selected subcarriers of all PRBs, respectively in 5 MHz bandwidth, according to embodiment.

FIGS. 35A and 35B are illustrations of a frequency resource allocation, for the second method, for transmission of PSCCH and PSSCH transmission across selective PRBs and selected subcarriers of all PRBs, respectively in 5 MHz bandwidth, according to embodiment. The 5 MHz bandwidth can include 25 PRBs and can be split into two Narrow Bands (NBs). The PSCCH transmission can be mapped either in selected PRBs in the range 0-9 (NB-1) or selected subcarriers of all PRBs in the range 0-9 (NB-1). The PSSCH transmission can be mapped either in selected PRBs in the range 10-24 (NB-2) or selected subcarriers of all PRBs in the range 10-24 (NB-2).

As depicted in FIG. 35A, the PSCCH transmission can be mapped in four PRBs in NB-1, and the PSSCH transmission can be mapped in six PRBs in NB-2. As depicted in FIG. 35B, the PSCCH transmission can be mapped in subcarriers 1, 2, 6, and 7 of all PRBs in NB-1, and the PSSCH transmission can be mapped in subcarriers 2, 3, 8, and 9 of all PRBs in NB-2.

Figure 36:
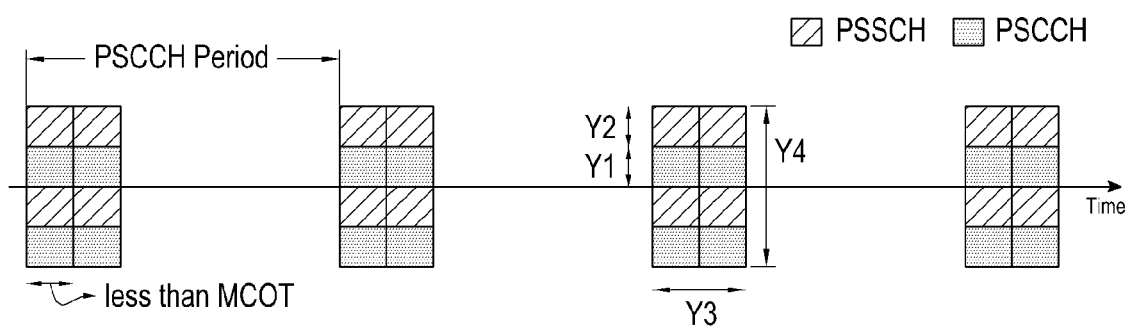
FIG. 36 is an illustration of a third method for structuring communication period for transmission of PSCCH and PSSCH, according to embodiment.

FIG. 36 is an illustration of a third method for structuring communication period for transmission of PSCCH and PSSCH, according to embodiment. As depicted in FIG. 36, the PSCCH and PSSCH transmissions can be multiplexed in frequency. The communication period is structured such that the frequency region of the PSCCH transmission and the frequency region of the PSSCH transmission are placed alternatively. The lengths of the frequency regions, allocated for transmission of PSCCH and PSSCH can be $Y_1$ and $Y_2$ respectively. The distribution of the frequency regions, $Y_1$ and $Y_2$, in time can be characterized by parameter $Y_3$. The total bandwidth can be characterized by parameter $Y_4$. The parameters $Y_1$, $Y_2$, $Y_3$, and $Y_4$ can be chosen to be a static value or can be signaled to the device by the network through either broadcast or RRC signaling.

The time resource mapping of PSSCH can be either continuous or discontinuous. The parameters involved in time resource mapping of PSSCH, viz., $C_p$, $n_{PSSCH}$, $l_{psch}$, $O_{offset}$, communication period (PSSCH period), and $B_{PSSCH}$, are analogous to that of PSCCH (referring to FIGS. 27 and 28). The $n_{PSSCH}$ is the resource in which PSSCH is transmitted. The SFs and PRBs on which PSSCH is transmitted can be derived from $n_{PSSCH}$. The $n_{PSSCH}$ can be conveyed to the receiving device(s) through PSCCH. At the transmitting device, the $n_{PSSCH}$ value can be selected either by the network (NC mode) or randomly (SO, PNA, ANA modes) by transmitting device. It can be noted that length parameters in the time domain such as $X_3$ and $Y_3$ can be either indicated by a single value when the time resource mapping is continuous and can be indicated by a bitmap when the time resource mapping is discontinuous.

The set of SFs and PRBs scheduled for PSSCH transmission in an $i^{th}$ communication period can be a function of $n_{PSSCH}$. The device can deduce $(SF_i^j, PRB_i^j)$, i.e., the SFs and the set of PRBs for $j^{th}$ PSSCH transmission in the $i^{th}$ PSSCH communication period, from the following mapping functions:

$$PRB_{pssch,i}^j = f(n_{pssch}, C_p, O_{pscch}, l_{pssch} \text{ or } B_{pssch}, i, j)$$

$$SF_{pssch,i}^j = f(n_{pssch}, C_p, O_{pscch}, l_{pssch} \text{ or } B_{pssch}, i, j)$$

If there is an overlap in time resource between discovery (PSDCH) period and communication (PSCCH and/or PSSCH) period, then discovery transmissions can be prioritized and the corresponding PSCCH and/or PSSCH transmission, overlapping with PSDCH transmission, can be skipped.

Figures 37A, 37B:
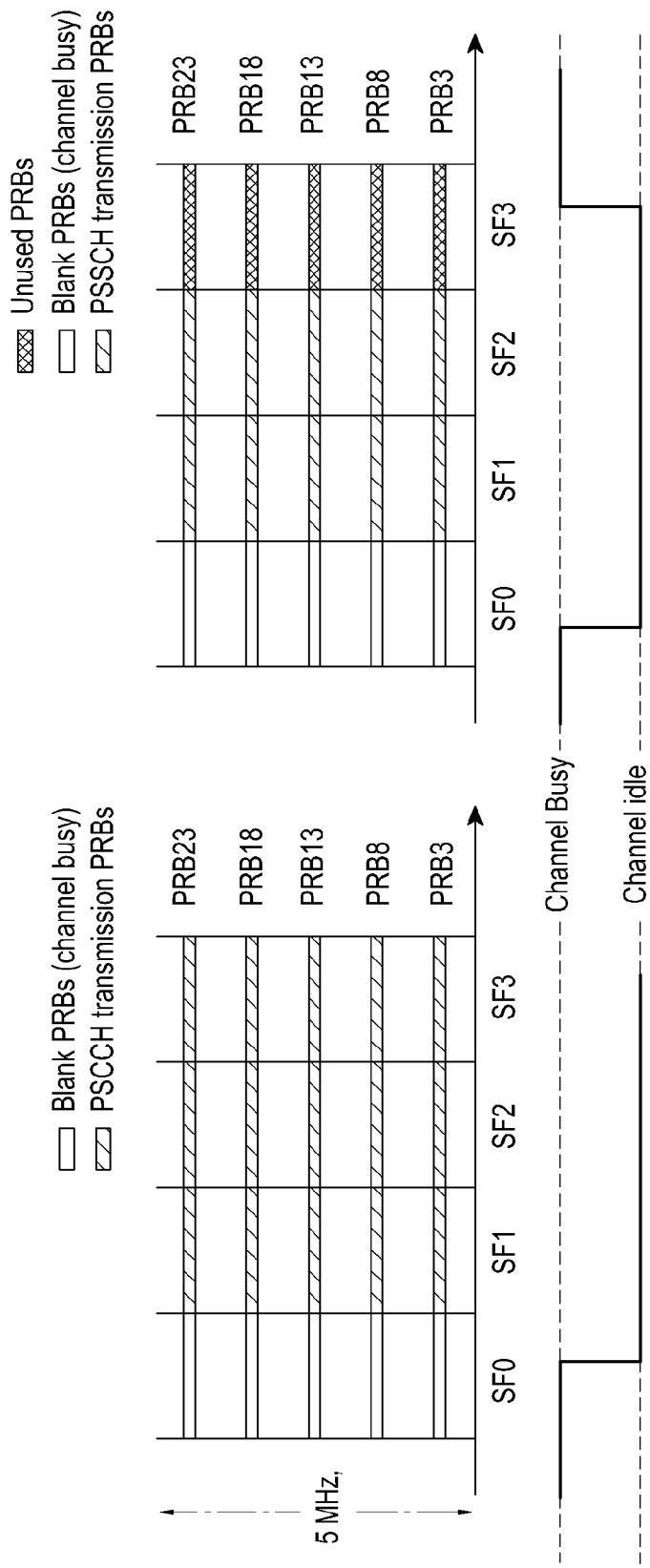
FIGS. 37A and 37B are illustrations of a continuous PSSCH transmission, according to embodiment.

FIGS. 37A and 37B are illustrations of a continuous PSSCH transmission, according to embodiment. The PSSCH can be transmitted in a plurality of SFs, wherein PSSCH transmission in some of the SFs can be repetitions of PPSSCH transmitted in previous SF(s). Repetitions of PSSCH transmissions can be scheduled in order to improve both reception and transmission opportunities in unlicensed bands. The scheduled repetitions can be either continuous or discontinuous depending on result of channel access check, which can be performed only prior to first transmission (continuous) or at the beginning of every transmission (discontinuous) respectively.

As depicted in FIG. 37A, PSSCH resource begins at SF 0. Since the channel is detected to be busy, the device can continue to check for channel availability till SF1. The channel is detected to be available for the first time at starting boundary of SF1. As such, PSSCH transmission can be initiated and the device can continue PSSCH transmission until the end of PSSCH resource, i.e., SF3. If it is considered that there are two repetitions of PSSCH, then the device can continuously transmit PSCCH, until all the repetitions of PSCCH have been transmitted.

As depicted in FIG. 37B, the number of PSCCH transmissions by the device is 2. Once the channel is detected to be free, the device can transmit PSSCH twice, continuously, till the end of SF2. The SF3 is a part of the PSSCH resource, but may remain unused by the device. It can be noted that the device needs to detect the channel to be free at the starting of a SF boundary, in order to initiate PSSCH transmission. If the channel is detected to be free at the middle of a SF (SF 0), PSSCH transmission may not be initiated.

Figure 38:
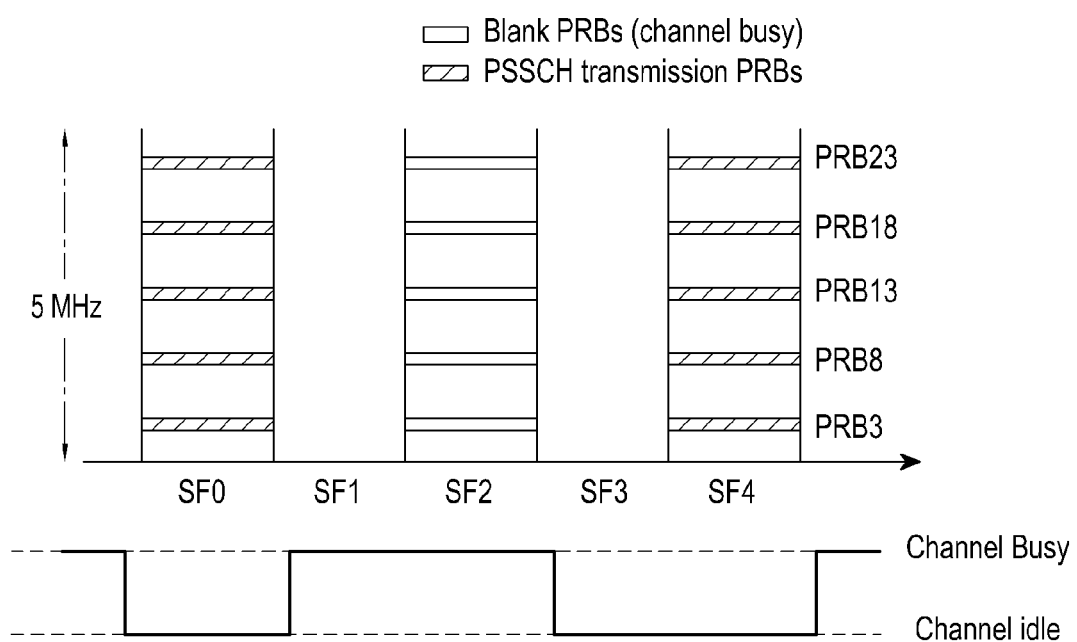
FIG. 38 is an illustration of a discontinuous transmission of PSSCH, according to embodiment.

FIG. 38 is an illustration of a discontinuous transmission of PSSCH, according to embodiment. If the PSSCH is transmitted in a discontinuous manner, the device can perform channel availability check at the beginning of certain SFs only. The PSSCH resource in which PSSCH can be transmitted are SFs 0, 2 and 4. If the channel is detected to be free, then the device can transmit in the SFs 0, 2 and 4. If the channel is detected to be busy, then the device can skip the PSSCH transmission. As depicted in FIG. 38, PSSCH can be transmitted three times. The device can perform a channel access check at the beginning of SF 0, 2 and 4. The channel is detected to be available at boundaries of SF 0 and 4 and busy at boundary of SF 2. As such, PSSCH is transmitted in SFs 0 and 4, whereas PSSCH, to be transmitted in SF 2, is skipped.

Repetitions of PSSCH transmission can be scheduled using frequency resource. When frequency resources are available, the PSCCH transmission can be mapped to a frequency by appropriate rate matching, reducing the code rate, repeating the same rate matched block in frequency, and so on. As depicted in FIGS. 37A, 37B, and 38, PSSCH transmissions can be initiated only at SF boundaries. In order to improve spectral usage, this can be relaxed to allow transmissions to begin at slot boundaries or even at symbols boundaries. This can be achieved at the expense of increased decoding complexity at the receiving device.

The channel availability needs to be determined prior to initiating PSSCH transmission. The availability of the channel can be determined using LBT procedures. If the PSSCH transmission time period can be limited to 2.5 ms within every 50 ms, then the PSSCH can be transmitted using SCS.

The choice of selecting methods in order to determine channel availability can be either static or semi-static. If the choice is static, then the method used for determining channel availability can be fixed. At the instant of PSSCH transmission, the device can determine channel availability using a particular method and perform PSSCH transmission if the channel is idle.

If the choice of selecting the method for determining channel availability is semi-static, then the particular method to be used for determining channel availability can be indicated by the network or another device. There can be two possible variations if the choice of selecting the method to be used for determining channel availability is semi-static. In one of the variations, the method of determining channel availability can be broadcasted. For example, in case of D2D-U operation by ANA mode, the method to be used for determining channel availability can be transmitted as a part of system information.

In another variation, the network or an alternate external entity can notify the device(s) to use a particular method, for determining channel availability at the instant of initiating PSSCH transmission, through common or device specific control signaling. In an example, MCOT sharing can be achieved using this variation. In NC mode, if the network is using the channel, then the network can share the channel with other devices through common control signaling. The devices can use a channel access method between them to access the channel.

Figure 39:
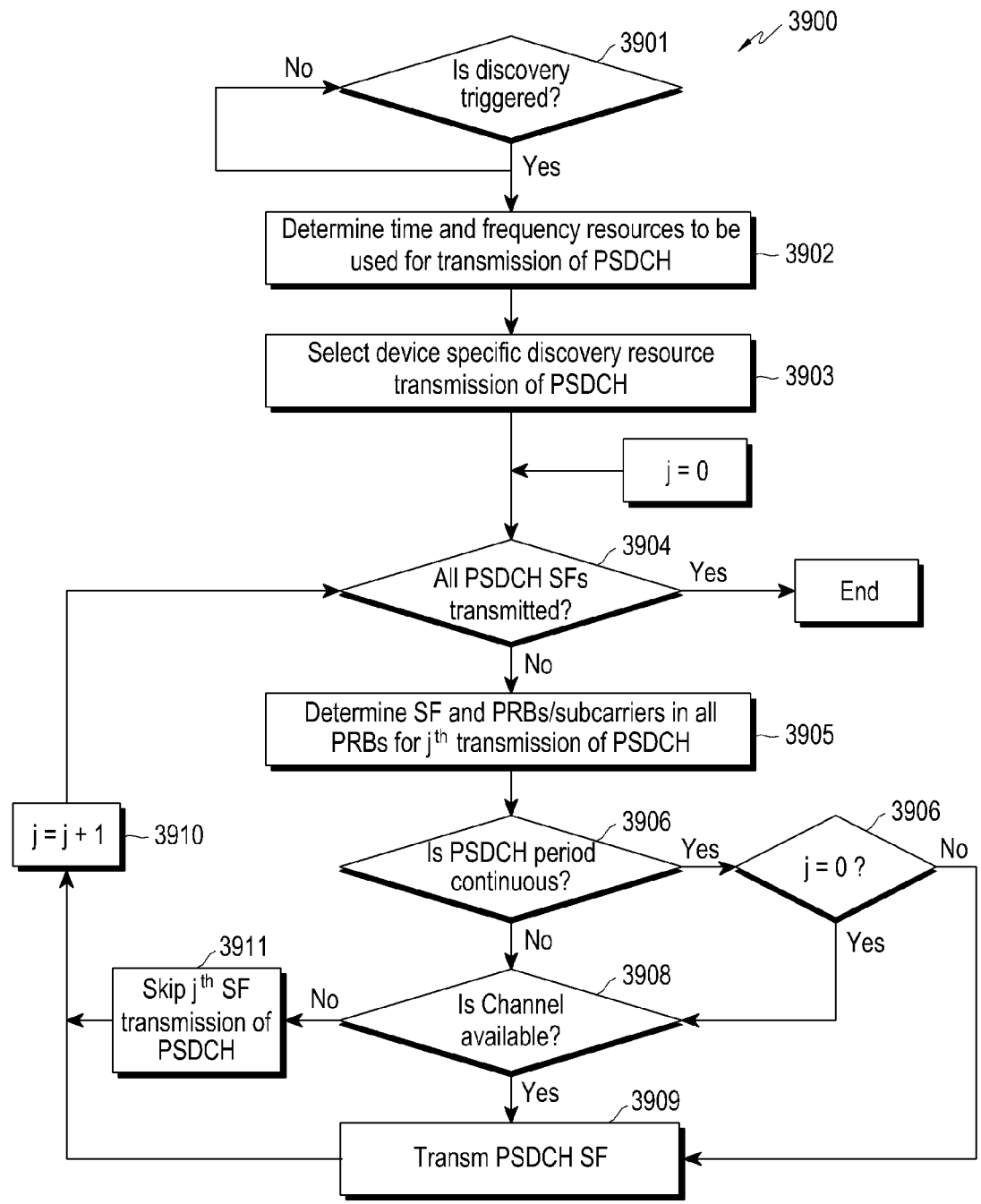
FIG. 39 is a flowchart of a method for transmission of PSDCH, according to embodiment.

FIG. 39 is a flowchart of a method for transmission of PSDCH, according to embodiment. It can be noted that prior to transmission of PSDCH, a device needs to obtain a timing reference from a SyncRef source. The timing reference can be obtained either from the network (PNA, ANA and NC modes) or can be set randomly (SO mode) by the device. If the timing reference is obtained from the network, then the network can act as the SyncRef source. In ANA mode, the device can obtain the timing reference from the network as the device is within the coverage area of the network. In PNA mode, as the device is not within the coverage area of the home network, the device can obtain the timing reference from another network. In such cases, the other network may not know that the device is using its timing reference, i.e., the device is using the network as a SyncRef source. Based on the timing reference, either PSDCH (discovery message) can be transmitted by the device or PSDCH from other devices can be decoded by the device.

At step 3901, the method includes determining whether a device has triggered discovery. The triggering can be performed in order to indicate that the device intends to initiate PSDCH transmission and obtain resources (discovery resources) for transmission of PSDCH.

At step 3902, method includes determining the time and frequency resources to transmit PSDCH. The device can obtain the time resources (SFs) and frequency resources (PRBs), in the unlicensed band, in which PSDCH can be transmitted. The time and frequency resources indicate the SFs and PRBs within the SFs, in a discovery period, which are valid for PSDCH transmission. If the device is operating in NC mode, the time and frequency resources can be received from the network, with which the device is connected to. In ANA mode of operation, the device can receive broadcast information from the network. The broadcast information can include a set of time and frequency resources, from which the device can select discovery resources for transmission of PSDCH. In PNA and SO modes of operation, the device can select time and frequency resources from preconfigured information, which can be stored in the device.

At step 3903, the method includes selecting a particular discovery resource ($DR_i$), within the time and frequency resources, for transmission of PSDCH. In NC mode, the network can allocate the $DR_i$ for the device. In ANA mode, the device can select the $DR_i$ from the set of available $DR_i$'s (time and frequency resources) broadcasted by the network. In PNA mode and SO mode, the $DR_i$ can be selected by the device from the set of available $DR_i$'s (time and frequency resources) stored in the device.

The device can determine SFs and PRBs in the SFs/subcarriers of all PRBs in the SFs, which correspond to a discovery resource $DR_i$. A plurality of SFs can correspond to a particular $DR_i$ if repetitions of PSDCH are transmitted. The PSDCH can be transmitted in a plurality of SFs, wherein transmissions in at least one among the plurality of SFs can be repetitions of PSDCH.

A discovery period (time period of PSDCH transmission) can include a plurality of SFs, corresponding to the selected discovery resource, valid for transmission of PSDCH. Discovery periods, in which PSDCH can be transmitted, occur with periodicity of $D_p$ across SFNs. Each discovery period can be represented by an index 'i'. The SFs in which PSDCH transmission occur within a discovery period, can be represented by an index 'j'. The valid SFs correspond to the selected discovery resource. In an $i^{th}$ discovery period, 'j' can be initialized to 0, wherein j=0 and j>0 represent the first PSDCH transmission and its repetitions respectively. The maximum value of 'j' can be equal to number of PSDCH transmissions (which can include repetitions) in a discovery period. In an example, if PSDCH is transmitted in four SFs, then the maximum value of the 'j' can be 3; wherein j=0 corresponds to the first PSDCH transmission in the first SF, and j=1-3 corresponds to the three repetitions of the PSDCH transmission in the other three SFs.

At step 3904, the method includes determining whether all PSDCH transmissions (in the valid SFs) corresponding to the selected discovery resource in the $i^{th}$ discovery period have been transmitted. If all PSDCH transmissions for the selected discovery resource in the $i^{th}$ discovery period have not been transmitted, then the method includes, at step 3905, determining the SF and PRBs in the SF/subcarriers of all PRBs in the SF, for the $j^{th}$ PSDCH transmission. At step 3906, the method includes determining whether the PSDCH period is continuous. If the PSDCH period is continuous, then the method includes, at step 3907, determining whether the SF, to be transmitted, corresponds to $1^{st}$ PSDCH transmission. If the index 'j' is equal to 0, the method includes determining, at step 3908, whether the channel is available. The determination is carried out only if 'j' is equal to 0. As the PSDCH period is continuous, the availability of the channel needs to be determined only at the $1^{st}$ instance, i.e., 'j' is equal to 0. The availability of the channel can be determined using LBT procedures. It can be noted that the method of performing channel access check (determining availability of the channel for transmission) can either be fixed or vary. If it is determined that the channel is available, then the method includes, at step 3909, transmitting the $j^{th}$ PSDCH transmission. At step 3910, the method includes incrementing the index 'j' by 1.

If the PSDCH period is discontinuous, then the method includes determining, at step 3908, whether the channel is available. As the PSDCH period is discontinuous, the availability of the channel needs to be determined for transmission of all PSDCH SFs (for all indices of 'j' corresponding to the selected discovery resource). If it is determined that the channel is available, then the method includes, at step 3909, transmitting the $j^{th}$ PSDCH SF. At step 3910, the method includes incrementing the index 'j' by 1. If it is determined that the channel is not available, then the method includes, at step 3911, skipping the transmission of the $j^{th}$ PSDCH SF. Thereafter, the method includes, at step 3910 incrementing the index 'j' by 1.

The various actions in the flowchart 3900 may be performed in the order presented, in a different order or simultaneously. Further, in some embodiments, some actions listed in FIG. 39 may be omitted.

Figure 40:
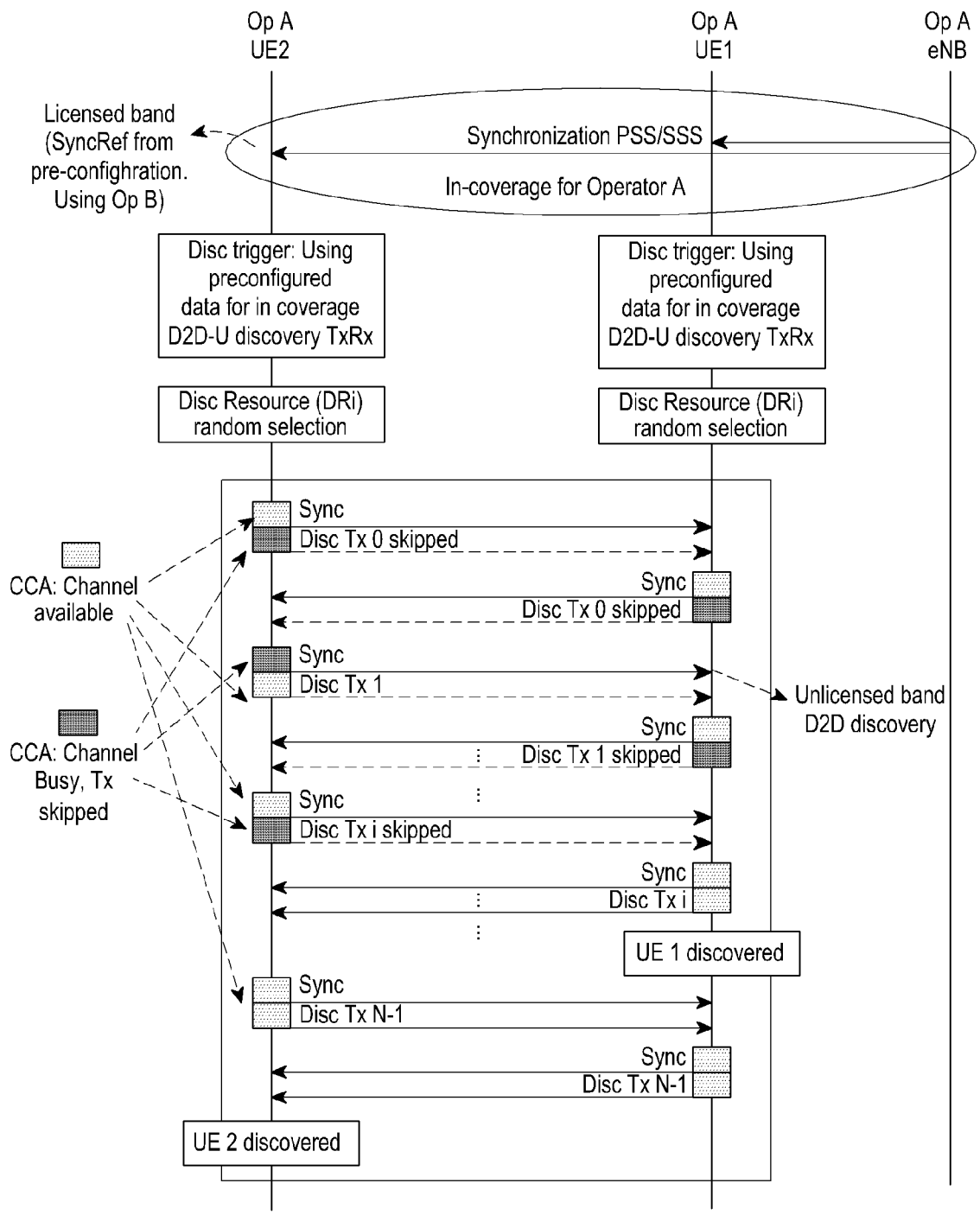
FIG. 40 is a flow diagram of a selection of SyncRef source and a discovery of devices in PNA mode of D2D-U operation, according to embodiment.

FIG. 40 is a flow diagram of a selection of SyncRef source and a discovery of devices in PNA mode of D2D-U operation, according to embodiment. As depicted in FIG. 40, the devices involved in the D2D-U operation are UE1 and UE2. The UEs belong to an operator A and are within the coverage area of the eNB of operator A. The UEs can obtain timing reference from the eNB, i.e., choose the eNB as the SyncRef source. The timings of PSS and/or SSS transmissions by the eNB can be utilized by the UEs to attain synchronization. As D2D-U mode of operation is PNA, the eNB may not be aware of the fact that the UEs have selected it as the SyncRef source for obtaining the timing reference.

As the UEs are operating in PNA mode, the UEs can select time and frequency resources, for transmission and reception of PSDCH, based on preconfigured data. The selection of time and frequency resources can be initiated when discovery trigger is initiated by the UEs, which indicate the intention of the UEs to be discovered by other UEs. The time and frequency resources (SFs and PRBs), within a discovery period, which are valid for PSDCH transmission, can be obtained from the preconfigured data. In PNA mode, the preconfigured data, from which the time and frequency resources are obtained, can be stored in the UEs. It can be noted that, in ANA mode of D2D-U operation, the preconfigured data can be broadcast by the eNB or can be stored in the UEs.

The UEs can, thereafter, randomly select discovery resources ($DR_i$'s), within the time and frequency resources, to transmit PSDCH. It can be noted that, in ANA mode of D2D-U operation, the UEs can select the $DR_i$'s randomly from the time and frequency resources broadcast by the eNB.

The $DR_i$'s can be SFs and PRBs in the SFs/subcarriers of all PRBs in the SFs, within PSDCH period, which are valid for transmission of PSDCH. The UEs can determine the SF ($SF_i^j$) and the PRBs ($PRB_i^j$) in $SF_i^j$/subcarriers within all PRBs in $SF_i^j$ corresponding to a selected $DR_i$. A plurality of SFs ($SF_i^j$'s) can correspond to a particular $DR_i$, if repetitions of PSDCH are transmitted. The determination can be performed using the parameters viz., $D_{rep}$, $D_p$, $D_{offset}$, and $D_b$ or $D_i$.

The UEs can initiate transmissions in the unlicensed band. In order to perform transmissions on the unlicensed channel, the availability of the channel can be ascertained by the UEs. The UEs can attempt to transmit PSBCH in SFs, which can be determined based on SFs, in which the eNB transmits PSS and/or SSS.

The UE1 can transmit PSDCH and the UE2 may discover UE1. Similarly, UE2 can transmit PSDCH and UE1 may discover UE2. The transmission of PSBCH is prioritized over PSDCH. Once the UEs have discovered each other, the transmission of PSCCH and PSSCH can be initiated.

Figure 41:
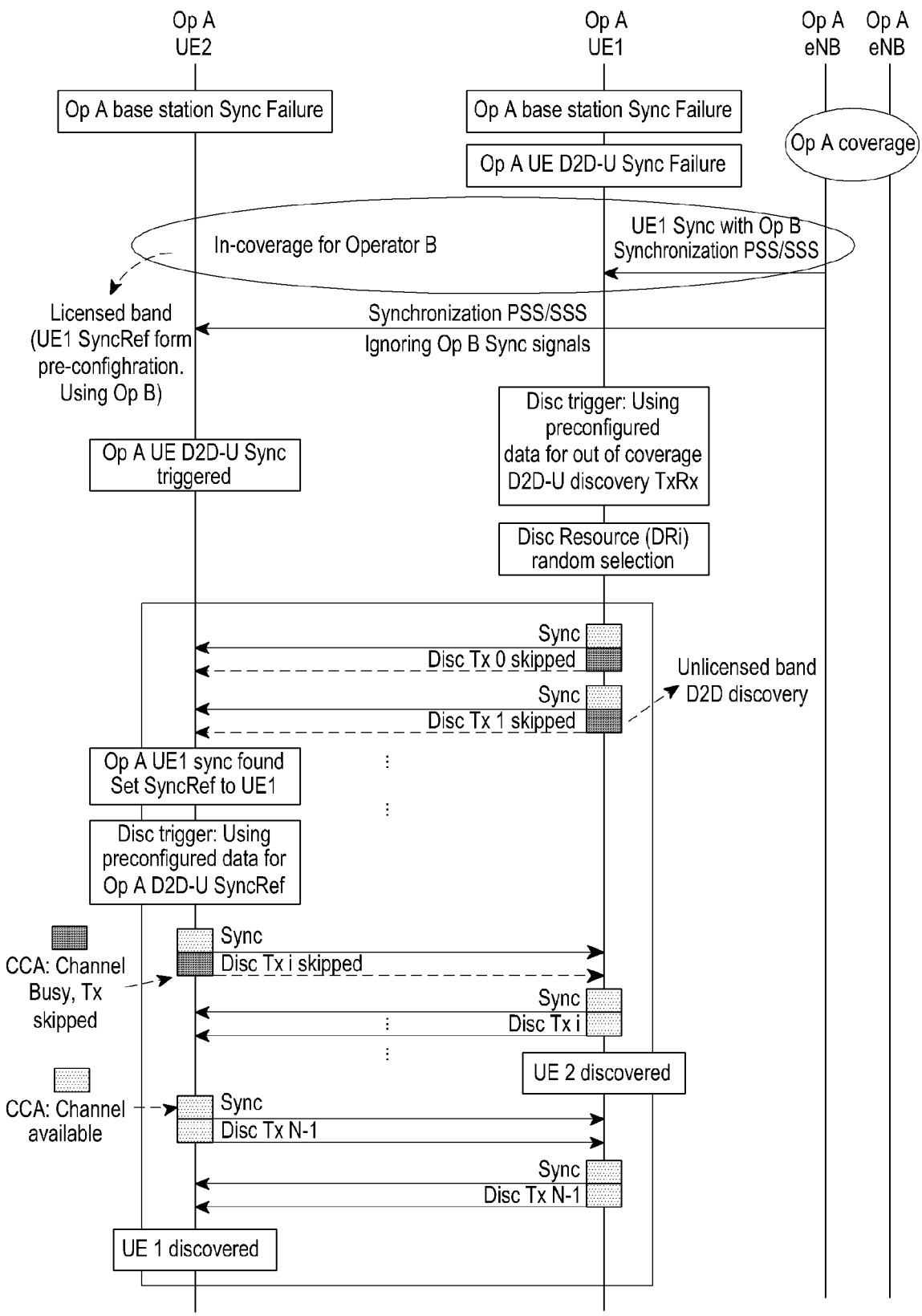
FIG. 41 is a flow diagram of a selection of SyncRef source and a discovery of devices in PNA mode of D2D-U operation, wherein the devices are out of coverage of an operator A, to which they belong, but both devices are within coverage of an operator B, according to embodiment.

FIG. 41 is a flow diagram of a selection of SyncRef source and a discovery of devices in PNA mode of D2D-U operation, wherein the devices are out of coverage of an operator A, to which they belong, but both devices are within coverage of an operator B, according to embodiment.

As depicted in FIG. 41, the devices involved in the D2D-U operation are UE1 and UE2. The UEs belong to the operator A and are not within the coverage area of the eNB of the operator A, but are within the coverage area of the operator B. The UE1 can obtain timing reference from the eNB of the operator B, i.e., choose the eNB of the operator B as the SyncRef source. The eNB of operator B may or may not be aware of the fact that UE1 has selected it as the SyncRef source for obtaining the timing reference. The timings of PSS and/or SSS transmissions by the eNB can be utilized by the UE1 to attain synchronization. As the UEs are not within the coverage area of the operator A, D2D-U operations cannot be carried out in ANA mode. The UE2 can obtain the timing reference by triggering synchronization. The UE2 can obtain the timing reference from UE1, i.e., utilize UE1 as the SyncRef source.

As the UEs are operating in PNA mode, the UEs can select time and frequency resources, for transmission and reception of PSDCH, based on preconfigured data. The selection of time and frequency resources can be initiated when discovery trigger is initiated by UE1, which indicate the intention of UE1 to be discovered by UE2 and other UEs within the range of UE1. The time and frequency resources (SFs and PRBs), within a discovery period, which are valid for PSDCH transmission, can be obtained by UE1 from the preconfigured data stored in UE1.

The UE1 can randomly select discovery resources ($DR_i$'s), within the time and frequency resources, to transmit PSDCH. The $DR_i$'s can be SFs and PRBs in the/subcarriers in all PRBs, within PSDCH period, which are valid for transmission of PSDCH. The UE1 can determine the SF ($SF_i^j$) and the PRBs ($PRB_i^j$) in the SF/subcarriers within all PRBs in the ($SF_i^j$), corresponding to a selected $DR_i$. A plurality of SFs ($SF_i^j$'s) can correspond to a particular $DR_i$, if repetitions of PSDCH are transmitted. The determination can be performed using the parameters viz., $D_{rep}$, $D_p$, $D_{offset}$, and $D_b$ or $D_l$.

The UE1 can, thereafter, initiate transmissions in the unlicensed band. In order to perform transmissions on the unlicensed channel, the UE1 can ascertain the availability of the channel. The UE1 can transmit PSBCH in SFs, which can be determined based on the SFs in which the eNB of operator 2 transmits PSS and/or SSS. When discovery trigger is initiated at UE2, it can receive the PSBCH from UE1. The time and frequency resources can be obtained by UE2 from the preconfigured data stored in UE2. The selection of time and frequency resources can be initiated when discovery trigger is initiated by UE2, which indicate the intention of the UE2 to be discovered by other UE1.

The UE2 can, thereafter, randomly select $DR_i$'s, within the time and frequency resources, to transmit PSDCH. The UE2 can determine the SF ($SF_i^j$) and the PRBs ($PRB_i^j$) in the $SF_i^j$/subcarriers within all PRBs in the $SF_i^j$, corresponding to a selected $DR_i$. A plurality of SFs ($SF_i^j$'s) can correspond to a particular $DR_i$, if repetitions of PSDCH are transmitted. The determination can be performed using the parameters viz., $D_{rep}$, $D_p$, $D_{offset}$, and $D_b$ or $D_l$.

Once PSBCH is successfully received, UE1 and UE2 can receive PSDCH from each other.

Figure 42:
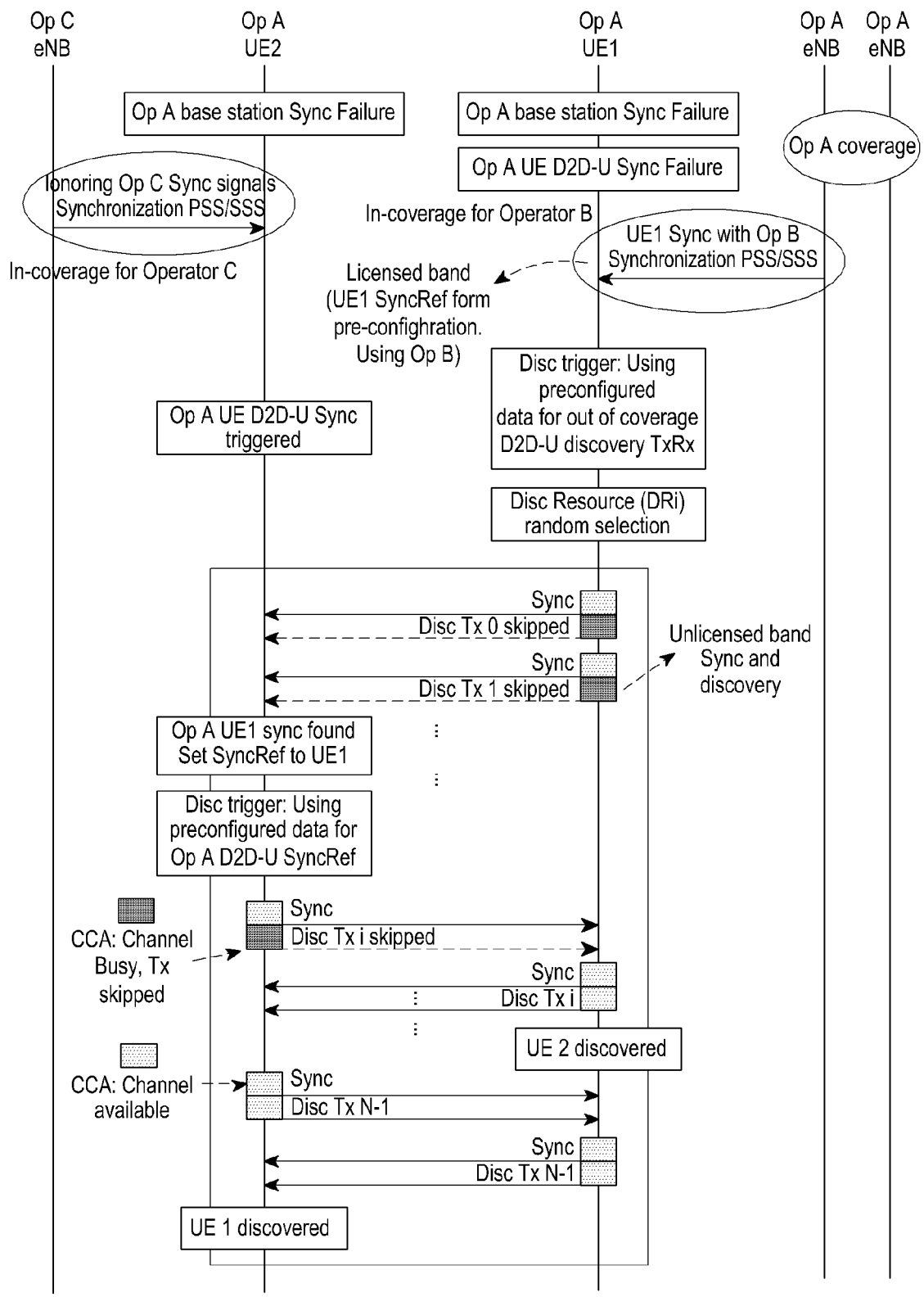
FIG. 42 is a flow diagram of a selection of SyncRef source and a discovery of devices in PNA mode of D2D-U operation, wherein the devices are out of coverage of an operator A and within coverage of an operator B and an operator C, according to embodiment.

FIG. 42 is a flow diagram of a selection of SyncRef source and a discovery of devices in PNA mode of D2D-U operation, wherein the devices are out of coverage of an operator A and within coverage of an operator B and an operator C, according to embodiment.

As depicted in FIG. 42 the devices involved in the D2D-U operation are UE1 and UE2. The UEs belong to an operator A and are not within the coverage area of the eNB of operator A. UE1 is within coverage area of the operator B and UE2 is in coverage area of the operator C. The UE1 can obtain timing reference from the eNB of the operator B, i.e., choose the eNB of the operator B as the SyncRef source. The eNB of operator B may or may not be aware of the fact that UE1 has selected it as the SyncRef source for obtaining the timing reference. The timings of PSS and/or SSS transmissions by the eNB can be utilized by the UE1 to attain synchronization. The UE2 can obtain the timing reference by triggering synchronization. The UE2 does not obtain timing reference from operator C. Instead, the UE2 can obtain the timing reference from UE1, i.e., select UE1 as the SyncRef source.

Rest of the description of FIG. 42 is identical to the description of FIG. 41. For the sake of brevity, they have not been repeated here.

Figure 43:
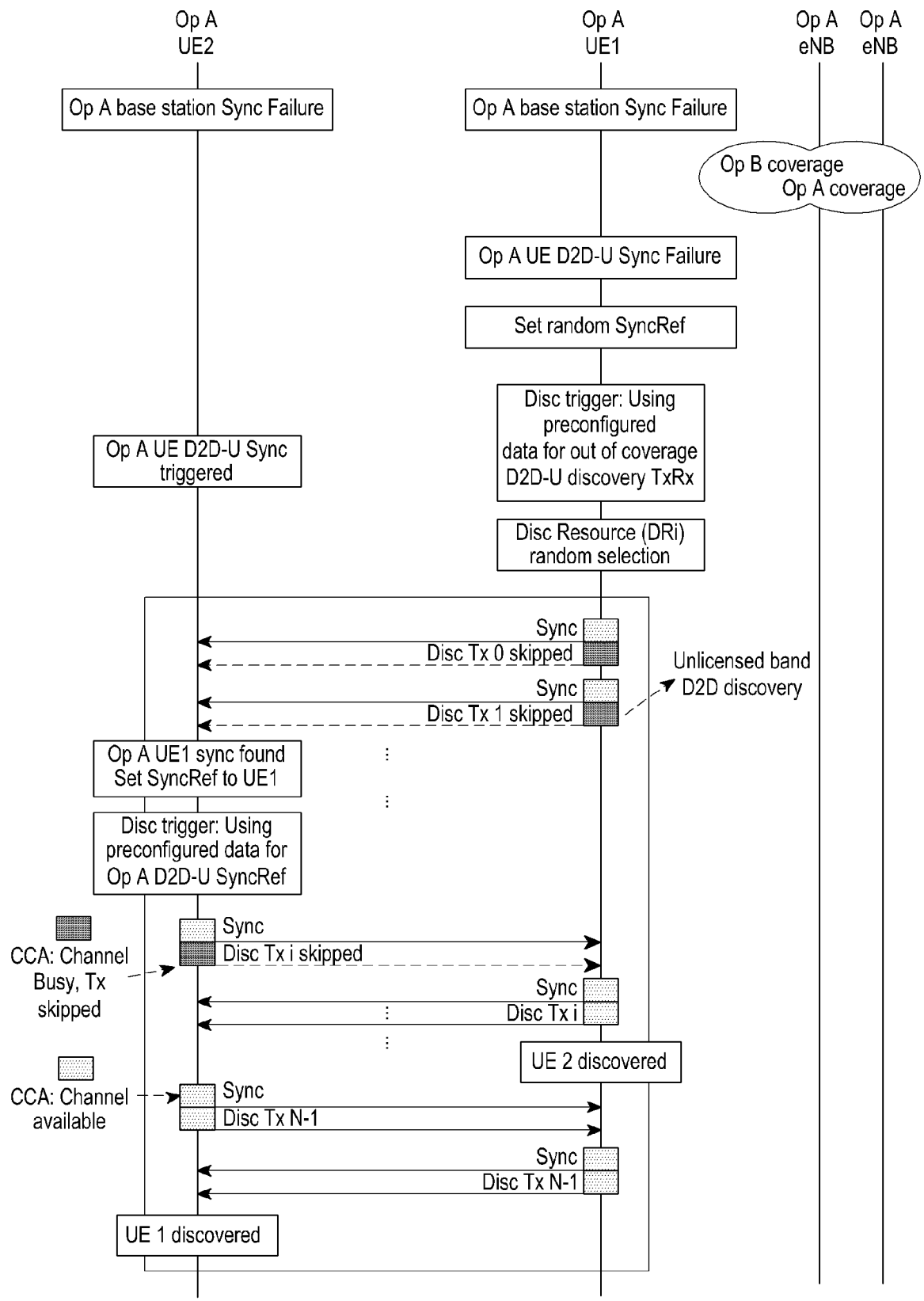
FIG. 43 is a flow diagram of a selection of SyncRef source and a discovery of devices in SO mode of D2D-U operation, according to embodiment.

FIG. 43 is a flow diagram of a selection of SyncRef source and a discovery of devices in SO mode of D2D-U operation, according to embodiment. As depicted in FIG. 43 the devices involved in the D2D-U operation are UE1 and UE2. The UEs belong to an operator A and are not within the coverage area of the eNB of operator A. The UE1 may not be able to obtain timing reference from the eNB of the operator B. Therefore, the UE1 can attempt to obtain timing reference from a D2D-U UE. The UE1 may still not be able to obtain timing reference from the D2D-U UE.

In such circumstances, the UE can select the timing reference using either of random method, GPS based method, and EARFCN based method. The descriptions of the methods can be referred to in FIG. 20. The UE1 can attain synchronization based on a timing which is chosen based on one of the above mentioned methods. The UE2 can obtain the timing reference by triggering synchronization.

Rest of the description of FIG. 43 is identical to the description of FIG. 41. For the sake of brevity, they have not been repeated here.

Figure 44:
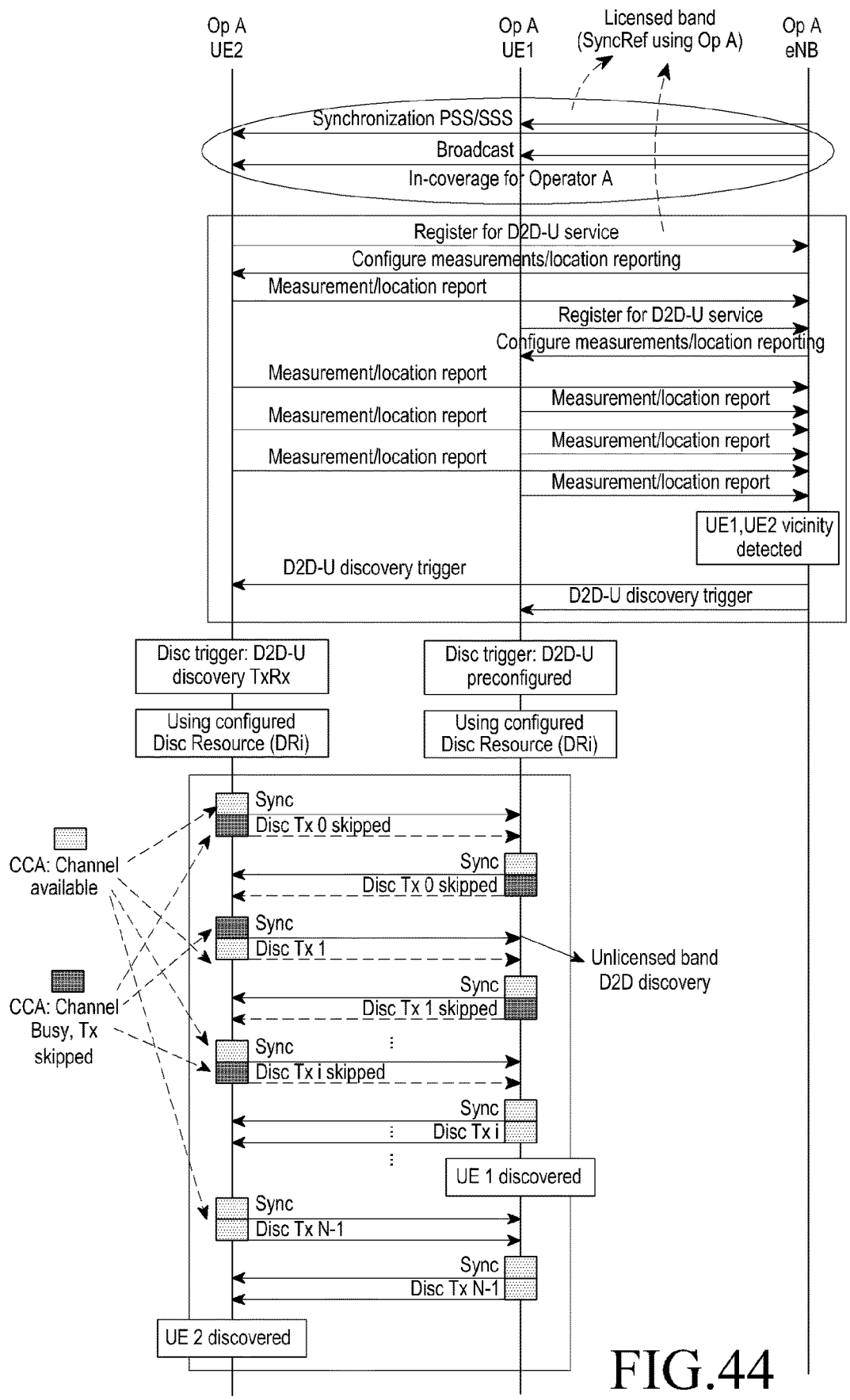
FIG. 44 is a flow diagram of a selection of SyncRef source and a discovery of devices in NC mode of D2D-U operation, according to embodiment.

FIG. 44 is a flow diagram of a selection of SyncRef source and a discovery of devices in NC mode of D2D-U operation, according to embodiment. As depicted in FIG. 44, the devices involved in the D2D-U operation are UE1 and UE2. The UEs belong to an operator A and are within the coverage area of the eNB of operator A. The UEs can obtain timing reference from the eNB, i.e., choose the eNB as the SyncRef source. The timings of PSS and/or SSS transmissions by the eNB can be utilized by the UEs to attain synchronization. The eNB can broadcast time and frequency resources, to the UEs, valid for transmission of PSBCH and PSDCH.

The UEs can register with the eNB, indicating their willingness to involve in D2D-U operations. In an example, consider that UE2 requires receiving a service using D2D-U communications. In order to receive the service, the UE2 may register with the eNB and can inform the eNB about its requirement to receive the service using D2D-U. Meanwhile, the UE1 can also register with the eNB and inform the eNB about the services it can provide. If the service requested by UE2 is provided by UE1 and if the eNB can detect that the UE1 and UE2 are in vicinity to have D2D-U communications, then the eNB can trigger discovery.

As the UEs are operating in NC mode, the eNB can broadcast time and frequency resources, to the UEs, for transmitting and receiving PSDCH. The time and frequency resources (SFs and PRBs), can be broadcast based on configured data stored in the eNB. The eNB can select $DR_i$'s, within the time and frequency resources, in which the UEs can transmit PSDCH. The UEs can determine the SF ($SF_i^j$) and the PRBs ($PRB_i^j$) in the ($SF_i^j$)/subcarriers within all PRBs in the ($SF_i^j$), corresponding to a selected $DR_i$. A plurality of SFs ($SF_i^j$'s) can correspond to a particular $DR_i$, if repetitions of PSDCH are transmitted. The determination can be performed using the parameters viz., $D_{rep}$, $D_p$, $D_{offset}$, and $D_b$ or $D_l$.

The UEs can initiate transmissions in the unlicensed band. In order to perform transmissions on the unlicensed channel, the availability of the channel can be ascertained by the UEs. The UEs can transmit PSBCH in SFs, which can be determined based on the SFs in which the eNB transmits PSS and/or SSS. Once PSBCH is successfully transmitted, the UE1 can transmit PSDCH, in order to allow UE2 to discover UE1. Similarly, UE2 can transmit PSDCH, in order to allow UE1 to discover UE2. Once the UEs have discovered each other, the transmission of PSCCH and PSSCH can be initiated.

Figure 45:
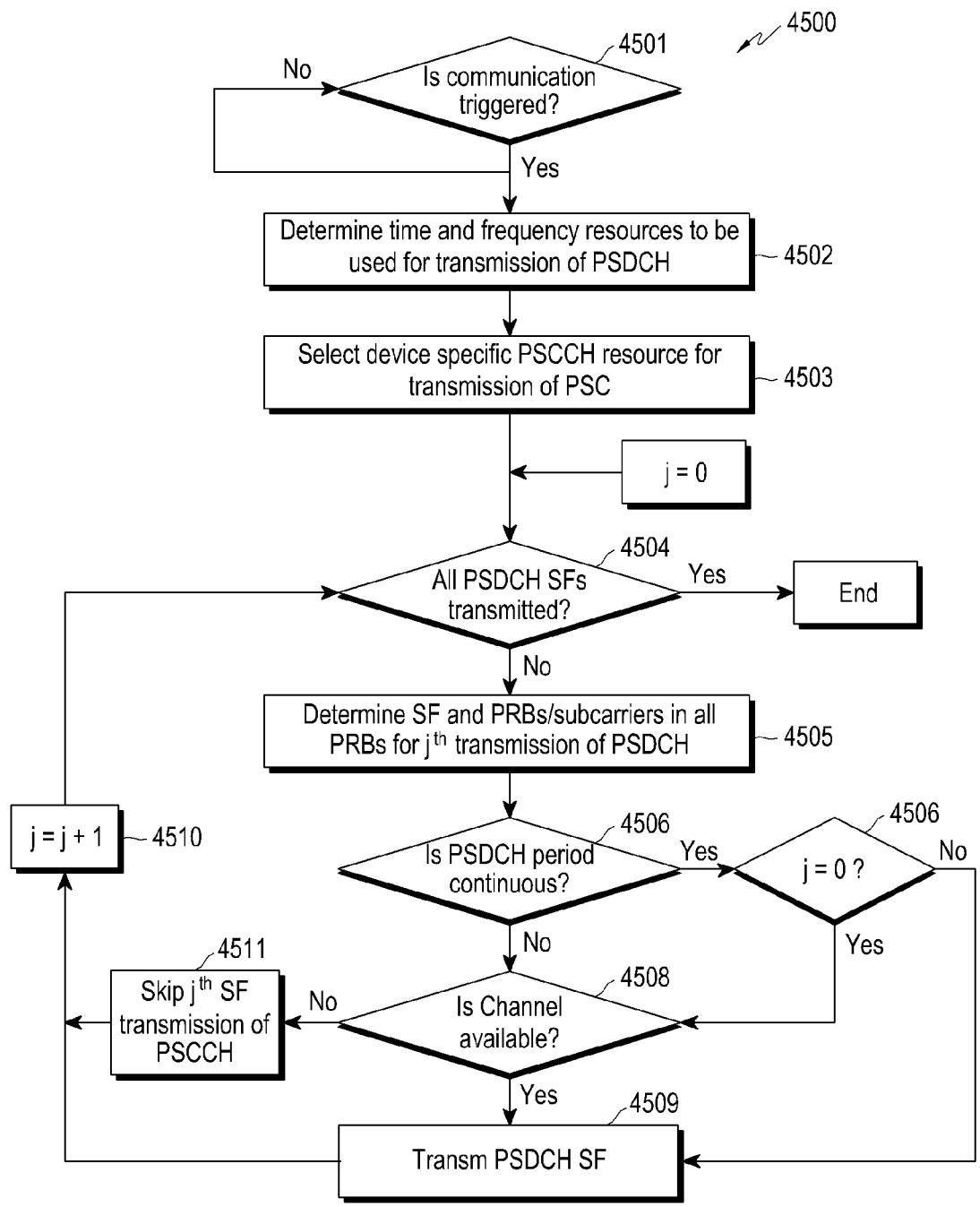
FIG. 45 is a flowchart of a method for transmission of PSCCH, according to embodiment.

FIG. 45 is a flowchart 4500 of a method for transmission of PSCCH, according to embodiment. It can be noted that prior to transmission of PSDCH, a device can obtain a timing reference from a SyncRef source. At step 4501, the method includes determining whether a device has triggered communication. The triggering can be performed in order to indicate that the device indents to initiate D2D-U communication and obtain resources (PSCCH resources) for transmission of PSCCH.

At step 4502, method includes determining the time and frequency resources, to transmit PSCCH. The device can obtain the time resources (SFs) and frequency resources (PRBs), in the unlicensed band, in which PSCCH can be transmitted. The time and frequency resources indicate the SFs and PRBs within the SFs, in a PSCCH period, which are valid for PSCCH transmission. If the device is operating in NC mode, the time and frequency resources can be received from the network, with which the device is connected to. In ANA mode of operation, the device can receive broadcast information from the network. The broadcast information can include a set of time and frequency resources, from which the device can select communication resources for transmission of PSCCH. In PNA and SO modes of operation, the device can select the time and frequency resources from preconfigured information, which can be stored in the device.

At step 4503, the method includes selecting a particular communication resource ($n_{PSCCH}$), within the time and frequency resources, for transmission of PSCCH. In NC mode, the network can allocate the $n_{PSCCH}$ for the device. In ANA mode, the device can randomly select the $n_{PSCCH}$ from time and frequency resources, broadcasted by the network. In PNA mode and SO mode, the $n_{PSCCH}$ can be randomly selected from preconfigured information, which can be stored in the device.

The device can determine SFs and PRBs in the SFs/subcarriers of all PRBs in the SFs, which correspond to the communication resource $n_{PSCCH}$. The PSCCH can be transmitted in a plurality of SFs, wherein transmissions in at least one among the plurality of SFs can be repetitions of PSCCH.

A PSCCH period (time period of PSDCH transmission) can include a plurality of SFs, which are valid for transmission of PSCCH. PSCCH periods, in which PSCCH can be transmitted, occur with periodicity of $C_p$ across SFNs. Each PSCCH period can be represented by an index 'i'. The SFs which are valid for PSDCH transmission, within a PSCCH period, can be represented by an index 'j'. The valid SFs correspond to the selected $n_{PSCCH}$. In an $i^{th}$ discovery period, 'j' can be initialized to 0, wherein j=0 and j>0 represent the first PSCCH transmission and its repetitions respectively. The maximum value of 'j' can be equal to the number of PSCCH transmissions in a PSCCH period.

At step 4504, the method includes determining whether all PSCCH transmissions (in valid SFs) corresponding to the selected $n_{PSCCH}$ in the $i^{th}$ communication period have been transmitted. If all PSCCH SFs in the $i^{th}$ communication period have not been transmitted, then the method includes, at step 4505, determining the SF and PRBs in the SF/subcarriers of all PRBs in the SF, for the $j^{th}$ PSCCH transmission. At step 4506, the method includes determining whether the PSCCH period is continuous. If the PSCCH period is continuous, then the method includes, at step 4507, determining whether the SF, to be transmitted, corresponds to $1^{st}$ PSCCH transmission. As 'j' is initialized to 0, the index of the $1^{st}$ PSCCH transmission will be 0. If the index 'j' is equal to 0, the method includes determining, at step 4508, whether the channel is available. The determination (step 4507) is carried out only if 'j' is equal to 0. As the PSCCH period is continuous, the availability of the channel needs to be determined only at the $1^{st}$ instance, i.e., if 'j' is equal to 0. The availability of the channel can be determined using LBT procedures. It can be noted that the method of performing channel access check (determining availability of the channel for transmission) can either be fixed or vary. If it is determined that the channel is available, then the method includes, at step 4509, transmitting the $j^{th}$ PSDCH SF. At step 4510, the method includes incrementing the index 'j' by 1.

If the PSCCH period is discontinuous, then the method includes determining, at step 4508, whether the channel is available. As the PSCCH period is discontinuous, the availability of the channel needs to be determined for transmission of all PSCCH SFs (for all indices of 'j' corresponding to PSCCH resource $n_{PSCCH}$). If it is determined that the channel is available, then the method includes, at step 4509, transmitting the $j^{th}$ PSCCH SF. At step 4510, the method includes incrementing the index 'j' by 1. If it is determined that the channel is not available, then the method includes, at step 4511, skipping the transmission in SF corresponding to the $j^{th}$ PSCCH SF. Thereafter, the method includes, at step 4510, incrementing the index 'j' by 1.

The various actions in the flowchart 4500 may be performed in the order presented, in a different order or simultaneously. Further, in some embodiments, some actions listed in FIG. 45 may be omitted.

Figure 46:
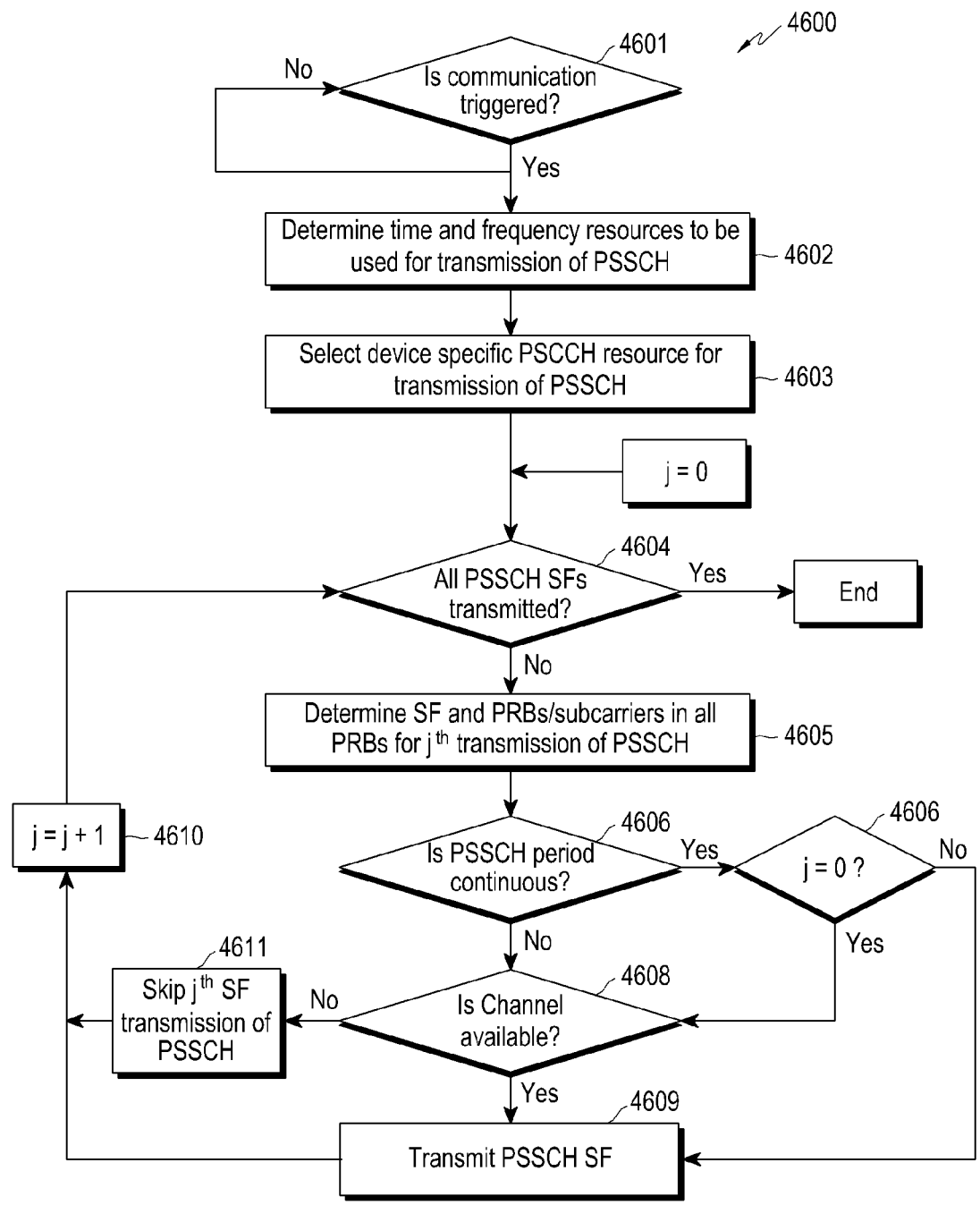
FIG. 46 is a flowchart of a method for transmission of PSSCH, according to embodiment.

FIG. 46 is a flowchart of a method for transmission of PSSCH, according to embodiment. It can be noted that prior to transmission of PSSCH, a device can obtain a timing reference from a SyncRef source. At step 4601, the method includes determining whether a device has triggered communication. The triggering can be performed in order to indicate that the device indents to initiate D2D-U communication and obtain resources (PSSCH resources) for transmission of PSSCH.

At step 4602, method includes determining the time and frequency resources, to transmit PSSCH. The device can obtain the time resources (SFs) and frequency resources (PRBs), in the unlicensed band, in which PSSCH can be transmitted. The time and frequency resources indicate the SFs and PRBs within the SFs, in a PSSCH period, which are valid for PSSCH transmission. At step 4603, the method includes selecting a particular communication resource ($n_{PSSCH}$), from the time and frequency resources, for transmission of PSSCH.

The SFs and PRBs in the SFs/subcarriers within all PRBs of the SFs, in which PSSCH transmissions can be expected by a receiving device; can be obtained from the PSCCH transmissions.

The device can determine SFs and PRBs in the SFs/subcarriers of all PRBs in the SFs, which correspond to the communication resource $n_{PSSCH}$. The PSSCH can be transmitted in a plurality of SFs, wherein transmissions in at least one among the plurality of SFs can be repetitions of PSSCH.

A PSSCH period can include a plurality of SFs, which are valid for transmission of PSSCH. PSSCH periods, in which PSSCH can be transmitted, occur with periodicity of $C_p$ across SFNs. Each PSSCH period can be represented by an index 'i'. The SFs which are valid for PSSCH transmission, within a PSSCH period, can be represented by an index 'j'. The valid SFs correspond to the selected $n_{PSSCH}$. In an $i^{th}$ discovery period, 'j' can be initialized to 0, wherein j=0 and j>0 represent the first PSSCH transmission and its repetitions respectively. The maximum value of 'j' can be equal to the number of PSSCH transmissions in a PSSCH period.

At step 4604, the method includes determining whether all PSSCH transmissions (in valid SFs) corresponding to the selected $n_{PSSCH}$ in the $i^{th}$ communication period have been transmitted. If all PSSCH SFs in the $i^{th}$ discovery period have not been transmitted, then the method includes, at step 4605, determining the SF and PRBs in the SF/subcarriers of all PRBs in the SF, for the $j^{th}$ PSSCH transmission. At step 4606, the method includes determining whether the PSSCH period is continuous. If the PSSCH period is continuous, then the method includes, at step 4607, determining whether the SF, to be transmitted, corresponds to $1^{st}$ PSSCH transmission. As 'j' is initialized to 0, the index of the $1^{st}$ PSSCH transmission will be 0. If the index 'j' is equal to 0, the method includes determining, at step 4608, whether the channel is available. The determination (step 4607) is carried out only if 'j' is equal to 0. As the PSSCH period is continuous, the availability of the channel needs to be determined only at the 1st instance, i.e., if 'j' is equal to 0. The availability of the channel can be determined using LBT procedures. It can be noted that the method of performing channel access check (determining availability of the channel for transmission) can either be fixed or vary. If it is determined that the channel is available, then the method includes, at step 4609, transmitting the $j^{th}$ PSSCH SF. At step 4610, the method includes incrementing the index 'j' by 1.

If the PSSCH period is discontinuous, then the method includes determining, at step 4608, whether the channel is available. As the PSSCH period is discontinuous, the availability of the channel needs to be determined for transmission of all PSSCH SFs (for all indices of 'j' corresponding to PSSCH resource $n_{PSSCH}$). If it is determined that the channel is available, then the method includes, at step 4609, transmitting the $j^{th}$ PSSCH SF. At step 4610, the method includes incrementing the index 'j' by 1. If it is determined that the channel is not available, then the method includes, at step 4611, skipping the transmission in the SF corresponding to the $j^{th}$ PSSCH SF. Thereafter, the method includes, at step 4610, incrementing the index 'j' by 1.

The various actions in the flowchart 4600 may be performed in the order presented, in a different order or simultaneously. Further, in some embodiments, some actions listed in FIG. 46 may be omitted.

Figure 47:
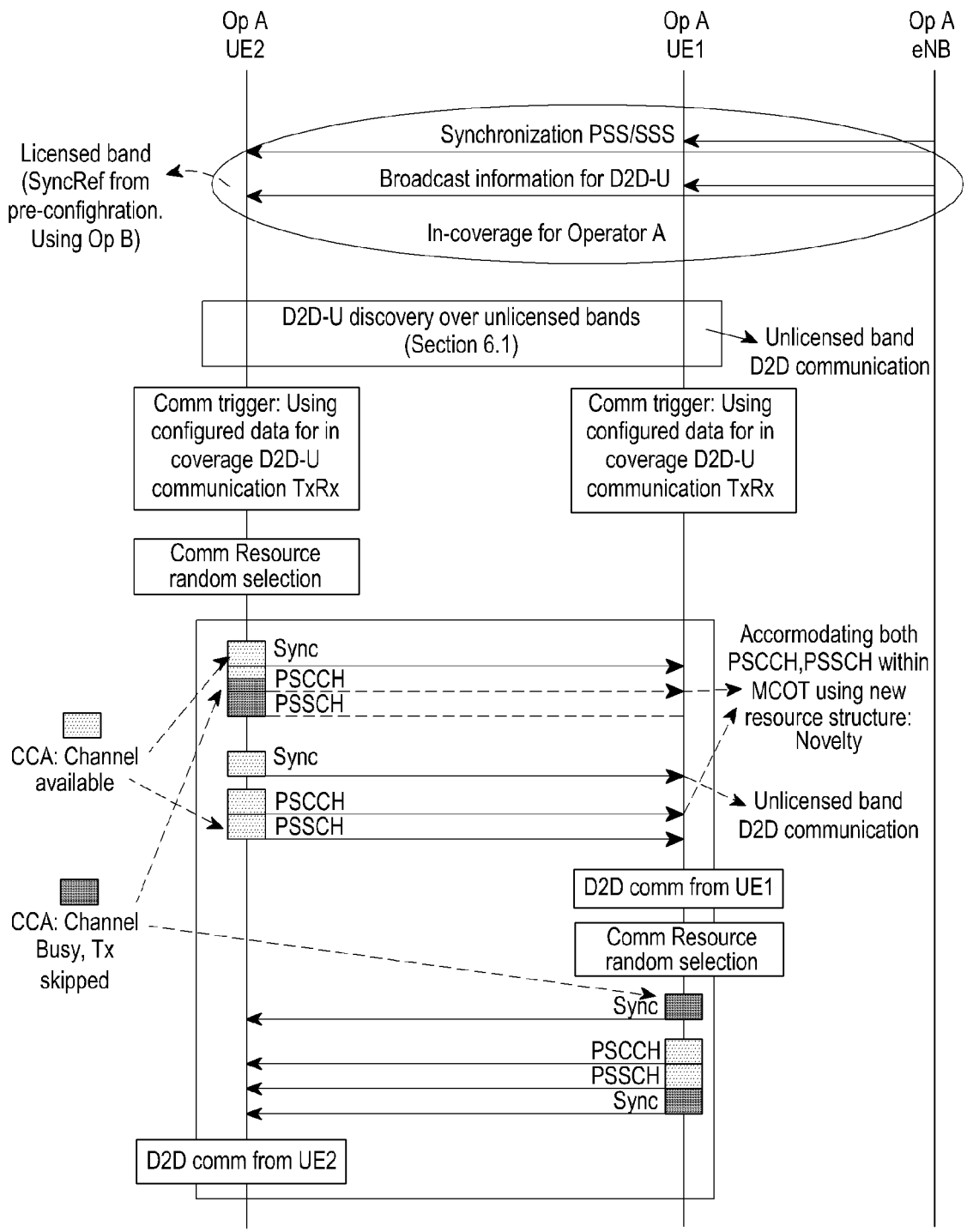
FIG. 47 is a flow diagram of a D2D-U communication in ANA mode of, wherein the devices are within coverage of an operator A, according to embodiment.

FIG. 47 is a flow diagram of a D2D-U communication in ANA mode of, wherein the devices are within coverage of an operator A, according to embodiment. The D2D-U communication refers to transmission of PSCCH and PSSCH. The D2D-U communications can be initiated once PSBCH and PSDCH have been transmitted. The procedures for transmission of PSBCH and PSDCH in different modes are described in FIGS. 40-44.

As depicted in FIG. 47, the devices involved in the D2D-U operation are UE1 and UE2. The UEs belong to the operator A and are within the coverage area of the eNB of the operator A. As such the UEs can operate in ANA mode. The UEs can obtain timing reference from the eNB of operator A. The timings of PSS and/or SSS transmissions by the eNB can be utilized by the UEs to attain synchronization. The eNB can broadcast preconfigured data, which includes a set of time and frequency resources (communication parameters), from which the UEs can select $n_{PSCCH}$ and $n_{PSSCH}$ for carrying out D2D-U operations.

The $n_{PSCCH}/n_{PSSCH}$ can be used to determine SFs and PRBs/subcarriers within PSCCH/PSSCH period, which are valid for transmission of PSCCH/PSSCH. The UEs can determine the SF ($SF_i^j$) and the PRBs/subcarriers ($PRB_i^j$) corresponding to the selected $n_{PSCCH}/n_{PSSCH}$. The determination can be performed using the parameters viz., $C_p$, $O_{PSCCH/PSSCH}$, $N_{PSCCH/PSSCH}$, $B_{PSCCH/PSSCH}$ and $1_{PSCCH/PSSCH}$.

The UE2 can randomly select $n_{PSCCH}/n_{PSSCH}$ based on the time and frequency resources broadcast by the eNB. Considering that the UEs have synchronized all transmissions between themselves and have discovered each other, the UE2 can initiate transmission of PSCCH and PSSCH in $n_{PSCCH}$ and $n_{PSSCH}$. The PSCCH transmissions can include information of SFs and PRBs/subcarriers in which PSSCH transmissions can be expected by UE1. Similarly, the UE1 can initiate PSCCH/PSSCH transmissions. The UEs can determine availability of the unlicensed channel prior to initiating PSCCH/PSSCH transmissions.

Figure 48:
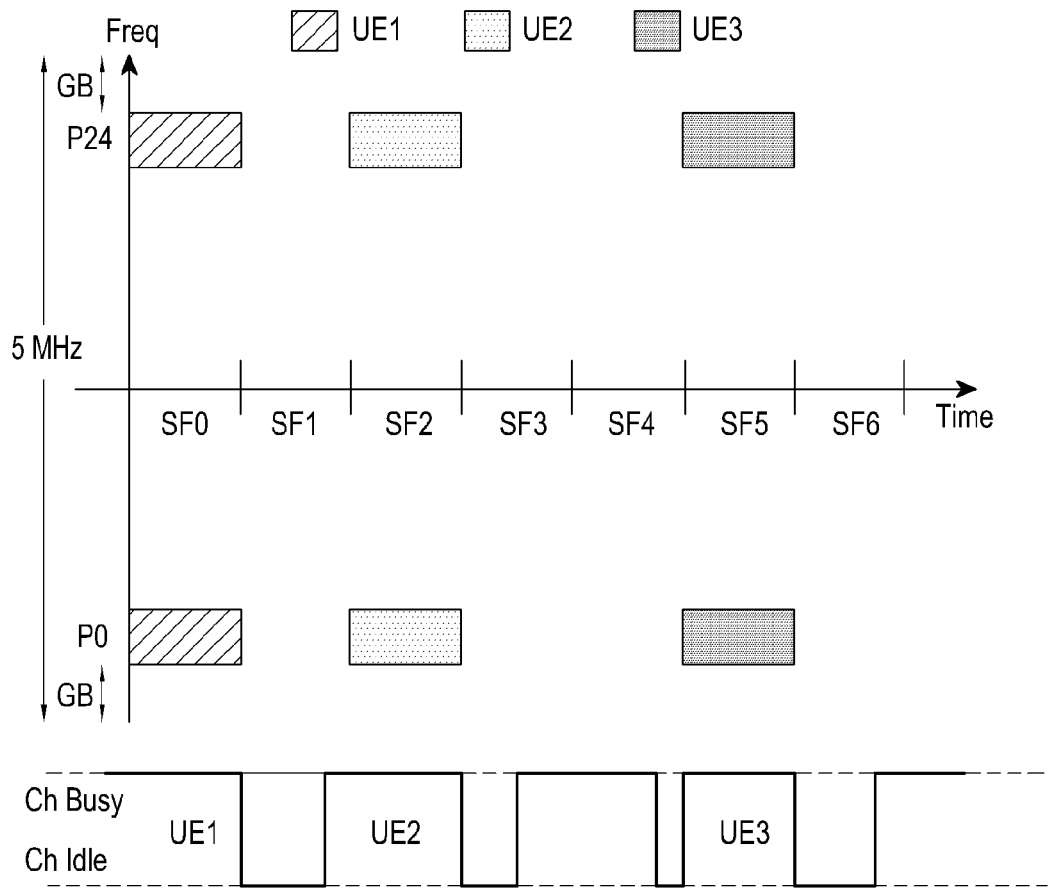
FIG. 48 is an illustration of a first method for achieving extension of transmission range of PSDCH in 5 MHz unlicensed bandwidth, according to embodiment.

FIG. 48 is an illustration of a first method for achieving extension of transmission range of PSDCH in 5 MHz unlicensed bandwidth, according to embodiment. The transmission range of devices involved in D2D-U operations can be maximized by appropriate distribution of power to narrow frequency sub-bands of the unlicensed bandwidth. The devices need to fulfill the regulatory requirement of distributing maximum transmittable power in 80% of the unlicensed bandwidth (utilize 80% of the bandwidth) in order to operate in the unlicensed band.

If transmitted power from a device is confined to narrow bandwidth, the range of transmission can increase; and if the transmitted power is spread across a large bandwidth, the range of transmission can decrease. The range of D2D-U transmissions needs to be increased, while meeting the regulatory requirement, in order to achieve improved discovery performance as data transfer involved in D2D-U operations such as PSDCH transmission is less.

The minimum number of PRBs required for transmission of PSDCH is computed as 2. As depicted in FIG. 48, the two PRBs can be mapped at the extreme ends, i.e., PRB0 and PRB24, in order to meet the regulatory requirement of utilization of minimum bandwidth for unlicensed band operation. In an example, multiple UEs, viz., UE1, UE2 and UE3, can share the same resource (PRBs) through time division multiplexing after sensing the channel to be available. The UE1, UE2 and UE3 can occupy PRB0 and PRB24 in SF0, SF2 and SF5 respectively.

Figure 49:
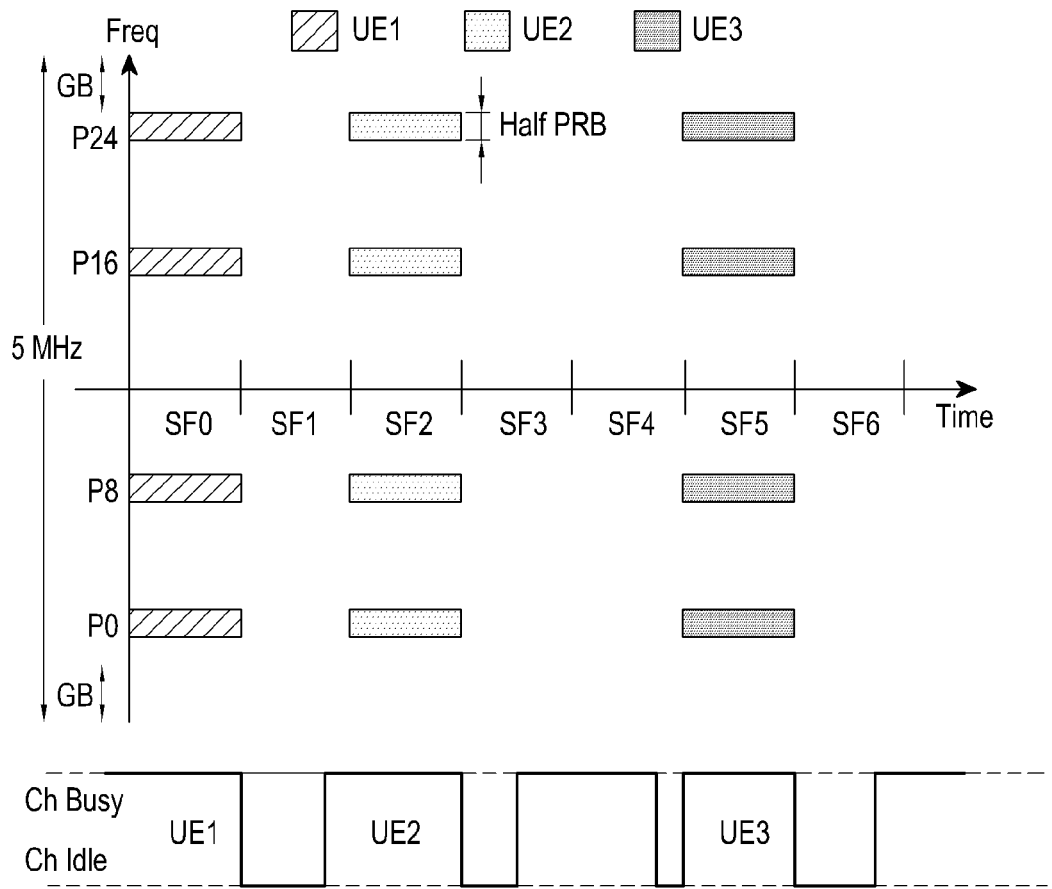
FIG. 49 is an illustration of a second method for achieving extension of transmission range of PSDCH in 5 MHz unlicensed bandwidth, according to embodiment.

FIG. 49 is an illustration of a second method for achieving extension of transmission range of PSDCH in 5 MHz unlicensed bandwidth, according to embodiment. As depicted in FIG. 49, the PSDCH transmissions of UE1, UE2 and UE3 can be mapped in 4 half PRBs, i.e., the PSDCH occupies half of the subcarriers in each of the 4 PRBs. The PSDCH transmissions of UE1, UE2, and UE3, in the 4 half PRBs can be multiplexed in time. The PSDCH transmissions of UE1, UE2, and UE3, can be mapped in half of the total number of subcarriers in PRB0, PRB8, PRB16, and PRB24.

Figure 50:
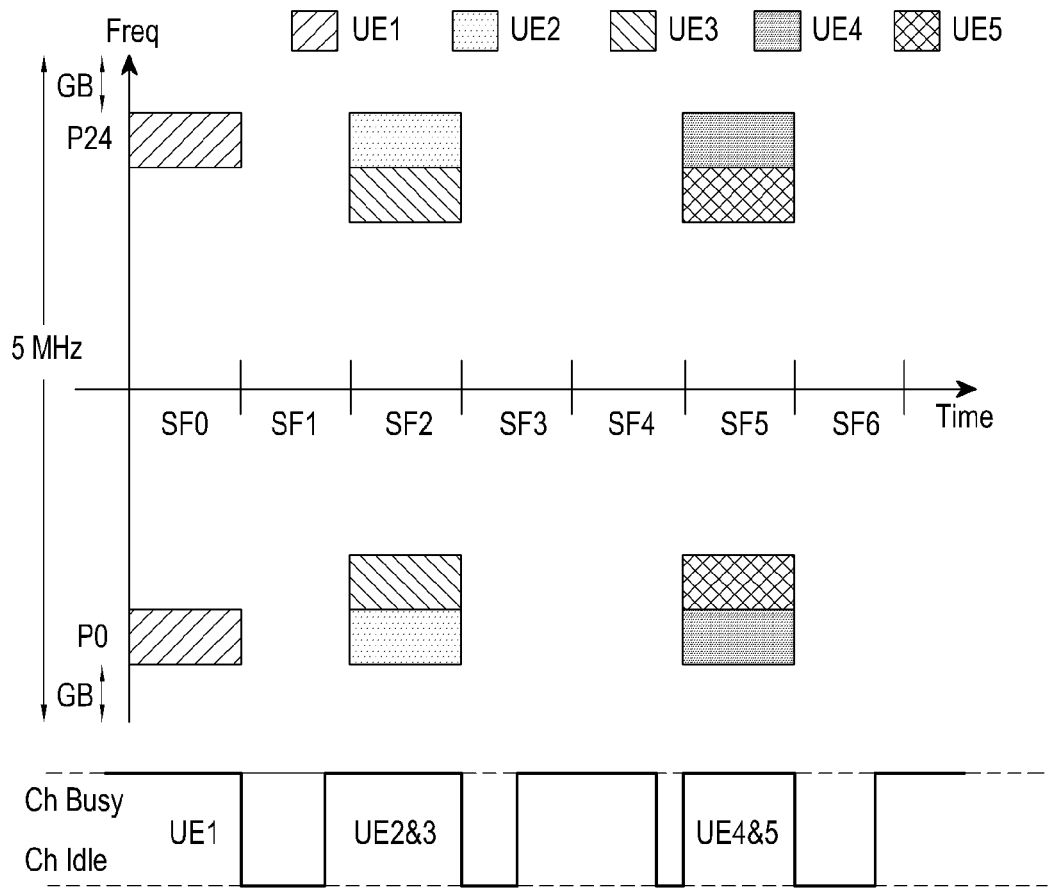
FIG. 50 is an illustration of a third method for achieving extension of transmission range of PSDCH in 5 MHz unlicensed bandwidth, according to embodiment.

FIG. 50 is an illustration of a third method for achieving extension of transmission range of PSDCH in 5 MHz unlicensed bandwidth, according to embodiment. The PSDCH transmissions from different UEs can be multiplexed in time and frequency to meet the regulatory criterion of minimum bandwidth utilization for unlicensed band operation. The PSDCH transmissions from the UEs, viz., UE1, UE2, UE3, UE4, and UE5, can be mapped in different PRBs in a SF to achieve frequency division multiplexing.

As depicted in FIG. 50, in SF0, UE1 can transmit PSDCH in PRB0 and PRB24. In SF2, UE2 can transmit PSDCH and PRB 0 and 24, and UE3 can transmit PSDCH in PRB1 and PRB 23. In SF5, UE4 can transmit PSDCH and PRB 0 and 24, and UE5 can transmit PSDCH in PRB1 and PRB 23. The maximum transmittable power can be distributed amongst the used frequency resources (PRBs) in order to achieve an increased D2D-U transmission range without repetitions in SFs.

Figure 51:
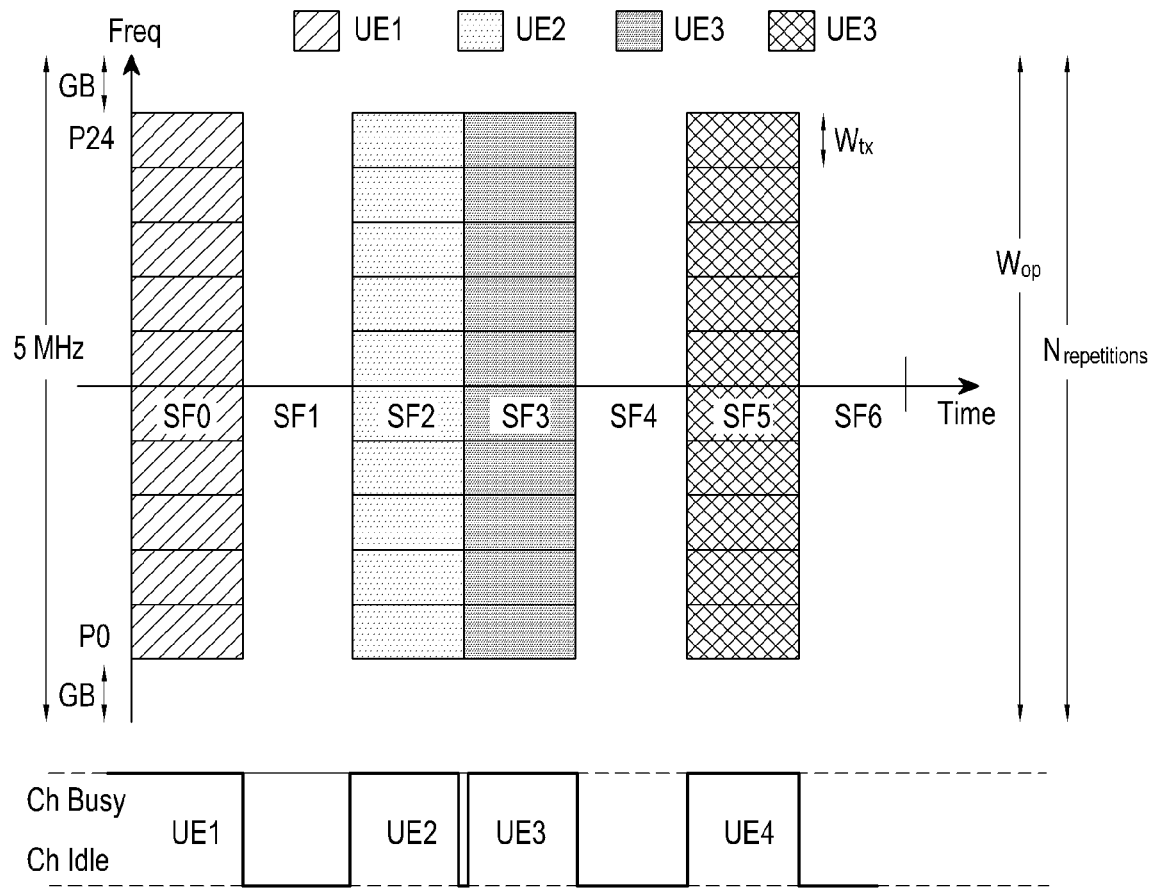
FIG. 51 is an illustration of a fourth method for achieving extension of transmission range of PSDCH in 5 MHz unlicensed bandwidth, according to embodiment.

FIG. 51 is an illustration of a fourth method for achieving extension of transmission range of PSDCH in 5 MHz unlicensed bandwidth, according to embodiment. The extension of range of D2D-U transmission can be achieved by utilizing the entire unlicensed spectrum bandwidth, wherein multiple versions of the narrow band data can be mapped over the entire unlicensed spectrum bandwidth. The narrow band data of bandwidth $B_{Tx}$ can be repeated N times over the operating bandwidth $B_{op}$, wherein N is equal to floor of $(B_{op}/B_{Tx})$. The UEs, viz., UE1, UE2, UE3, and UE4, can transmit the narrow band data and repeat transmitting the narrow band data N times over the operating bandwidth. The mapping of the versions of the narrow band data in frequency can continuous, except for a minor portion of bandwidth $(B_{op}-N*B_{Tx})$, when $B_{op}$ is not an integer multiple of $B_{Tx}$.

FIG. 52 is a block diagram of a device for D2D operation in unlicensed spectrum, according to an embodiment.

Referring to FIG. 52, a device 5200 includes a controller 5210 and a transceiver 5220.

The controller 5210 synchronizes with at least one device, by transmitting at least one of PSSS, SSSS and D2D-U MIB, over a PSBCH to the at least one device based on a timing reference.

The transceiver 5220 transmits discovery information required to identify types of D2D-U services provided by the device, over a PSDCH, to the at least one device and transmits D2D-U scheduling information over a PSCCH in PSCCH resources to the at least one device.

The transceiver 5220 transmits a payload over a PSSCH, in PSSCH resources, to the at least one device wherein the PSSCH resources are determined based on the D2D-U mode of operation.

The embodiments disclosed herein can be implemented through at least one software program running on at least one hardware device and performing network management functions to control the network elements. The network elements shown in FIGS. 5, 39, 45, and 46, include blocks which can be at least one of a hardware device, or a combination of hardware device and software module.

The embodiments disclosed herein describe methods and systems for achieving D2D communications through unlicensed spectrum. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for a device to device-unlicensed (D2D-U) operation, the method comprising:
    synchronizing, by a first device with at least one device, by transmitting at least one of primary sidelink synchronization signal (PSSS), secondary sidelink synchronization signal (SSSS) and D2D-U master information block (MIB), over a physical sidelink broadcast channel (PSBCH) to the at least one device based on a timing reference, wherein the timing reference is obtained based on a mode of D2D-U operation;
    transmitting, by the first device, information related to types of D2D-U services provided by the first device, over a physical sidelink discovery channel (PSDCH), to the at least one device;
    transmitting, by the first device, D2D-U scheduling information over a physical sidelink control channel (PSCCH) in PSCCH resources to the at least one device, wherein the PSCCH resources are determined based on the mode of the D2D-U operation; and
    transmitting, by the first device, a data over a physical sidelink shared channel (PSSCH) in PSSCH resources to the at least one device, wherein the PSSCH resources are determined based on the mode of the D2D-U operation, and
    wherein the mode of the D2D-U operation is one of a standalone (SO) mode, passive network assistance (PNA) mode, active network assistance (ANA) mode, or a network controlled (NC) mode.

2. The method of claim 1, wherein the D2D-U operation of the first device is controlled by a network in the NC mode, supported by the network in the ANA mode and the PNA mode, and managed by the first device in the SO mode, and
    wherein the timing reference is obtained by the first device from the network, in the NC mode, the ANA mode, and the PNA mode, wherein the timing reference includes at least one of sub-frame (SF) and system frame number (SFN) in which synchronization signals are transmitted by the network, and periodicity of transmission of the synchronization signals by the network, wherein SFs, in SFNs, valid for transmission over the PSBCH, is determined based on the timing reference.

3. The method of claim 2, wherein, the timing reference is obtained by the first device from a second device in the SO mode,
wherein the timing reference includes at least one of SF and SFN in which synchronization signals are transmitted by the second device, and periodicity of transmission of the synchronization signals by the second device,
wherein SFs, in SFNs, valid for transmission over the PSBCH, is determined based on the timing reference, and,
wherein, in the SO mode, the timing reference is obtained by the first device based on one of: randomly, global positioning system (GPS) timing, and evolved universal terrestrial radio access (E-UTRA) absolute radio frequency channel number (EARFCN), wherein SFs, in SFNs, valid for transmission over the PSBCH, is determined based on the timing reference.

4. The method of claim 1, wherein the PSBCH is mapped in one of: at least one physical resource block (PRB) of valid SFs in SFNs, at least one subcarrier in all PRBs of the valid SFs in SFNs, and at least one symbol in at least one PRB of the valid SFs in SFNs,
wherein the information related to types of D2D-U services provided by the first device is transmitted in discovery resources for discovery of the first device by the at least one device,
wherein the discovery resources are determined by the first device based on the mode of the D2D-U operation, and
wherein the discovery resources are SFs, PRBs in the SFs, and subcarriers of all PRBs in the SFs; valid for transmission over the PSDCH.

5. The method of claim 4, wherein the discovery resources are determined based on discovery parameters comprising of at least one of PSDCH period, PSDCH period offset, PSDCH period length, number of repetitions of transmission over the PSDCH, and channel access type,
wherein the PSDCH period is time period valid for transmission over the PSDCH, and
wherein the PSDCH period is one of continuous and discontinuous.

6. The method of claim 2, wherein, in the NC mode, discovery resources are provided to the first device by the network, wherein, in the ANA mode, the first device selects discovery parameters from a first set of discovery parameters, broadcasted by the network to the first device, and,
wherein, in the ANA mode, the PNA mode and the SO mode, the first device selects the discovery parameters from a second set of discovery parameters, stored as preconfigured information in the first device.

7. The method of claim 1, wherein the PSCCH resources are SFs, PRBs in the SFs, and subcarriers of all PRBs in the SFs, valid for transmission over the PSCCH; and the PSSCH resources are SFs, PRBs in the SFs, and subcarriers of all PRBs in the SFs, valid for transmission over the PSCCH, wherein the PSSCH resources, valid for transmission over the PSSCH, are included in the PSCCH resources.

8. The method of claim 7, wherein the PSCCH resources are determined based on PSCCH parameters comprising of at least one of PSCCH period, PSCCH period offset, PSCCH period length, number of repetitions of transmission over the PSCCH, and channel access type,
wherein the PSCCH period is time period of transmission over the PSCCH, wherein the PSCCH period is one of continuous and discontinuous, and
wherein the PSSCH resources are determined based on PSSCH parameters comprising of at least one of PSSCH period, PSSCH period offset, PSSCH period length, number of repetitions of transmission over the PSSCH, and channel access type, and
wherein the PSSCH period is time period of transmission over the PSSCH, wherein the PSSCH period is one of continuous and discontinuous.

9. The method of claim 2, wherein, in the NC mode, the PSCCH resources and the PSSCH resources are provided to the first device by the network, wherein, in the ANA mode, the first device selects PSCCH parameters from a first set of PSCCH parameters, broadcasted by the network to the first device,
wherein, in the PNA mode and SO mode, the first device selects the PSCCH parameters from a second set of PSCCH parameters, stored as preconfigured information in the first device,
wherein, in the ANA mode, the first device selects PSSCH parameters from a first set of PSSCH parameters broadcasted by the network to the first device, and
wherein, in the PNA mode and the SO mode, the first device selects the PSSCH parameters from a second set of PSSCH parameters, stored as preconfigured information in the first device.

10. The method of claim 1, wherein the method further comprises determining, by the first device, availability of an unlicensed channel prior to D2D-U transmission, wherein the D2D-U transmission comprises transmission over the PSBCH, the PSDCH, the PSCCH, and the PSSCH.

11. The method of claim 10, wherein priority of transmission over the PSBCH, in the unlicensed channel, is greater than priority of transmission over the PSDCH, and wherein availability of the unlicensed channel is determined through one of type 1 listen before talk (LBT) and type 2 LBT, wherein choice of selecting the type 1 LBT or the type 2 LBT is performed by one of the first device or a network.

12. The method of claim 1, wherein short control signaling (SCS) is transmitted over the PSBCH, the PSDCH, the PSCCH;
if transmission time period of the PSBCH, the PSDCH, the PSCCH, and the PSSCH is less than 2.5 ms, in a 50 ms time period, wherein the SCS is transmitted over the PSCCH and the PSSCH within a maximum channel occupancy time (MCOT) duration of the first device, wherein the first device shares the MCOT to the at least one device, and
wherein the SCS is transmitted over the PSDCH by a plurality of devices in discovery resources, wherein the discovery resources are at least one PRB in an unlicensed band, wherein the SCS is transmitted over the PSDCH from the plurality of devices are multiplexed in time.

13. A first device for device to device-unlicensed (D2D-U) operations comprising:
a transceiver; and
a processor coupled to the transceiver, where the processor is configured to:
synchronize by transmitting at least one of primary sidelink synchronization signal (PSSS), secondary sidelink synchronization signal (SSSS) and D2D-U master information block (MIB), over a physical sidelink broadcast channel (PSBCH) to the first device based on a timing reference, wherein the timing reference is obtained based on a mode of the D2D-U operation, transmit information related to types of D2D-U services provided by the first device, over a physical sidelink discovery channel (PSDCH), to at least one device, transmit D2D-U scheduling information over a physical sidelink control channel (PSCCH) in PSCCH resources to the at least one device, wherein the PSCCH resources are determined based on the mode of the D2D-U operation, and transmit a data over a physical sidelink shared channel (PSSCH) in PSSCH resources to the at least one device, wherein the PSSCH resources are determined based on the mode of the D2D-U operation, and wherein the mode of the D2D-U operation is one of standalone (SO) mode, passive network assistance (PNA) mode, active network assistance (ANA) mode, or network controlled (NC) mode.

14. The first device of claim 13, wherein the D2D-U operation of the first device is controlled by a network in the NC mode, supported by the network in the ANA mode and the PNA mode, and managed by the first device in the SO mode, and wherein, the timing reference is obtained by the first device from the network, in the NC mode, the ANA mode, and the PNA mode, and wherein the timing reference includes at least one of sub-frame (SF) and system frame number (SFN) in which synchronization signals are transmitted by the network, and periodicity of transmission of the synchronization signals by the network, wherein SFs, in SFNs, valid for transmission over the PSBCH, is determined based on the timing reference.

15. The first device of claim 14, wherein, the timing reference is obtained by the first device from a second device in the SO mode, wherein the timing reference includes at least one of SF and SFN in which synchronization signals are transmitted by the second device, and periodicity of transmission of the synchronization signals by the second device, wherein SFs, in SFNs, valid for transmission over the PSBCH, is determined based on the timing reference, and wherein, in the SO mode, the timing reference is obtained by the first device based on one of: randomly, global positioning system (GPS) timing, and evolved universal terrestrial radio access (E-UTRA) absolute radio frequency channel number (EARFCN), wherein SFs, in SFNs, valid for transmission over the PSBCH, is determined based on the timing reference.

16. The first device of claim 13, wherein the PSBCH is mapped in one of: at least one physical resource block (PRB) of valid SFs in SFNs, at least one subcarrier in all PRBs of the valid SFs in SFNs, and at least one symbol in at least one PRB of the valid SFs in SFNs, wherein the information related to types of D2D-U services provided by the first device is transmitted in discovery resources for discovery of the first device by the at least one device, wherein the discovery resources are determined by the first device based on the mode of the D2D-U operation, and wherein the discovery resources are SFs, PRBs in the SFs, and subcarriers of all PRBs in the SFs; valid for transmission over the PSDCH.

17. The first device of claim 16, wherein the discovery resources are determined based on discovery parameters comprising of at least one of PSDCH period, PSDCH period offset, PSDCH period length, number of repetitions of transmission over the PSDCH, and channel access type, wherein the PSDCH period is time period valid for transmission over the PSDCH, wherein the PSDCH period is one of continuous and discontinuous.

18. The first device of claim 14, wherein, in the NC mode, discovery resources are provided to the first device by the network, wherein, in the ANA mode, the first device selects discovery parameters from a first set of discovery parameters, broadcasted by the network to the first device, and wherein, in the ANA mode, the PNA mode and the SO mode, the first device selects the discovery parameters from a second set of discovery parameters, stored as preconfigured information in the first device.

19. The first device of claim 13, wherein the PSCCH resources are SFs, PRBs in the SFs, and subcarriers of all PRBs in the SFs, valid for transmission over the PSCCH; and the PSSCH resources are SFs, PRBs in the SFs, and subcarriers of all PRBs in the SFs, valid for transmission over the PSCCH, wherein the PSSCH resources, valid for transmission over the PSSCH, are included in the PSCCH resources.

20. The first device, as claimed in claim 19, wherein the PSCCH resources are determined based on PSCCH parameters comprising of at least one of PSCCH period, PSCCH period offset, PSCCH period length, number of repetitions of transmission over the PSCCH, and channel access type, wherein the PSCCH period is time period of transmission over the PSCCH, wherein the PSCCH period is one of continuous and discontinuous.

* * * * *